US012762389B1

(12) United States Patent
Sather et al.

(10) Patent No.: US 12,762,389 B1
(45) Date of Patent: Oct. 13, 2026

(54) NEURAL NETWORK CIRCUIT USING AFFINE TRANSFORMS TO ENCODE ACTIVATIONS

(71) Applicant: Amazon Technologies, Inc., Seattle, WA (US)

(72) Inventors: Eric A. Sather, Palo Alto, CA (US); Steven L. Teig, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 788 days.

(21) Appl. No.: 18/115,580

(22) Filed: Feb. 28, 2023

Related U.S. Application Data

(60) Provisional application No. 63/400,639, filed on Aug. 24, 2022.

(51) Int. Cl.

| | |
|---|---|
| ***G06N 3/06*** | (2006.01) |
| ***G06N 3/04*** | (2023.01) |
| ***G06N 3/048*** | (2023.01) |
| ***G06N 3/063*** | (2023.01) |

(52) U.S. Cl.
CPC ............. *G06N 3/063* (2013.01); *G06N 3/048* (2023.01)

(58) Field of Classification Search
CPC ........ G06N 3/063; G06N 3/065; G06N 3/048; G06N 3/04
See application file for complete search history.

(56) References Cited

U.S. PATENT DOCUMENTS 9,904,874 B2 2/2018 Shoaib et al.
11,049,013 B1 * 6/2021 Duong .................. G06F 7/5443
11,222,257 B1 * 1/2022 Ko .......................... G06N 3/045
11,481,612 B1 * 10/2022 Duong ................ G06F 9/30134
11,568,227 B1 * 1/2023 Ko ............................ G06N 3/04
11,783,167 B1 * 10/2023 Ko ....................... G06N 3/0464 706/43
12,118,463 B1 * 10/2024 Duong ................... G06N 3/063
2015/0170020 A1 * 6/2015 Garimella .............. G06N 3/082 706/14
2016/0086078 A1 3/2016 Ji et al.
(Continued)

OTHER PUBLICATIONS

Li et al., "MQBench: Towards Reproducible and Deployable Model Quantization Benchmark", Jan. 25, 2022, 35th Conference on Neural Information Processing Systems (NeurIPS 2021) Track on Datasets and Benchmarks, pp. 1-26. (Year: 2022).*
(Continued)

*Primary Examiner* — Paulinho E Smith
(74) *Attorney, Agent, or Firm* — K&L Gates LLP

(57) ABSTRACT

Some embodiments provide a neural network inference circuit (NNIC). The NNIC includes a set of core computation circuits for executing a core computation on a set of input values for a neural network computation node to generate a first value. The NNIC includes a set of affine transform circuits for applying an affine transform to the first value to generate a second value. The applied affine transform is a combination of (i) a batch normalization transform, (ii) a learned affine transform, (iii) a weight scale for the computation node, and (iv) an encoding transform such that the second value is encoded for input to an activation function. The NNIC includes a set of activation circuits for applying the activation function to the second value to generate an output value for the computation node.

20 Claims, 22 Drawing Sheets

(56) References Cited

U.S. PATENT DOCUMENTS

| | | | |
|---|---|---|---|
| 2016/0174902 A1 | 6/2016 | Georgescu et al. | |
| 2017/0286830 A1 | 10/2017 | El-Yaniv et al. | |
| 2018/0197049 A1 | 7/2018 | Tran et al. | |
| 2019/0042948 A1 | 2/2019 | Lee et al. | |
| 2019/0138882 A1 | 5/2019 | Choi et al. | |
| 2019/0138896 A1 | 5/2019 | Deng | |
| 2019/0171927 A1 | 6/2019 | Diril et al. | |
| 2019/0180184 A1* | 6/2019 | Deng | G06N 3/045 |
| 2019/0188557 A1* | 6/2019 | Lowell | G06N 3/063 |
| 2019/0220741 A1* | 7/2019 | Garcia | G06N 3/084 |
| 2019/0228274 A1 | 7/2019 | Georgiadis et al. | |
| 2019/0286970 A1 | 9/2019 | Karaletsos et al. | |
| 2019/0340492 A1* | 11/2019 | Burger | G06N 3/0495 |
| 2019/0354842 A1 | 11/2019 | Louizos et al. | |
| 2019/0392298 A1* | 12/2019 | Oshima | G06N 3/048 |
| 2020/0134461 A1 | 4/2020 | Chai et al. | |
| 2020/0202213 A1* | 6/2020 | Darvish Rouhani | G06N 3/0442 |
| 2020/0202218 A1* | 6/2020 | Csefalvay | G06Q 20/3672 |
| 2020/0210838 A1 | 7/2020 | Lo et al. | |
| 2020/0264876 A1* | 8/2020 | Lo | G06F 18/217 |
| 2020/0302269 A1 | 9/2020 | Ovtcharov et al. | |
| 2021/0019630 A1 | 1/2021 | Yao et al. | |
| 2021/0034982 A1* | 2/2021 | Sather | G06F 5/012 |
| 2021/0264247 A1* | 8/2021 | Kang | G06N 3/04 |
| 2022/0164411 A1* | 5/2022 | Jain | G06F 17/15 |
| 2022/0291739 A1* | 9/2022 | Ko | G06N 3/0464 |
| 2025/0103341 A1* | 3/2025 | Duong | G06N 3/063 |

OTHER PUBLICATIONS

Fengfu Li et al., "Ternary Weight Networks", Nov. 19, 2016, 30th Conference on Neural Information Processing Systems (NIPS 2016), pp. 1-5 (Year: 2016).*

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

Agostinelli, Forest, et al., "Learning Activation Functions to Improve Deep Neural Networks," Apr. 21, 2015, 9 pages, retrieved from https://arxiv.org/abs/1412.6830.

Aizenberg, Igor, "Periodic Activation Function and a Modified Learning Algorithm for the Multivalued Neuron," IEEE Transactions on Neural Networks, Dec. 2010, 11 pages, vol. 21, No. 12, IEEE.

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

Bagherinezhad, Hessam, et al., "LCNN: Look-up Based Convolutional Neural Network," Proceedings of 2017 IEEE Conference on Computer Vision and Pattern Recognition (CVPR 2017), Jul. 21-26, 2017, 10 pages, IEEE, Honolulu, HI, USA.

Bhattacharya, Sourav, et al., "Sparsification and Separation of Deep Learning Layers for Constrained Resource Inference on Wearables," SenSys '16, Nov. 14-16, 2016, 15 pages, ACM, Stanford, CA, USA.

Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.

Boo, Yoonho, et al., "Structured Sparse Ternary Weight Coding of Deep Neural Networks for Efficient Hardware Implementations," 2017 IEEE Workshop on Signal Processing Systems (SiPS), Oct. 3-5, 2017, 6 pages, IEEE, Lorient, France.

Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.

Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.

Choi, Jungwook, et al., "PACT: Parameterized Clipping Activation for Quantized Neural Networks," Jul. 17, 2018, 15 pages, retrieved from https://arxiv.org/abs/1805.06085.

Courbariaux, Matthieu, et al., "Binarized Neural Networks: Training Neural Networks with Weights and Activations Constrained to +1 or −1," Mar. 17, 2016, 11 pages, arXiv:1602.02830v3, Computing Research Repository (CoRR)—Cornell University, Ithaca, NY, USA.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.

Han, Song, et al., "Learning Both Weights and Connections for Efficient Neural Networks," Oct. 30, 2015, 9 pages, retrieved from https://arxiv.org/abs/1506.02626.

He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.

Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.

Hu, Hengyuan, et al., "Network Trimming: A Data-Driven Neuron Pruning Approach towards Efficient Deep Architectures," Jul. 12, 2016, 9 pages, retrieved from https://arxiv.org/abs/1607.03250v1.

Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.

Jain, Anil K., et al., "Artificial Neural Networks: A Tutorial," Computer, Mar. 1996, 14 pages, vol. 29, Issue 3, IEEE.

Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.

Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.

Kingma, Diederik P., et al., "Auto-Encoding Variational Bayes," May 1, 2014, 14 pages, arXiv:1312.6114v10, Computing Research Repository (CoRR)—Cornell University, Ithaca, NY, USA.

Kong, Chen, et al., "Take it in your stride: Do we need striding in CNNs?," Dec. 7, 2017, 9 pages, arXiv:1712.02502v1, Computer Research Repository (CoRR)—Cornell University, Ithaca, NY, USA.

Leng, Cong, et al., "Extremely Low Bit Neural Network: Squeeze the Last Bit Out with ADMM," Proceedings of 32nd AAAI Conference on Artificial Intelligence (AAAI-18), Feb. 2-7, 2018, 16 pages, Association for the Advancement of Artificial Intelligence, New Orleans, LA, USA.

Li, Fengfu, et al., "Ternary Weight Networks," May 16, 2016, 9 pages, arXiv:1605.04711v1, Computing Research Repository (CoRR)—Cornell University, Ithaca, NY, USA.

Martens, James, "New Insights and Perspectives on the Natural Gradient Method," Nov. 21, 2017, 59 pages, retrieved from https://arxiv.org/abs/1412.1193v9.

Merolla, Paul, et al., "Deep Neural Networks are Robust to Weight Binarization and Other Non-linear Distortions," Jun. 7, 2016, 10

(56) References Cited

OTHER PUBLICATIONS pages, arXiv:1606.01981v1, Computing Research Repository (CoRR)—Cornell University, Ithaca, NY, USA.
Moshovos, Andreas, et al., "Exploiting Typical Values to Accelerate Deep Learning," Computer, May 24, 2018, 13 pages, vol. 51—Issue 5, IEEE Computer Society, Washington, D.C.
Neklyudov, Kirill, et al., "Structured Bayesian Pruning via Log-Normal Multiplicative Noise," Proceedings of the 31st Conference on Neural Information Processing Systems (NIPS 2017), Dec. 4-9, 2017, 10 pages, ACM, Long Beach, CA, USA.
Non-Published Commonly Owned Related U.S. Appl. No. 18/115,579 with similar specification, filed Feb. 28, 2023, 96 pages, Perceive Corporation.
Non-Published Commonly Owned Related U.S. Appl. No. 18/115,581 with similar specification, filed Feb. 28, 2023, 96 pages, Perceive Corporation.
Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.
Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.
Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.
Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.
Vaswani, Sharan, "Exploiting Sparsity in Supervised Learning," Month Unknown 2014, 9 pages, retrieved from https://vaswanis.github.io > optimization_report.
Wang, Min, et al., "Factorized Convolutional Neural Networks," 2017 IEEE International Conference on Computer Vision Workshops (ICCVW '17), Oct. 22-29, 2017, 9 pages, IEEE, Venice, Italy.
Wang, Peiqi, et al., "SNrram: An Efficient Sparse Neural Network Computation Architecture Based on Resistive Random-Access Memory," DAC '18, Jun. 24-29, 2018, 7 pages, ACM, San Francisco, CA, USA.
Wen, Wei, et al., "Learning Structured Sparsity in Deep Neural Networks," Oct. 18, 2016, 10 pages, arXiv:1608.03665v4, Computer Research Repository (CoRR)—Cornell University, Ithaca, NY, USA.
Withagen, Heini, "Reducing the Effect of Quantization by Weight Scaling," Proceedings of 1994 IEEE International Conference on Neural Networks (ICNN '94), Jun. 28-Jul. 2, 1994, 3 pages, IEEE, Orlando, Florida, USA.
Yan, Shi, "L1 Norm Regularization and Sparsity Explained for Dummies," Aug. 27, 2016, 13 pages, retrieved from https://blog.mlreview.com/l1-norm-regularization-and-sparsity-explained-for-dummies-5b0e4be3938a.
Yang, Tien-Ju, et al., "Designing Energy-Efficient Convolutional Neural Networks using Energy-Aware Pruning," Apr. 18, 2017, 9 pages, arXiv:1611.05128v4, Computer Research Repository (CoRR)—Cornell University, Ithaca, NY, USA.
Yang, Xuan, et al., "DNN Dataflow Choice Is Overrated," Sep. 10, 2018, 13 pages, arXiv:1809.04070v1, Computer Research Repository (CoRR)—Cornell University, Ithaca, NY, USA.
Zhang, Dongqing, et al., "LQ-Nets: Learned Quantization for Highly Accurate and Compact Deep Neural Networks," Jul. 26, 2018, 21 pages, arXiv:1807.10029v1, Computer Research Repository (CoRR)—Cornell University, Ithaca, NY, USA.
Zhou, Shuchang, et al., "DoReFa-Net: Training Low Bitwidth Convolutional Neural Networks with Low Bitwidth Gradients," Jul. 17, 2016, 14 pages, arXiv:1606.06160v2, Computer Research Repository (CoRR)—Cornell University, Ithaca, NY, USA.
Zhu, Chenzhuo, et al., "Trained Ternary Quantization," Dec. 4, 2016, 9 pages, arXiv:1612.01064v1, Computing Research Repository (CoRR)—Cornell University, Ithaca, NY, USA.
Bhalgat et al., "LSQ+: Improving low-bit quantization through learnable offsets and better initialization", 2020 (Year: 2020) (8 pages).

* cited by examiner

400

NEURAL NETWORK CIRCUIT USING AFFINE TRANSFORMS TO ENCODE ACTIVATIONS

BACKGROUND

Machine learning automates the creation, based on historical data, of models that can then be used to make predictions. A class of models called deep neural networks (or DNNs) has become popular over the last few years, and there is now a menagerie of types of DNNs. Some examples of DNNs include feed-forward, convolutional, recurrent, long-short term memory (LSTM), and Neural Turing Machines (NTM).

In some cases, neural networks are executed on specialized hardware that constrains the types of values that may be propagated through the network. For certain features of the networks, the values available on the specialized hardware may not be optimal. As such, techniques that enable greater flexibility on such hardware would be useful.

BRIEF SUMMARY

Some embodiments of the invention optimize the training of a neural network for implementation on a particular type of neural network inference circuit that quantizes intermediate activation values by optimizing the ranges of the activation values for one or more layers of the neural network. The neural network inference circuit (also referred to as a neural network accelerator or neural network computation fabric) quantizes intermediate activation values using a particular number of bits (e.g., 4 bits, 8 bits, etc.). This particular number of bits, using a specific datatype (e.g., U2.2 for 4-bit values), constrains all intermediate activation values in the network to a specific range (e.g., 0-3.75 for U2.2 values). However, certain activation functions may have different input and output ranges (both smaller and larger) that maximize the expressiveness of that activation function. Some embodiments determine, for each layer (or at least a set of the layers), the optimal input and output ranges. The neural network is then trained using these values (equally spaced throughout the optimal ranges) rather than the values provided by a fixed datatype.

For instance, the output range [0, 3.75] might be scaled to a range of [0,1] if a sigmoid function is used for the activation function, as this function only gives outputs in the latter range. Similarly, if the neural network inference circuit uses 8 bits for the input to an activation function, a range of [−4,4] could be more useful for a sigmoid function than the [−32, 31.75] range provided by an S6.2 datatype as beyond this input range there is almost no variability in the output. In some embodiments, the input and output values may use different numbers of bits and thus have different numbers of potential values (e.g., an 8-bit input for an activation function means there are 256 evenly-spaced input values while a 4-bit output means there are 16 evenly-spaced output values).

In some embodiments, the translation between the range as provided by a fixed datatype and the optimal range is an affine transform (e.g., a shift and a scale). That is, an x-bit activation value can represent a fixed number of values, but so long as those values are evenly-spaced then the fixed datatype range (e.g., a datatype with x−2 integer bits and 2 fractional bits) can be transformed into the optimal range using only a scale and a shift.

Some embodiments treat the inverse affine transform (i.e., from the optimal range to the fixed datatype range) as an encoding transform, with the transform back to the optimal range as a decoding transform. That is, the values passed through the neural network inference circuit are encoded values (using, e.g., 4 bits to encode each of the possible values in the optimal range). In some embodiments, prior to applying an activation function, an affine transform is applied to the encoded value that (i) decodes the encoded values and (ii) re-encodes the values for the optimal input range of the upcoming activation function.

In some embodiments, the optimal input and output ranges are determined manually based on the properties of the activation functions. In other embodiments, the optimal input and output ranges are learned during training. As an example, potential optimal ranges for a sigmoid function are given above. For a ReLU, it might be the case that using an output range of [0, 3.75] results in too much truncation at the high end (because inputs are regularly larger than 3.75), so this could be scaled up to a more optimal range with larger spacing between values. A Swish function typically has a small portion of its output range that is negative, and thus typical datatypes would require losing one bit as a sign bit. However, with the above-described encoding, this negative portion can be captured as part of a range by simply using a shift of, e.g., −0.25 from a [0, x] range.

When the optimal ranges are determined, the quantized neural network can be trained by a training system. The training system, in some embodiments, handles quantization of intermediate activation values by using the equally-spaced optimal ranges when quantizing the activation values (or inputs to the activation functions). The incorporation of quantization of intermediate activation values into training is described in greater detail in U.S. Patent Publication 2021/0034982 as well as U.S. patent application Ser. No. 17/696,810, filed Mar. 16, 2022 and titled "Insertion of Activation Functions into Decomposed Layer of Network", both of which are incorporated herein by reference.

As mentioned, the network is trained for execution on a specific type of neural network inference circuit. In some embodiments, this neural network inference circuit (i) uses ternary weight values for convolutional and fully-connected layers (i.e., each weight value for a particular filter is one of the set {0, α, −α}) and (ii) quantizes intermediate activation values (e.g., to 4-bit or 8-bit values). Such a neural network inference circuit includes (i) core computation circuits for executing core computations (e.g., dot products for convolutional and fully-connected layers, pooling operations for pooling layers, element-wise addition and/or multiplication for element-wise operation layers) and (ii) a set of post-processing circuits for performing additional operations on the results generated by the core computation circuits. The post-processing circuits, in some embodiments, include a set of affine transform circuits (e.g., an adder circuit for applying a shift value and a multiplier circuit for multiplying by a scale value) as well as a set of activation circuits for applying activation functions to the transformed values. Specific neural network inference circuit structures (e.g., for performing many operations in parallel) are discussed in U.S. Pat. No. 11,049,013 as well as U.S. patent application Ser. No. 17/543,471, filed Dec. 6, 2021 and titled "Neural Network Inference Circuit with Piecewise Linear Activation Circuit", both of which are incorporated herein by reference.

In some embodiments, the affine transform circuits are configured to decode and re-encode the intermediate values for each layer prior to application of the activation function. The affine transform circuits receive a value (e.g., a dot product, an element-wise sum or product) and apply a combination of (i) a first affine transform that removes the current encoding applied to the received value and (ii) a second affine transform that encodes this value for input to the upcoming activation function. These affine transforms are combined (possibly with other affine transforms) during training so that only a single add (shift) operation and a single multiplication (scaling) operation are applied to each value prior to the activation function.

The neural network inference circuit of some embodiments computes values for numerous computation nodes in parallel. Specifically, up to a fixed number of nodes (this number depending on how many parallel structures are present in the hardware) can be computed at once. For each respective node of a set of nodes that are computed simultaneously, a respective set of affine transform circuits applies a respective shift and scale to the node, each of which combines the first (decoding) and second (re-encoding for the upcoming activation function) affine transforms to their respective values. In different embodiments, these may all be the same applied affine transform, while in other embodiments different combined affine transforms are applied (because other factors are also accounted for) by the different sets of affine transform circuits.

Both the decoding and encoding transforms as well as the additional factors may vary from layer to layer of the neural network. As described below, the decoding transform for a particular layer depends on a combination of the encoding applied in a previous layer (e.g., based on the type of activation function applied) as well as the type of core computation performed in the particular layer (e.g., convolution, element-wise addition, element-wise multiplication). The additional factors can include weight scaling and trained biases, in some embodiments. As noted, the neural network inference circuit of some embodiments requires ternary weight values (i.e., $\{0, a, -\alpha\}$), with a varying by layer or even by filter in some cases. Rather than store the a values, the neural network inference circuit stores the weight values as $\{0, 1, -1\}$ (or stores encoded data representing the weight values in these terms. Furthermore, dot product calculations are made simpler by using the $\{0, 1, -1\}$ values (this minimizes the need for multiplication, as simpler addition can be used instead), with the a value for a given layer/filter incorporated into the configuration data provided to the affine transform circuits.

As indicated, the decoding transform for a particular layer depends in part on the specific core computation performed in the particular layer. For instance, if the particular layer is a convolutional or fully-connected layer, then the core computation (i.e., the computation performed to generate a value to which the affine transform and activation function are applied) is a dot product. In some embodiments, the decoding transform for a dot product uses the same scale as the affine transform that would decode the inputs (i.e., the inverse transform of the encoding applied to the input values to the layer). The shift for the decoding transform is the shift of the input value decoding transform multiplied by the sum of the weights of the dot product.

For an element-wise operation layer, the core computation may be element-wise addition or element-wise multiplication in some embodiments. In the case of element-wise addition, some embodiments require that the input values (from two different prior layers) be encoded with the same scale (but may have different shifts). The decoding transform for the resultant element-wise sum is then that same scale and a shift that is the sum of the shifts of the two input layer encodings. In the case of element-wise multiplication, some embodiments require that the shifts of the input layer encodings both be equal to zero. In this case, the decoding transform is a scale that is a product of the scales of the two input layer encodings. Other embodiments do not impose such a requirement on the input layer encodings, but the inclusion of shifts complicates the resultant decoding transform.

To determine the nature of the decoding transform, the discussion above assumes that batch normalization is not used. However, when batch normalization is used during training, doing so effectively eliminates the encoding (because batch normalization centers the input values around zero and normalizes the scale). During inference (on the neural network inference circuit), the batch normalization transform effectively performs the decoding. As such, the affine transform configured for the affine transform circuits is a combination of (i) the batch normalization transform, (ii) a learned affine transform (if such a transform is used), (iii) a weight scale and/or bias factor, and (iv) encoding for the subsequent activation function.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention optimize the training of a neural network for implementation on a particular type of neural network inference circuit that quantizes intermediate activation values by optimizing the ranges of the activation values for one or more layers of the neural network. The neural network inference circuit (also referred to as a neural network accelerator or neural network computation fabric) quantizes intermediate activation values using a particular number of bits (e.g., 4 bits, 8 bits, etc.). This particular number of bits, using a specific datatype (e.g., U2.2 for 4-bit values), constrains all intermediate activation values in the network to a specific range (e.g., 0-3.75 for U2.2 values). However, certain activation functions may have different input and output ranges (both smaller and larger) that maximize the expressiveness of that activation function. Some embodiments determine, for each layer (or at least a set of the layers), the optimal input and output ranges. The neural network is then trained using these values (equally spaced throughout the optimal ranges) rather than the values provided by a fixed datatype.

Figure 1:
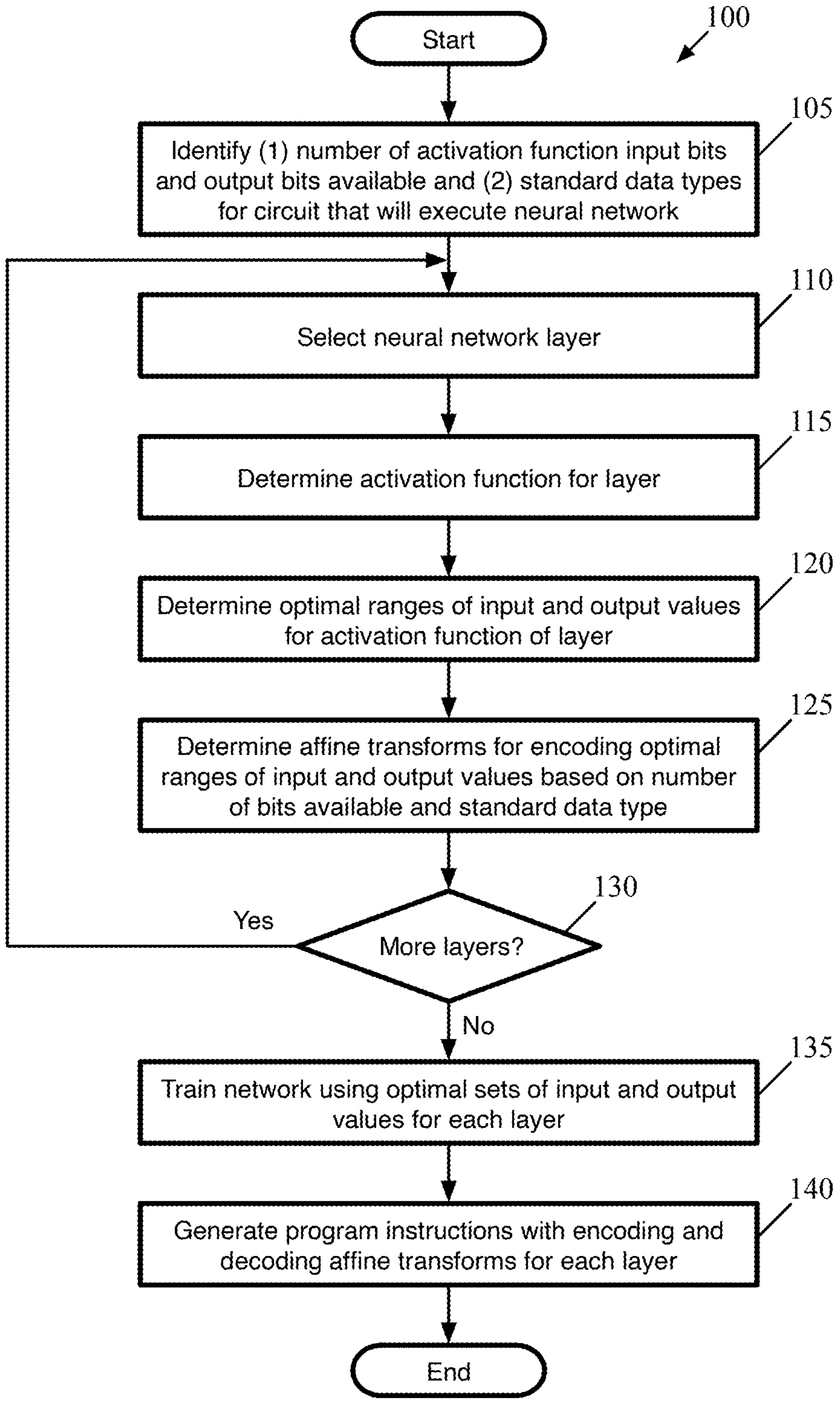
FIG. 1 conceptually illustrates a process of some embodiments for training a neural network and generating program instructions for the trained network to be executed on a particular type of neural network inference circuit.

FIG. 1 conceptually illustrates a process 100 of some embodiments for training a neural network and generating program instructions for the trained network to be executed on a particular type of neural network inference circuit. In some embodiments, the process 100 is performed by a neural network training system that trains the parameters (e.g., weights, bias values, etc.) of a neural network. The training system, in different embodiments, may be a program executing on a single device (e.g., a single laptop or desktop, a mobile device, a physical or virtual server, etc.) or a distributed application that operates on multiple machines (e.g., on multiple physical computers, multiple virtual machines or containers within a datacenter or multiple datacenters, etc.). In some embodiments, the process 100 is an amalgamation of several processes that can be performed by multiple different machines or groups of machines (e.g., stochastic gradient descent (SGD) training process, a program compiling process, etc.). The process 100 will be described in part by reference to FIGS. 2-4, which illustrate different examples of commonly used activation functions.

As shown, the process 100 begins by identifying (at 105) both (i) the number of activation function input bits and output bits available and (ii) the standard data types for the type of circuit that will execute the neural network being trained. Certain neural network inference circuits quantize their output activation values (e.g., to 4-bit or 8-bit values). In concert with this quantization, the number of bits used for input to the activation function may also be quantized (e.g., truncated). When dealing with quantized values, specific data types (i.e., locations of the binary point) may also be used in some embodiments. For instance, 4-bit values may use the U2.2 data type in some embodiments, which uses two integer bits (preceding the binary point) and two fractional bits (after the binary point). U2.2 values can range from 0 (0000) to 3.75 (1111). Eight-bit values, in some embodiments, may use U6.2 (six integer bits and two fractional bits, ranging from 0 to 63.75) or S6.2 (a sign bit, five integer bits, and two fractional bits, ranging from −32 to 31.75). As will be described, these specific ranges are restrictive and not necessarily optimal for various activation functions.

The process 100 then selects (at 110) a neural network layer. A typical neural network includes multiple layers (e.g., an input layer, multiple hidden layers, and an output layer), as described in detail below by reference to FIG. 5. In many neural networks, each of these layers (or at least each of a subset of the layers) includes a core computation (e.g., a dot product for a convolutional or fully-connected layer, an element-wise arithmetic operation, a pooling operation, etc.) followed by an activation function.

The process 100 determines (at 115) an activation function for the layer. As noted above, each layer (or at least each of a set of the layers) finishes with an activation function. In some embodiments, the activation functions are predetermined based on the type of network being trained (e.g., certain network architectures use standardized activation functions). In other embodiments, a user managing the training of the neural network chooses activation functions for each layer. Examples of commonly used activation functions include Rectified Linear Unit (ReLU), sigmoid functions, the swish function (a modification of the ReLU), and others. These activation functions, as described further below, may be implemented on a neural network inference circuit using a look-up table, a truncation circuit (e.g., for the ReLU), a piecewise linear function, etc.

Next, the process 100 determines (at 120) the optimal ranges of input and output values for the activation function for the layer. As mentioned, the standardized ranges for the neural network inference circuit (e.g., an output range of [0, 3.75]) may not be optimal for a particular activation function and thus the network should be trained using different input and output ranges.

Figure 2:
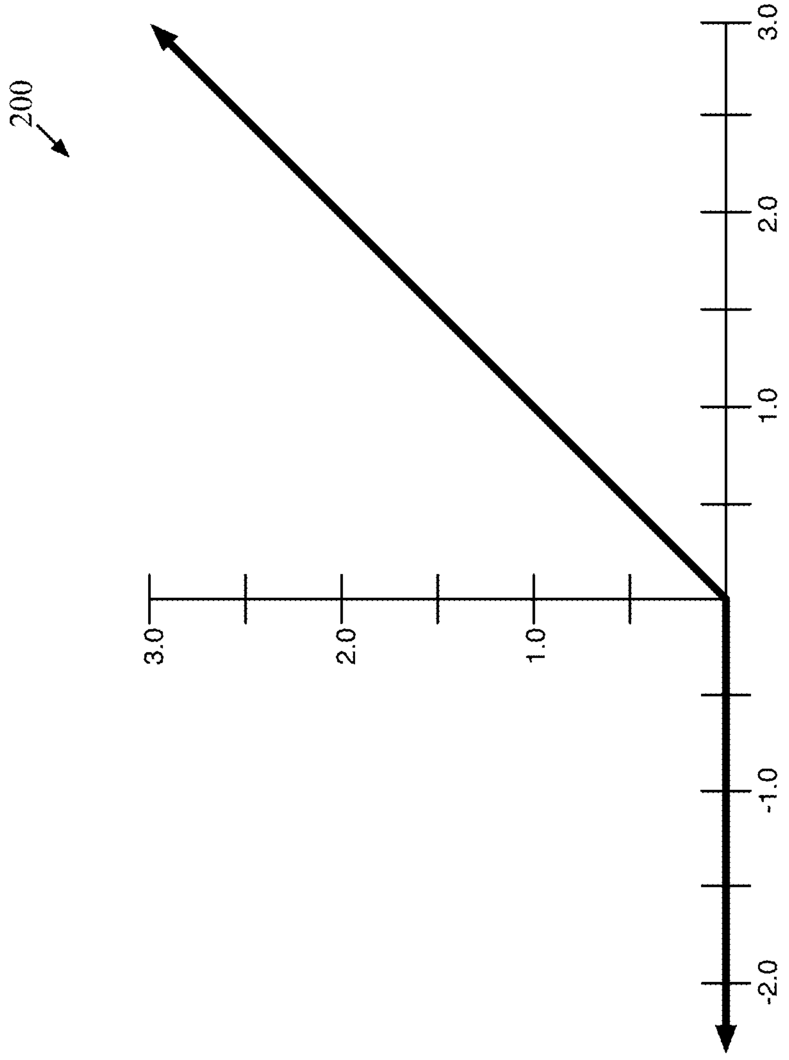
FIG. 2 illustrates a graph of a ReLU activation function.

FIG. 2 illustrates a graph 200 of a ReLU activation function. As shown, the ReLU function output (y) is zero if the input (x) is negative and x if $0 \leq x$. However, on a neural network inference circuit using U2.2 data for the output, this means that any input values above 3.75 are truncated.

However, training might be such that either (i) too many activation input values above 3.75 are truncated, resulting in too much information loss or (ii) all of the activation input values are clustered in a lower range (e.g., 0-2.0) such that the granularity offered by 4 bits is too low. In the former case, the output range could be specified as, e.g., [0, 15], while in the latter case the output range could be specified as [0, 2].

Figure 3:
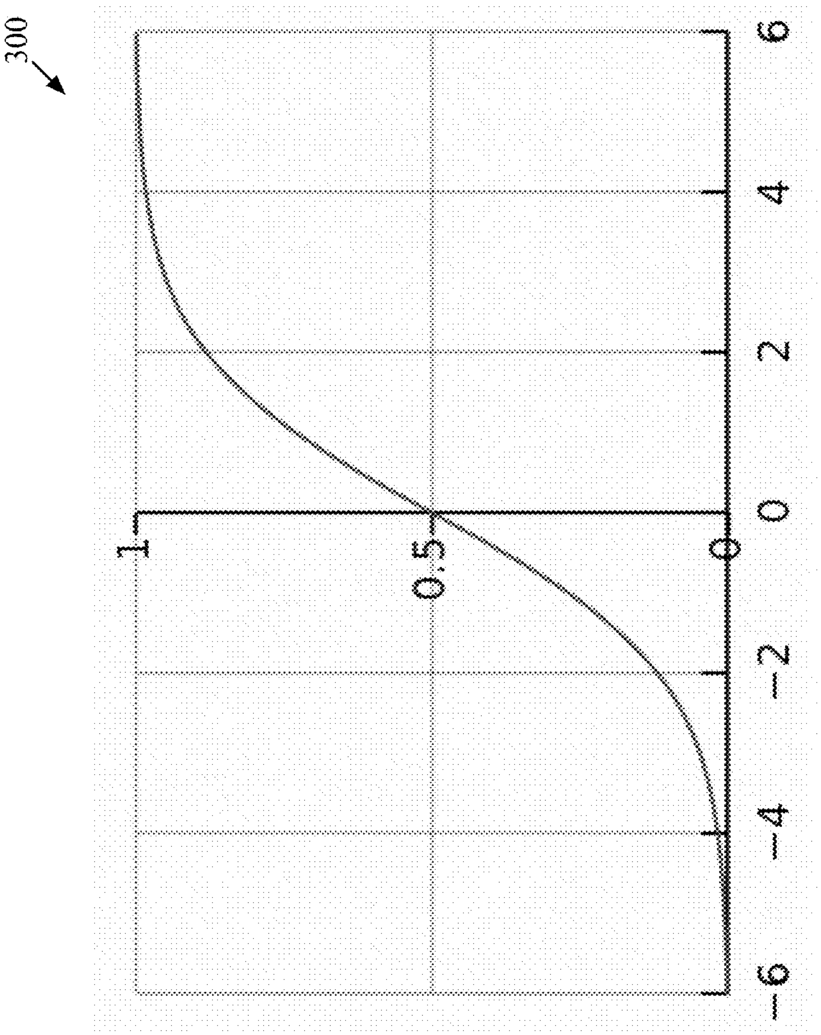
FIG. 3 illustrates a graph of a sigmoid activation function.

FIG. 3 illustrates a graph 300 of a sigmoid activation function. This sigmoid function (the logistic function) is given by the equation:

$$S(x) = \frac{1}{1+e^{-x}}. \quad (1)$$

The sigmoid function, as can be seen, (i) has output values restricted to the range [0, 1] and (ii) has almost no variation in its output for any input values outside of the range [−4, 4]. If the neural network inference circuit uses 8-bit S6.2 data for input, the majority of the input range [−32, 31.75] is not very interesting. Similarly, the 4-bit U2.2 output range [0, 3.75] is mostly not viable outputs for this activation function. As such, the more optimal input range [−4, 4] and output range [0, 1] can be used for sigmoid activation functions, which will provide greater granularity within these ranges. That is, rather than all output values of the sigmoid function being in the set {0, 0.25, 0.5, 0.75, 1.0}, sixteen possible values (the number of different values for 4 bits) within this range are available instead.

Figure 4:
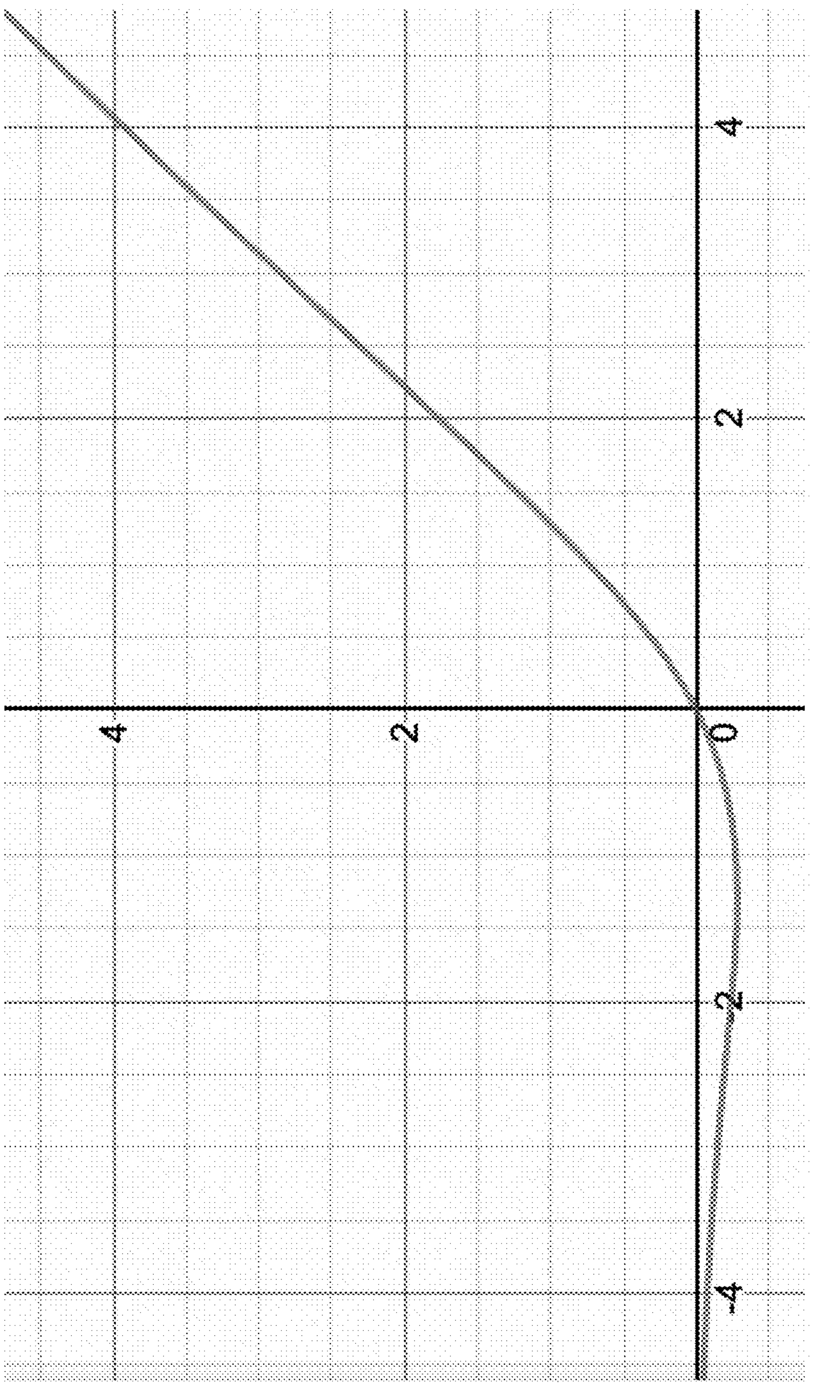
FIG. 4 illustrates a graph of the swish activation function.

FIG. 4 illustrates a graph 400 of the swish activation function. This function is given by the equation f(x)=x*S(x), where S(x) is the sigmoid function shown above. This function approximates a ReLU, especially for larger values (where S(x)≈1) and smaller (negative) values (where S(x)≈0), but also includes a few negative outputs. Using unsigned 4-bit outputs (U2.2) means that the negative values are removed, but using S2.2 gives a range [−2, 1.75] much of which is unused. As such, an optimal range might be [−0.25, 3.5], or a range with a different upper bound (using different but equal spacing between values).

In some embodiments, a user (managing the training of the neural network) provides information to the training system on a per-layer basis (e.g., through a graphical user interface or set of APIs) to specify the activation functions and/or optimal ranges. In addition, although the process 100 shows the optimal ranges chosen on a per-layer basis, some embodiments allow for optimal ranges to be selected on a per-channel basis, at least for some layers. In other embodiments, the optimal ranges are learned during training (in this case, these ranges may be additional trainable parameters of the network).

Based on the optimal ranges as well as the number of bits and standard data types for the neural network inference circuit, the process 100 determines (at 125) affine transforms for encoding the values. In some embodiments, the translation between the range as provided by the standard datatype and the optimal range is an affine transform (e.g., a shift and a scale). That is, the x-bit value can represent a fixed number of values, but so long as those values are evenly-spaced then the standard datatype range (e.g., [0, 3.75]) can be transformed into the optimal range using only a scale and a shift.

Some embodiments treat the affine transform from the optimal range to the fixed datatype range as an encoding transform with the transform back to the optimal range as a decoding transform. Thus, the values that will be passed through the neural network inference circuit are encoded values (using, e.g., 4 bits to encode each of the possible values in the optimal range). In some embodiments, prior to applying an activation function (both during training and on the neural network inference circuit), an affine transform is applied to the encoded value that (i) decodes the current encoded values and (ii) re-encodes the values for the optimal input range of the upcoming activation function. The details of these affine transforms will be described in greater detail below.

The process 100 then determines (at 130) whether additional layers remain for determination of the optimal ranges and affine transforms. If additional layers remain, the process 100 returns to 110 to select the next layer of the neural network. It should be understood that the process 100 is a conceptual process and that a training system would not necessarily perform the operations 110-125 serially (i.e., the operations could be performed for numerous layers in parallel). In addition, if the optimal ranges are learned during training, the operations 120-125 could be performed repeatedly within the context of training the network.

Once all of the layers have been analyzed, the process 100 trains (at 135) the neural network using the optimal sets of input and output values for each layer. The training system, in some embodiments, handles quantization of intermediate activation values by using the equally-spaced optimal ranges when quantizing the outputs of the core computations that are input to the activation functions as well as the activation values that are output by the activation functions. The incorporation of quantization of intermediate activation values into training is described in greater detail in U.S. Patent Publication 2021/0034982 as well as U.S. patent application Ser. No. 17/696,810, filed Mar. 16, 2022 and titled "Insertion of Activation Functions into Decomposed Layer of Network", both of which are incorporated herein by reference. In addition, the aspects of training that incorporate the affine transforms are described below.

Finally, the process 100 generates (at 140) program instructions with the encoding and decoding affine transforms for each layer of the network, then ends. As described in more detail in U.S. patent application Ser. No. 16/525,445, filed Jul. 29, 2019 and titled "Compiler for Optimizing Number of Cores Used to Implement Neural Network", which is incorporated herein by reference, this neural network instructions program includes instructions for loading weight values into the memory of the neural network inference circuit and instructions for it to execute each layer of the network. These instructions configure the circuit blocks of the neural network inference circuit to perform various operations, including the encoding and decoding transforms.

As mentioned, in some embodiments a user provides the optimal ranges for each layer (or, in some cases, each channel) to the training system through an API. In some embodiments, the user specifies the activation functions to use (e.g., whether to use a ReLU, sigmoid, tanh, swish, etc.) and the training system automatically identifies the optimal input and output range for some or all of the layers (e.g., for sigmoid, swish, etc. functions).

In some embodiments, the training system also performs analysis on the network prior to training to determine whether all of the specified/determined input and output ranges (and thus the affine transforms) are possible. In general, any input range affine transforms can work because those transforms are implemented directly prior to the activation function. However, output range affine transforms are decoded in one or more subsequent layers and thus can be dependent on the core computations of those subsequent layers. In addition, as described further below, some layers put requirements on the output transforms of the prior layers that generate activations used by those layers. For instance, element-wise addition layers require that the input layers have the same scaling factor on their encoding transforms in some embodiments, while element-wise multiplication layers require that the input layers have affine transforms with zero shift factor. If an invalid affine transform is detected, some embodiments provide a notification or warning to the user.

Figure 5:
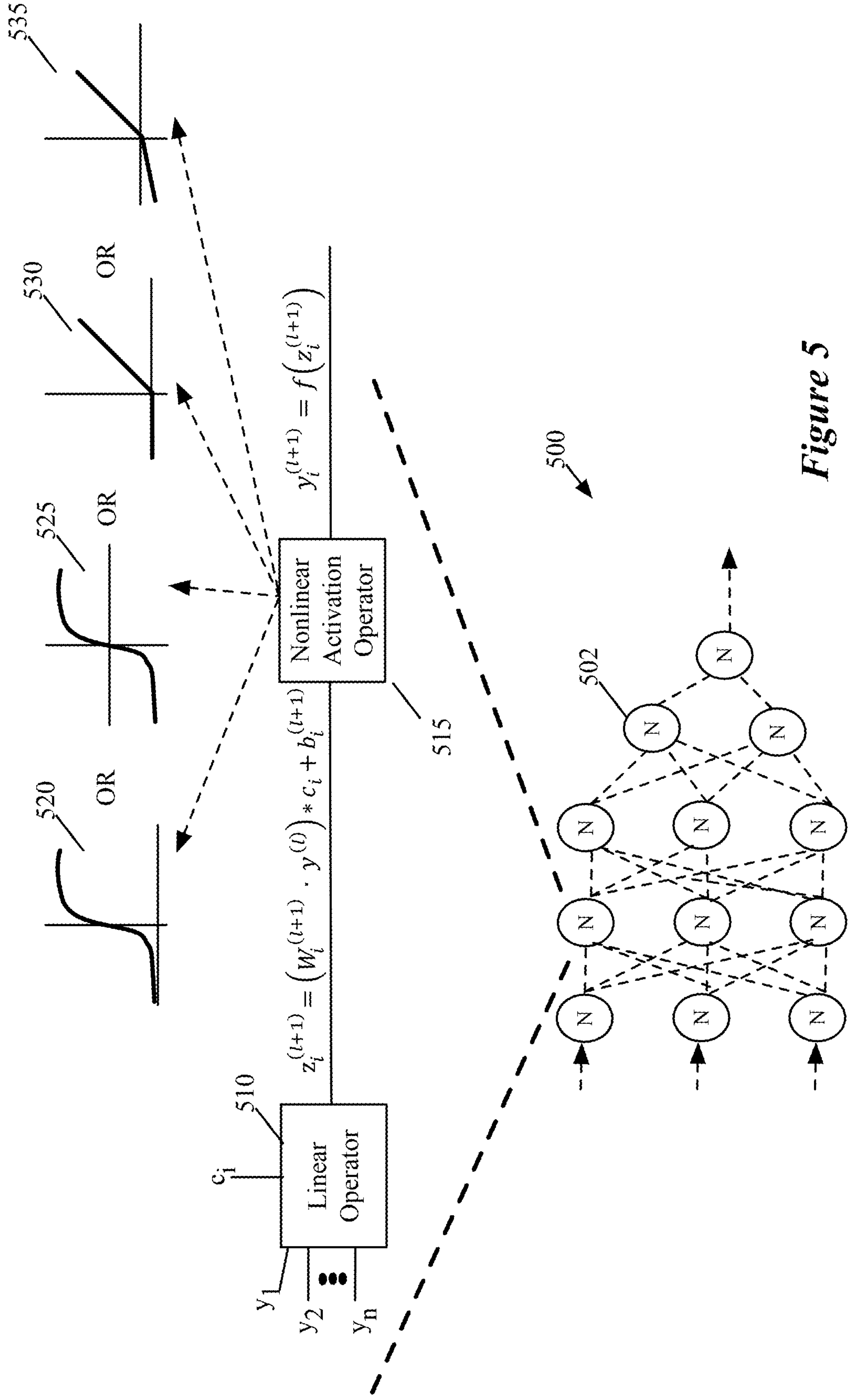
FIG. 5 illustrates an example of a multi-layer machine-trained network of some embodiments.

Before describing the neural network inference circuit of some embodiments and additional details on the encoding and decoding affine transforms, neural networks of some embodiments will be described in more detail. FIG. 5 illustrates an example of a multi-layer machine-trained network of some embodiments. This figure illustrates a feed-forward neural network 500 that has multiple layers of processing nodes 502 (also called neurons). In all but the first (input) and last (output) layer, each node 502 receives two or more outputs of nodes from earlier processing node layers and provides its output to one or more nodes in subsequent layers. The output of the node (or nodes) in the last layer represents the output of the network 500. In different embodiments, the output of the network 500 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

In this example, the neural network 500 only has one output node. Other neural networks of other embodiments have several output nodes that provide more than one output value. Furthermore, while the network 500 includes only a few nodes 502 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 500 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, element-wise operation layers, fully-connected layers, and/or normalization layers. The convolutional layers of some embodiments use a small kernel (e.g., 2×2, 3×3, 5×5, etc.) to process blocks of input values (output values from a previous layer) in a set of two-dimensional grids (also referred to as input channels or input feature maps) with the same set of parameters. The kernels (also referred to as filters) are three-dimensional, and multiple kernels are used to process each group of input values in a layer (resulting in a set of three-dimensional output grids, also referred to as output channels or output feature maps). Element-wise operation layers typically combine values from two previous layers using, e.g., addition or multiplication. Pooling layers combine clusters of outputs from one layer into a single node at the next layer, as part of the process of reducing an image (which may have a large number of pixels) or other input item down to a smaller size (e.g., a vector output). In some embodiments, pooling layers can use max pooling (in which the maximum value among the clusters of node outputs is selected) or average pooling (in which the clusters of node outputs are averaged).

Figure 6:
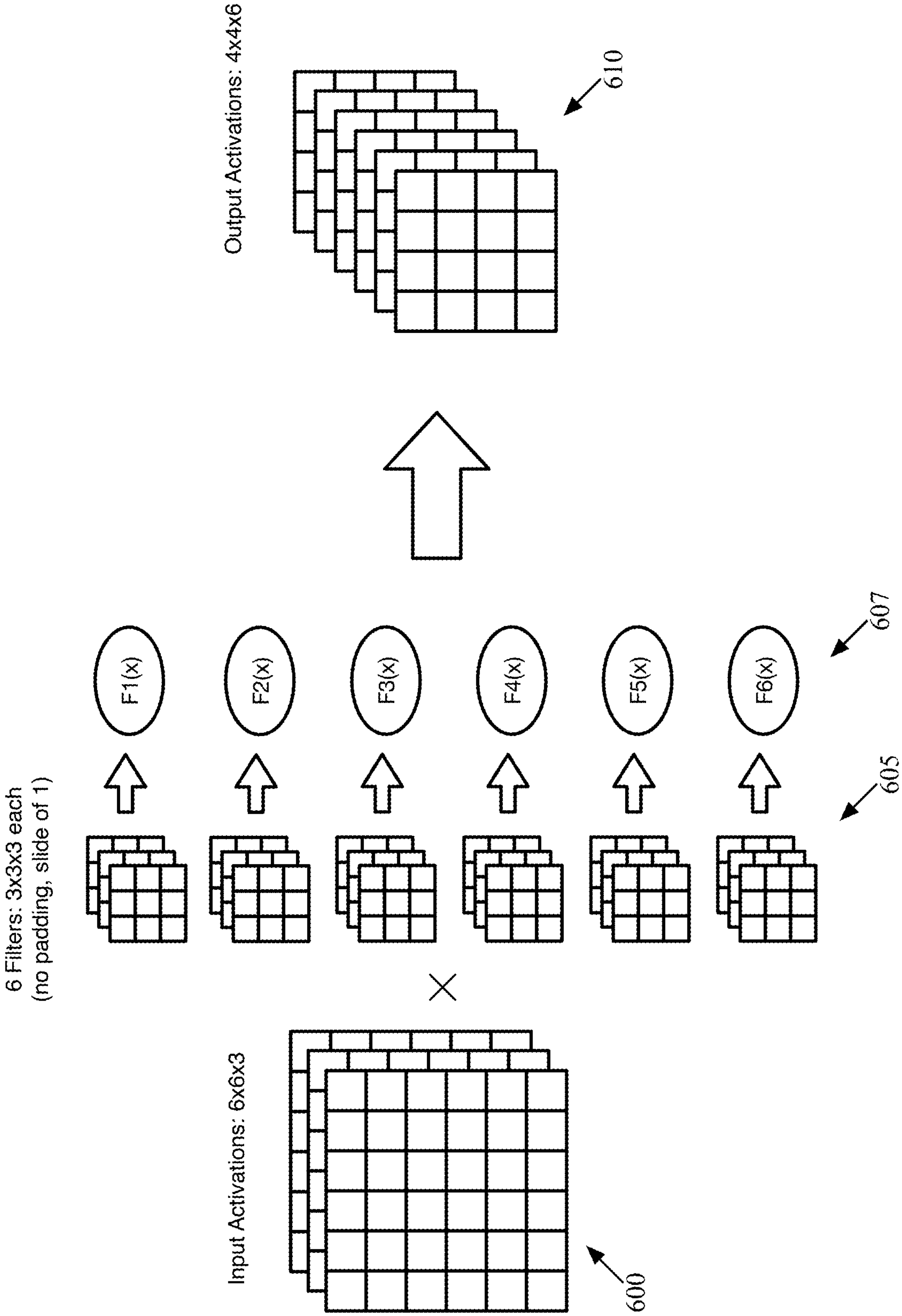
FIG. 6 conceptually illustrates a representation of a convolutional layer of a convolutional neural network.

FIG. 6 conceptually illustrates a representation of a convolutional layer of a convolutional neural network. The convolutional layer receives a set of input activation values 600 organized as a three-dimensional array. This three-dimensional array is typically either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, also referred to as input feature maps or input channels for the layer, as shown in the figure. In this example, the dimensions of the input values are 6×6×3 (i.e., three 6×6 input channels).

Each computation node of the convolutional layer involves a linear component (e.g., a dot product followed by scaling and bias functions) as well as a non-linear component (the activation function). The input to each computation node is a subset of the input activation values, and the dot product for the computation node involves multiplying those input activation values by the weights that make up one of the filters of the layer. As shown, in this example the layer includes six filters 605, each of which is 3×3×3. Each value in one of the filters is a weight value that is trained using various techniques (some of which are described herein). Thus, in the example shown in this figure, each filter includes 27 trainable weight values.

The size of the filters in the x and y directions can vary (3×3 and 5×5 are common sizes), but in some embodiments the depth is required to match the depth of the input activations (in this case there are three input feature maps, or channels, so the depth of the filters is three). The number of filters in a given layer can also vary; in general, each filter is attempting to identify the presence or extent of a particular feature in the input values. For instance, in image analysis, a filter in an early layer might test for the presence of an edge in a particular direction while a filter in a later layer tests for the presence of a more specific object type in the image (e.g., a nose).

To generate the output activations, each of the filters 605 is applied to numerous subsets of the input activation values 600. Specifically, in a typical convolution layer, each 3×3×3 filter is moved across the three-dimensional array of activation values, and the dot product between the 27 activations in the current subset and the 27 weight values in the filter is computed. This process starts in the top left corner (e.g., x=0-2, y=0-2) of the grid, and includes the full depth of the array. The filter moves across the rows, in this case using a slide of 1 (i.e., moving one column per computation node, such that the second dot product uses activations at x=1-3, y=0-2). When the end of a row is reached, the filter is moved back to the first columns (i.e., x=0-2) and down one row (i.e., y=1-3), and so on until the bottom right corner of the array is reached. Though not the case in this example, some embodiments use zero-padding at the edges of the grids (e.g., to allow for better detection of features at the edges of images).

Each computation node, in some embodiments, involves this dot product as well as the subsequent operations to generate the output activation values. The linear component includes any scale and/or bias calculations, and the non-linear component involves applying an activation function to the output of the linear component. As shown in the figure, each filter 605 has an associated activation function 607. In some embodiments, the activation function associated with a particular filter is the function applied to the output of the linear component of each computation node that uses that particular filter. Different embodiments may use the same activation function for all filters of a layer (and therefore all nodes in the layer) or have different activation functions associated with different filters (e.g., different types of activation functions or activation functions of the same type but with different parameters). Some examples of these activation functions are described above by reference to FIGS. 2-4.

The output activation values 610 are arranged in a 4×4×6 array in this example. The outputs from a single filter are arranged in a single grid (also referred to as an output feature map or output channel), and because the example has six filters 605, the output activations have six output feature maps. Using a slide value of 1 with no zero-padding results in a 4×4 output feature map for each filter. These output activation values 610 are then the input activation values for the next layer of the neural network.

Returning to FIG. 5, each node in the neural network 500 has a linear component 510 and a nonlinear component 515. The linear component 510 of each hidden or output node in this example computes a dot product of a vector of weight coefficients and a vector of output values of prior nodes (i.e., as described above for convolutional layers), multiplies this by a scaling value (which may be set to 1), and adds an offset. In other words, in a convolutional or fully-connected layer, a node's linear operator computes a scaled weighted sum of its inputs (which are outputs of the previous layer of nodes) plus an offset (also referred to as a bias). Similarly, the linear component 510 of each input node of some embodiments computes a dot product of a vector of weight coefficients and a vector of input values, scales this dot product, and adds an offset. In other embodiments, each input node receives a single input and passes that input as its output. Each node's nonlinear component 515 computes an activation function based on the output of the node's linear component 510 to generate the node output (also referred to as an activation value), which is then used as input to the next layer of nodes.

The notation of FIG. 5 can be described as follows. Consider a neural network with L hidden layers (i.e., L layers that are not the input layer or the output layer). The variable can be any of the hidden layers (i.e., $l \in \{1, \ldots, L-1\}$ index the hidden layers of the network, with $l=0$ representing the input layer and $l=L$ representing the output layer). The variable $$z_i^{(l+1)}$$

represents the output of the linear component 510 of a hidden node i in layer l+1. As indicated by the following Equation (2), the variable $$z_i^{(l+1)}$$

is computed as the dot product of a vector of weight value $$W_i^{(l+1)}$$

and a vector of outputs $y^{(l)}$ from layer l multiplied by a scaling value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n} \left(w_{ik}^{(l+1)} * y_k^{(l)}\right) * c_i + b_i^{(l+1)}. \quad (2)$$

The scaling value $c_i$ is a value to which all the weight values for the node are normalized. In some embodiments, the scaling value $c_i$ is 1. The symbol * is an element-wise product, while the symbol • is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments require that at least a threshold percentage of the weight values (for a given layer or for the entire network) are equal to zero (e.g., 75%, 80%, etc.).

The output $y_i^{(l+1)}$ of the nonlinear component 515 of a node in layer l+1 is a function of the node's linear component, and can be expressed as by Equation (3) below:

$$y_i^{(l+1)} = f\left(z_i^{(l+1)}\right). \quad (3)$$

In this equation, f is the nonlinear activation function for node i. Examples of such activation functions include a sigmoid function 520 ($f(x)=1/(1+e^{-x})$), a tanh function 525, a ReLU (rectified linear unit) function 530, a leaky ReLU function 535, a swish function (shown above), etc. In some embodiments, the activation functions can be other types of functions, like cup functions, periodic functions, piecewise linear functions, etc.

Equation (3) can be expressed in the following expanded format of Equation (4):

$$y_i^{(l+1)} = f\left(z_i^{(l+1)}\right) = f\left[\left(\sum_{k=1}^{n} w_{ik} * y_k\right) * c_i + b_i^{(l+1)}\right]. \quad (4)$$

In this equation, $w_{ik}$ are weight values associated with the inputs $y_k$ of the node i in layer l+1.

Before a multi-layer network (e.g., a convolutional neural network) can be used to solve a particular problem, the network is put through a supervised training process that adjusts the network's configurable parameters (e.g., the weight values, biases, etc.). The training process iteratively selects different input value sets with known output value sets. For each selected input value set, the training process typically (1) forward propagates batches of input value sets through the network's nodes to produce a computed output value set and then (2) backpropagates a gradient (rate of change) of a loss function (output error) that quantifies in a particular way the difference between the input sets' known output value sets and the input sets' computed output value sets, in order to adjust the network's configurable parameters (e.g., the weight values, biases, etc.). Some such embodiments use the alternating direction method of multipliers (ADMM) to handle the quantization of the weight values (which includes performing forward and backward propagation) and to ensure that at least a threshold percentage of the weight values are set to zero.

In some embodiments, at the end of the training of the network, each of the weights is restricted to a set of allowed quantized weight values (e.g., the set {0, 1, −1} or {0, $\alpha_k$, $-\alpha_k$}, where $\alpha_k$ is a scale value that varies for different layers or filters). In addition, in some embodiments, the training is further complicated because the output values of each layer are quantized (e.g., to a particular number of bits), as described above. The combination of (i) weight quantization (e.g., ternarization), (ii) weight sparsity (ensuring that a threshold of the weight values are equal to zero), and (iii) output value quantization allows for the network to be implemented by a specialized neural network inference circuit of some embodiments that puts restrictions on the weight and intermediate layer output value sizes in the interest of power and memory savings. However, these features (weight and output value quantization) also make training the network more complicated.

The training process for the weights of the MT network involves, in some embodiments, (i) initially training the layers without restricting the weights to allowed sets of values (e.g., training the weights as floating-point values using a standard stochastic gradient descent (SGD) operation), (ii) gradually accounting for the quantization of intermediate layer output values (activation values), and then (iii) using these initially-trained values for the weights to determine the sets of allowed values for each layer and train the weights as restricted to their respective sets of allowed values. After training, each weight value for each node in a given layer will have an assigned weight value that is one of the allowed values for the layer. In some such embodiments, the set of allowed values has two allowed values of {0, α} or three allowed values of {0, α, −α}. The value a can vary between layers or even filters ($\alpha_k$ may be used to indicate the allowed scale value for the layer k, or between filters within a layer).

During training, various techniques are used (e.g., as factors in a loss function that measures network output accuracy and is used to adjust the weight values and other parameters) to constrain the weights to their respective allowed values and, in some embodiments, to ensure that at least a threshold percentage of the values are set to 0. For instance, some embodiments use the alternating direction method of multipliers (ADMM) technique to apply the weight values for each quantized layer (including the decomposed layers) to their respective sets of allowed values. Specifically, for ADMM training, some embodiments project the floating-point weight values onto the allowed quantized weight values using a loss function that measures error based on the difference between the projected weight values and the quantized weight values as well as the relative importance of the weights. This projection operation also imposes a sparsity constraint, in some embodiments, requiring that at least a particular percentage of the quantized weight values be set to zero (e.g., by pushing to zero those weights for which the penalty to the loss function for doing so is smallest). After the projection operation, some embodiments perform a “dual-update” operation that updates Lagrange multipliers used in the loss function, then performs additional training by converting the quantized weight values back to floating-point values and performing SGD training. The loss function used for this SGD training, in some embodiments, includes a loss-aware ADMM penalty term that pushes the weights towards the quantized weight values.

As mentioned, the training of some embodiments is specialized so as to enable execution of the network by a specific type of neural network inference circuit with ternarization and sparsity requirements. Such a neural network inference circuit is part of an integrated circuit (IC) in some embodiments. The ICs of some embodiments are configurable to implement different networks trained to perform a particular function, and such networks may include encoding and decoding affine transforms. For instance, the ICs may implement networks for object or facial recognition in images, voice recognition in audio samples, etc. The IC of some embodiments includes a set of input processing circuits, a neural network computation fabric that can be configured to apply a neural network to an input, and a microprocessor (e.g., for controlling the input processing circuits and configuring the neural network computation fabric).

Figure 7:
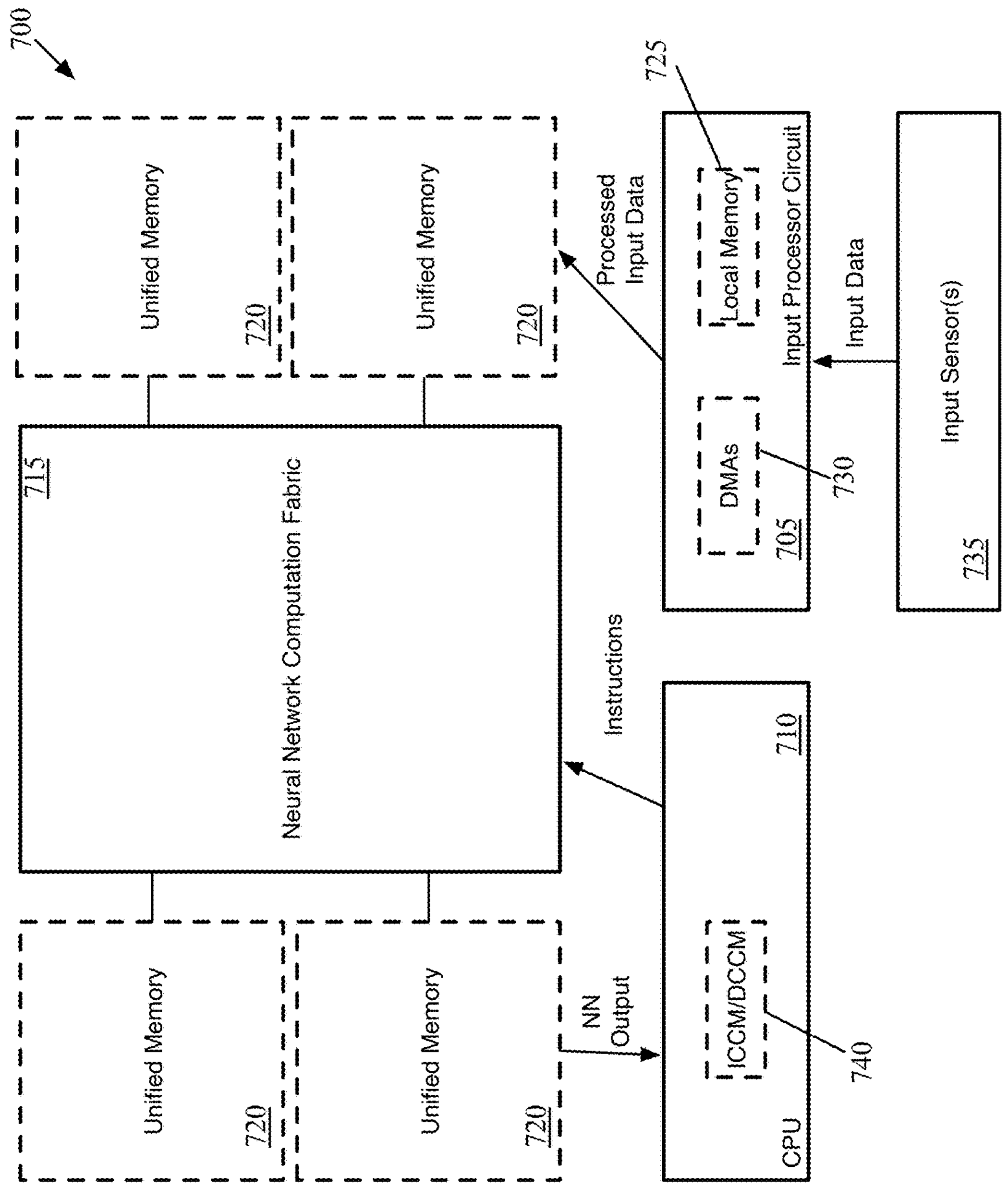
FIG. 7 conceptually illustrates an integrated circuit of some embodiments.

FIG. 7 conceptually illustrates such an IC 700 of some embodiments. As shown, the IC includes an input processor circuit 705, a microprocessor (CPU) 710, a neural network computation fabric 715, and a set of unified memory 720. In addition, the input processor circuit 705 includes local memory 725 (e.g., a small amount of memory for input processing instructions) and direct memory accesses 730 (which enable the input processing circuit 705 to access the unified memory 720 without CPU involvement). The CPU 710 includes closely coupled memory 740 for instruction (ICCM) and data (DCCM) which can be used for booting up the IC (e.g., boot loaders and/or firmware are loaded out of ROM (not shown) into the ICCM and/or DCCM), as well as typical components for accessing the unified memory.

The unified memory 720, as mentioned, is shared by the CPU 710, the input processor circuit 705, and the neural network computation fabric 715. This unified memory 720 is shown in four blocks in this figure; as described below, in some embodiments the neural network computation fabric includes multiple cores that each access their own respective portions of the unified memory. In some embodiments, the unified memory 720 is made up of banks of SRAMs. In addition, the unified memory includes multiple interfaces for the different circuits 705-715 to access the memory for read/write operations. In some embodiments, the unified memory includes direct access ports for the cores of the computation fabric 715 to access their associated memory banks, as well as a separate interface for enabling the CPU 710 and input processor circuit 705 to access all of the memory banks.

In some embodiments, the IC is integrated into a device (such as an Internet of Things (IOT) device) with one or more input sensors 735. These input sensors can include cameras (e.g., for capturing video images on which the neural network computation fabric 715 performs face or object recognition, etc.), microphones (e.g., for capturing audio on which the neural network computation fabric 715 performs voice recognition, speech processing, etc.), or other types of input sensors. In other embodiments, the input sensors 735 are located on a separate device that is linked with the IC 700.

In some embodiments, at bootup of the IC 700, the firmware loads a neural network program object. This causes the CPU 710 to load neural network configuration data (e.g., weight values, scale and bias parameters, lookup table masks for each layer, memory locations for the weight and input values to use for computing each layer of the network, etc.) from off-chip storage and to store weight values and instruction arguments (e.g., indicating affine transform shifts and scales) to the unified memory 720. In different embodiments, the weight values and/or instruction arguments may be stored in the unified memory 720 by the CPU 710 directly or by the CPU 710 generating instructions for the neural network computation fabric 715 to write this data (the weight values and/or instruction arguments) to the unified memory 720. Some embodiments, rather than storing instruction arguments in the unified memory 720, instead use a specific memory local to the computation fabric 715 to store instruction arguments. However, the benefit of using the unified memory 720 for this purpose is that doing so allows for larger networks (e.g., with more layers that would require more instruction arguments).

In addition, the CPU 710 loads the neural network program instructions for the computation fabric to its own memory 725. These instructions are applied by the computation fabric 715 to input data in order to execute the neural network. These runtime instructions include, e.g., indications as to which pre-loaded sets of instruction arguments 745 to use for each set of calculations (affine transforms, activation functions, etc.).

The input processor circuit 705 receives input data (e.g., still images or video frames, sounds, etc.) from the input sensor(s) 735, and processes these according to processing instructions received from the CPU 710 or stored in local memory 725. These instructions identify, in some embodiments, any sort of initial processing to apply to the raw data (e.g., decompression of compressed data, etc.), if any, as well as how to store the input data in the unified memory 720 to be read by the computation fabric 715. Because the input processor circuit 705 and the computation fabric 715 share the unified memory 720, the input data does not need to be copied from one circuit's local memory to another. Instead, the input processor circuit 705 stores an input once into the unified memory 720 and the computation fabric 715 reads the input from the same location in the unified memory 720. For an image, e.g., the storage instructions might specify the specific location that pixel values (e.g., RGB values) should be arranged and stored in the unified memory 720. The input processor circuit 705 also sends signals to the CPU 710 to indicate when it has fully buffered an input (e.g., a frame of video) so that the input can be read by the computation fabric 715.

In addition to instructing the input processor circuit 705 how and when to store input data for use by the computation fabric 715, the CPU 710 provides the neural network program instructions to the computation fabric. In some embodiments the CPU 710 provides these instructions in stages (e.g., one layer or portion of a layer at a time). Once the final output of the neural network is computed, the fabric 715 stores this output in the unified memory 720, so that the CPU (or other circuitry on the device) can perform post-processing operations on the output (e.g., evaluate the output and perform any actions based on the output).

The computation fabric of some embodiments provides a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, $\alpha$, and $-\alpha$ for each layer and/or filter of the network), and/or that at least a particular percentage of the weight values be equal to zero.

Figure 8:
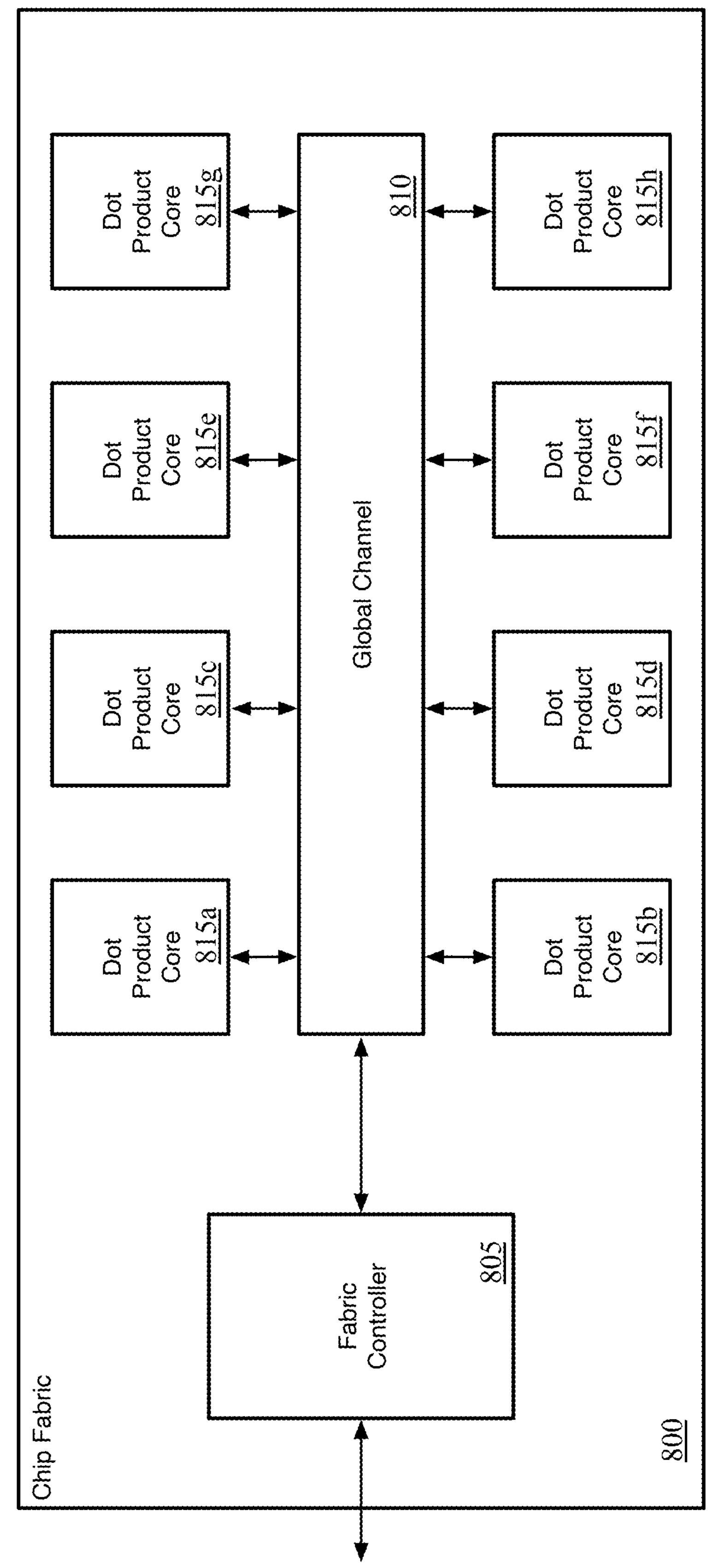
FIG. 8 conceptually illustrates the neural network computation fabric of some embodiments.

FIG. 8 conceptually illustrates the neural network computation fabric 800 (also referred to as the neural network inference circuit, chip fabric, or neural network accelerator) of some embodiments. The chip fabric 800 of some embodiments includes a fabric controller 805, a global channel 810, and a set of dot product cores 815*a-h*. The connections between the various components 805-815 represent the flow of both control data (e.g., configuration data for a particular neural network layer) and computation data at runtime in some embodiments.

The fabric controller 805 is responsible for managing the operation of the rest of the chip fabric 800 (e.g., the dot product cores 815) in some embodiments. The fabric controller 805 loads instruction arguments (e.g., weight and activation value locations, which cores to use for a particular computation, etc.) from the unified memory (or a local memory on the chip) based on instructions received from the CPU, maps instructions into a sequence of memory-mapped register writes, synchronizes the downstream controllers (e.g., controllers for the various cores 815), etc. The instructions managed by the fabric controller 805 are configured at compile time, in some embodiments, based on the parameters of the network being implemented by the chip fabric 800. In some embodiments, the fabric controller 805 interacts with the microprocessor of the IC as well (i.e., the fabric controller 805 handles the communication with the CPU 710 shown in FIG. 7). During execution of the neural network in some embodiments, the fabric controller 805 receives instructions as opcodes along with pointers to the location in the unified memory (or local memory) of the arguments for that opcode. The fabric controller retrieves these arguments in order to determine the full instruction. Because some instructions can have dozens of arguments and the same instructions are sent each time the network is executed for a new input (e.g., many times per second), storing the arguments locally (rather than the CPU sending the arguments with each instruction) saves processing power and system bus bandwidth.

The chip fabric also includes numerous dot product cores 815*a-h* as well as a global channel 810 that connects the cores, with these data processing circuits configured by the fabric controller (and a set of hierarchical control circuits, in some embodiments). These data processing circuits 810 and 815 operate to compute neural network operations in an efficient, low-power manner, according to the configuration data provided by the control circuits.

The dot product cores 815*a-h* include circuitry for computing partial dot products in some embodiments, which is described in further details below. In some embodiments, this circuitry includes memory and/or buffers for storing weights and activations, controllers for reading these values out of memory, and adder trees for computing the partial dot products based on the weight and activation inputs. The core memory, controllers, adder trees, and other core circuitry of some embodiments are described below in greater detail.

The global channel 810 is responsible for providing a communications bus for control and computation data between the fabric controller 805 and the cores 815, as well as from one core to another. The global channel 810, among other operations, accumulates partial dot products from multiple cores when computing dot products that require more computations than can be performed in a single core, and performs post-processing on these dot products (including application of decoding and encoding affine transforms). The global channel also performs certain non-dot product operations, such as element-wise and pooling operations.

In addition, the global channel 810 carries activations (i.e., computation node outputs) after post-processing for storage (and for use as inputs to subsequent computation nodes) in other cores 815. In some embodiments, the global channel 810 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 810, as described further below.

The chip fabric 800 of some embodiments computes numerous neural network computation nodes simultaneously, with the computation for one node often spread across multiple cores (and subsequently the global channel). In some cases, if a neural network layer is small enough, then computation for that layer may be confined to a single core 815. However, if multiple cores are used for a given layer (any number of cores may be used in some embodiments), then each dot product computed for that layer is spread across all of the cores 815 in use.

That is, for a dot product computed across more than one core 815, each of these cores computes a partial dot product from a subset of the input values and weight values for the node, then provides these partial dot products to the global channel 810. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

In the simplest case, all of the partial dot products are computed in the same clock cycle and provided at the same time to the global channel 810. In some cases, however (e.g., for dot products with a very large number of terms or using larger than standard activation values, or when filters have too many nonzero weight values), each core 815 computes more than one partial dot product for a single computation node, requiring multiple clock cycles (also referred to as time-multiplexing of the dot products). Based on configuration data specifying which outputs from the cores are to be added together (and whether multiple partial dot products are required from the same core), the global channel 810 aggregates these partial dot products to compute the complete dot product for each node, then applies various post-processing functions (e.g., the bias, weight scale, decoding and encoding affine transforms, and activation functions) to compute the output of each node. Some embodiments also apply affine transforms activation functions to the results of the pooling and/or element-wise operations.

In some embodiments, the dot product cores are grouped into clusters, and the global channel includes separate segments for each such cluster. Each of these channel segments includes the same circuitry in some embodiments, with the exception that buses in the first and last channel segments only connect to corresponding buses in one other channel segment while the buses in the intermediate channel segments connect to corresponding buses in two neighboring channel segments.

The data processing circuitry of each of the channel segments includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include affine transforms (e.g., bias, weight scaling, decoding and encoding transforms) and a non-linear activation function. The output of the post-processing circuits is the computation node outputs (activations). The output bus, or activation write bus, carries the outputs of the post-processing circuits to the cores to be stored as inputs for the next computation layer.

Figure 9:
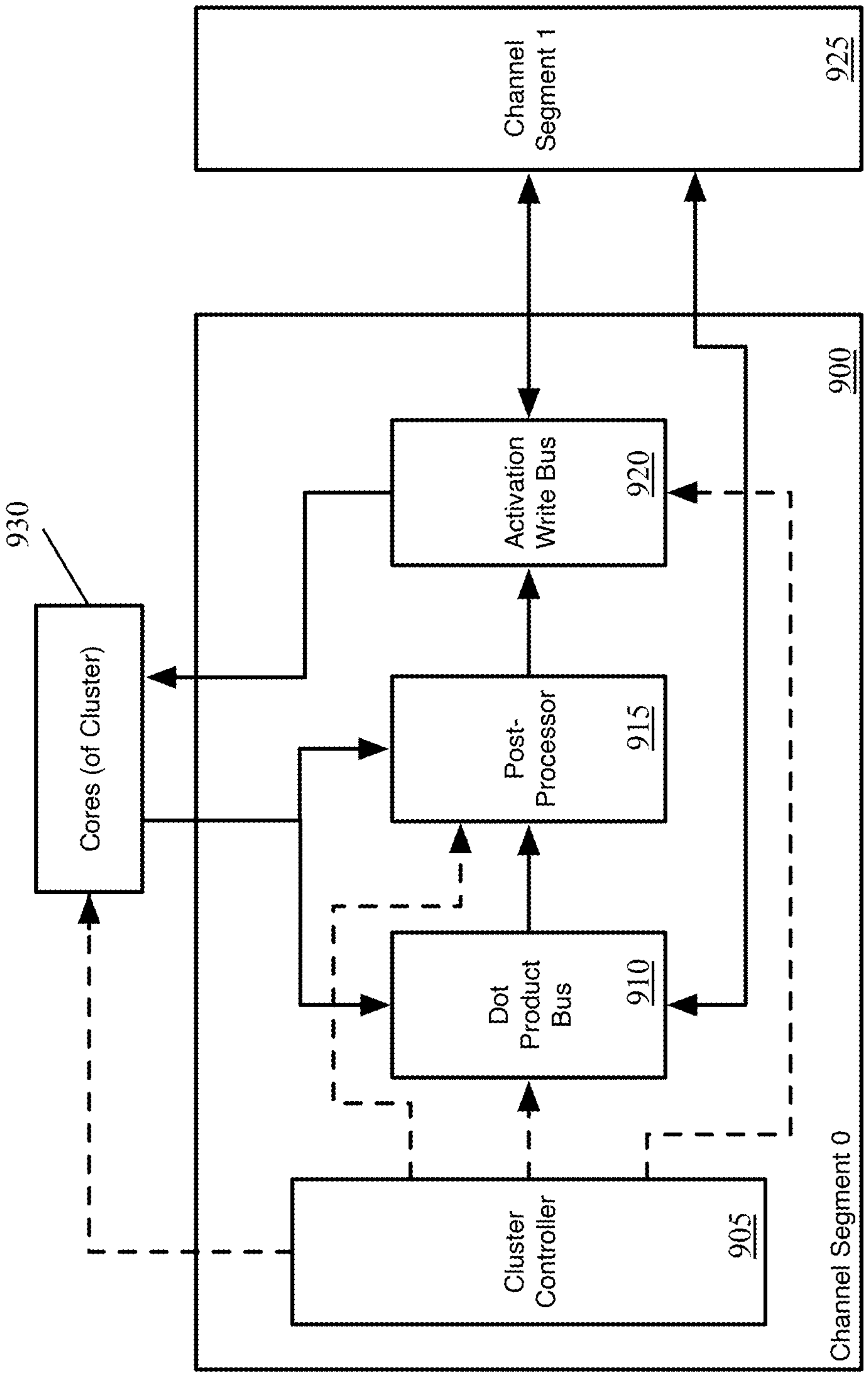
FIG. 9 conceptually illustrates the circuit blocks of a channel segment of some embodiments.

FIG. 9 conceptually illustrates the circuit blocks of a channel segment 900 of some embodiments. The channel segment 900 includes a cluster controller 905, a dot product bus 910, a post-processor 915, and an activation write bus 920 (also referred to as an output bus). In addition to the channel segment 900, the figure also illustrates an additional channel segment 925 and the cores 930 of the local cluster for the channel segment 900, as the circuit blocks of the channel segment 900 exchange dot product and configuration data with these other circuits. In this diagram, the dashed lines represent the flow of configuration data while the solid lines represent the flow of neural network computation node data.

The cluster controller 905 configures the dot product bus 910, post-processor 915, and activation write bus 920 as per the configuration instructions received from the fabric controller in some embodiments. For the dot product bus 910 (assuming the layer is a convolutional or fully-connected layer such that dot products are computed), this configuration data specifies, in some embodiments, (i) which partial dot products are to be added together as part of the same neural network computation node and (ii) to which post-processing unit each aggregated dot product is sent (the post-processor 915 of some embodiments includes numerous post-processing units with the same circuitry). In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 915, the configuration data of some embodiments indicates (for each of the post-processing units) whether a dot product computation node or other computation node (e.g., pooling, element-wise operator) is being executed, the affine transform shift and scale factors (which collectively include decoding, encoding, and other transforms), the activation function to use (which may be specified, e.g., as a lookup table or a piecewise linear function), as well as other data. For the activation write bus 920, the configuration data indicates to which cores each output value is to be delivered, in some embodiments.

As mentioned, the solid lines indicate the flow of neural network computation data, for a node in a convolutional or fully-connected layer. The cores 930 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these active cores.

These partial dot products are output to the dot product bus 910, which aggregates the partial dot products from the cores 930 of the local cluster. The dot product bus 910, in some embodiments, includes a number of independent dot product bus lanes that each receives partial dot products from the cores, aggregates these together, and provides the aggregated dot products to the post-processing circuits. In some embodiments, each lane of the dot product bus corresponds to (i) one of the adder trees in each of the cores (i.e., dot product bus lane N receives the partial dot products from each of the adder trees of index Nin the cores), (ii) one of the post-processing units in each of the clusters (i.e., dot product bus lane N provides its aggregated output to the post-processing unit N in one of the clusters, as specified by the configuration data), and (iii) one lane of the activation write bus.

Each lane of the dot product bus 910 spans all of the channel segments, and the dot product bus lanes in each channel segment aggregate the partial dot products from the cores of its local cluster. The dot product bus 910 in the channel segment 900 also exchanges locally-aggregated dot products with its neighboring segments for further aggregation if needed (i.e., if the source cores for the dot product computation span multiple clusters). In this case, the channel segment 900 only has one neighboring segment, but internal channel segments will have two such neighboring segments. The configuration data from the cluster controller 905 specifies whether to send these dot products in one direction or the other along the global channel for each dot product bus lane, or to aggregate the dot products from the neighboring channels locally, depending on where post-processing will occur for each dot product.

The post-processor 915 includes numerous post-processing units that receive the dot products from their corresponding dot product bus lane and perform the non-dot product functions of the neural network computation nodes. For a typical computation node of a convolutional (or fully-connected) layer, these functions include an addition operation and a multiplication operation that collectively apply an affine transform to the dot products as well as the non-linear activation function. These affine transforms account for decoding of the dot products (if encoding transforms have been applied to the input values for the dot products), learned affine transforms, and re-encoding of the dot products for input to the subsequent activation functions. In some embodiments, the outputs of the linear function are quantized or truncated to a particular number of bits (e.g., 4 bits, 5 bits, 8 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design. The non-linear activation function, in some embodiments, is implemented as a lookup table or a configurable piecewise linear function rather than a hardwired function. This enables the IC to execute different neural networks that use different activation functions and, in some embodiments, allows for different activation functions to be used in different layers of the neural network or for different filters within a layer.

The activation write bus 920 receives the computation node activation outputs from the post-processing units and carries these outputs back to the cores 930, to be stored in the memory of the core and used as inputs for the computation nodes of the next layer of the neural network. The activation write bus connects to the cores 930 in the local cluster as well as the activation write bus in the neighboring channel segment 925. As with the dot product bus 910, the activation write bus 920 of some embodiments includes lanes, with each post-processing unit of the post-processor 915 sending its output to a different one of these lanes.

In some embodiments, the output values may be computed by the post-processor 915 in one cluster but carried by the activation write bus 920 to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value. The activation write bus 920 also includes a right shift circuit for each core that is used to align the output values for the core, in order for the values to be stored in contiguous blocks within the core RAM.

Figure 10:
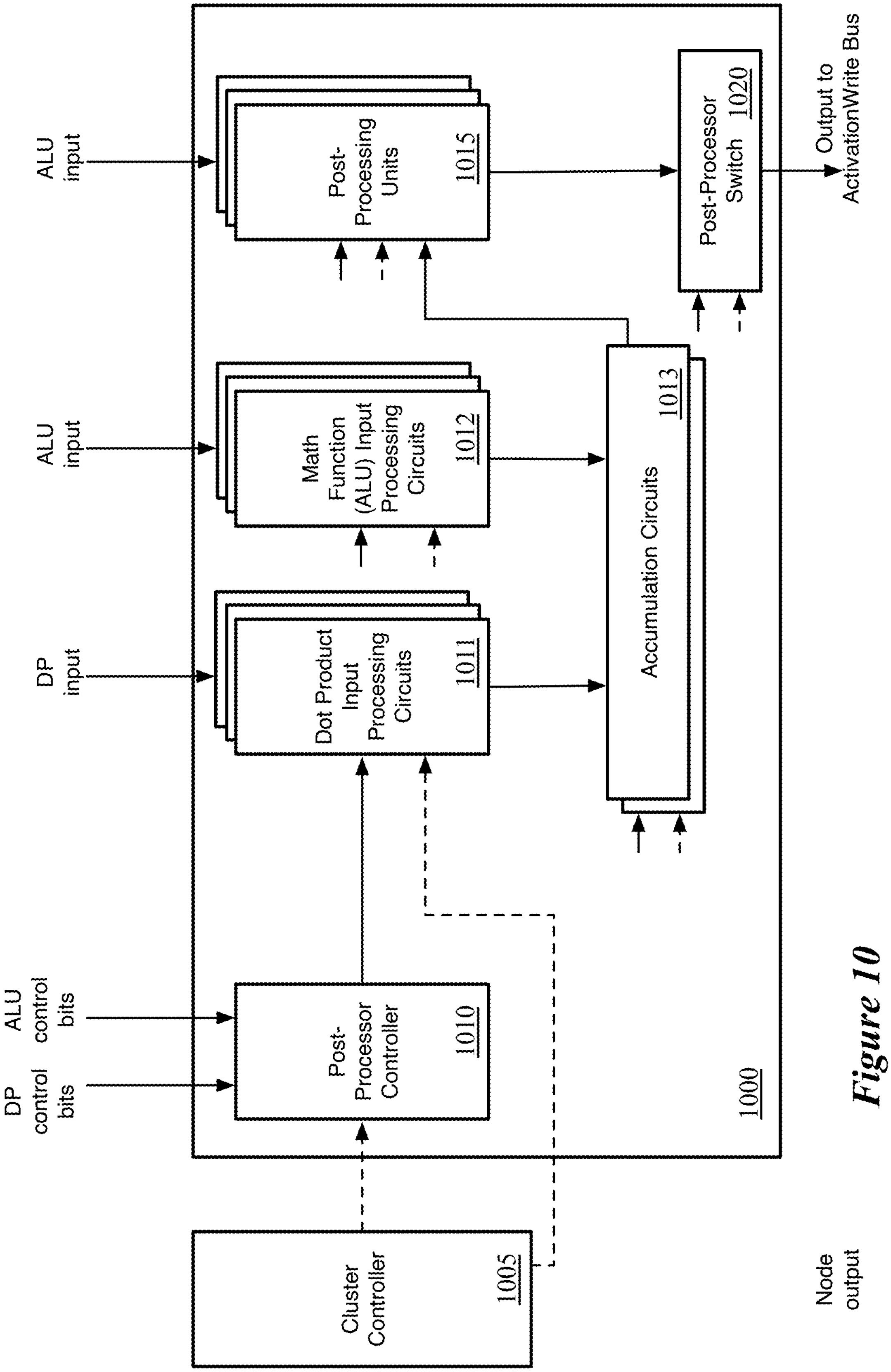
FIG. 10 conceptually illustrates the post-processing circuit block for a channel segment of some embodiments, along with the local cluster controller that provides configuration data to this post-processor.

Now that the primary circuit blocks of the global channel have been introduced, some of these circuits of some embodiments will be explained in greater detail. FIG. 10 conceptually illustrates the post-processing circuit block 1000 for a channel segment of some embodiments, along with the local cluster controller 1005 that provides configuration data to this post-processor 1000. As shown, the post-processing circuit block 1000 includes as sub-blocks a post-processor controller 1010, a set of dot product input processing circuits 1011, a set of math function (ALU) input processing circuits 1012, a set of accumulation circuits, a set of post-processing units 1015, and a post-processor switch 1020. The cluster controller 1005 provides configuration data to some or all of these sub-blocks in order to synchronize operations and to provide these sub-blocks with configuration data for a current layer.

The post-processor controller block 1010 aggregates control signals from the dot product bus (e.g., for convolution and fully-connected layers) as well as the ALU bus from the cores (e.g., for pooling, copy, element-wise, and/or activation by activation matrix multiplication operations). These control bits include accumulate and valid signals for the dot product bus (which indicate to the post-processor whether the incoming data is a final dot product, as dot products are not sent every clock cycle) as well as accumulate, valid, and end of row signals for the ALU bus. The ALU bus carries activation values directly from the cores without having dot products performed, to be used for pooling and element-wise operations. The accumulate and valid signals indicate to the post-processor whether the incoming ALU data is to be used, while the end of row signals indicate that different configuration data should be used for certain post-processing operations when the end of a row of input values is reached (e.g., on account of padding, etc.). The post-processor controller block 1010 aggregates these signals, as mentioned, and outputs signals to the post-processing units 1015 to indicate when the post-processing units are receiving valid dot product or ALU data. Each of the sub-blocks 1011-1020 is shown as receiving configuration and/or control signals from both the cluster controller 1005 and the post-processor controller 1010, but it should be understood that in some embodiments some or all of the circuit sub-blocks actually only receive data from one or the other of these controllers 1005 and 1010.

The post-processor 1000 includes numerous dot product input processing circuits 1011, math function input processing circuits 1012, and post-processing units 1015. In some embodiments, the post-processor block 1000 within a segment includes the same number of each of these sub-blocks as there are dot product bus lanes and activation write bus lanes (which is also the number of adder trees in each core for computing partial dot products). The dot product input processing circuits 1011 receive dot product inputs from the dot product bus for convolution and fully-connected neural network layers, while the math function input processing circuits 1012 receive activation inputs (ALU inputs) via an ALU bus directly from the cores of its cluster for other types of layers (e.g., pooling, element-wise addition or multiplication, and/or activation by activation matrix multiplication).

In some embodiments, each dot product input processing circuit 1011 receives a single dot product input, from its corresponding segment in the dot product bus. However, to accommodate certain situations in which one or more filter slices assigned to a core is not sparse enough (i.e., too many of the weight values of a portion of the filter used to compute a partial dot product are nonzero), the dot product input processing circuits 1011 of some embodiments each receive two dot product inputs. Specifically, some of the dot product bus lane outputs are sent to two or more of the post-processing units (in some such embodiments, different dot product bus lane outputs are sent to different numbers of post-processing units, with each post-processing unit receiving two such outputs). In some embodiments, each math function input processing circuit 1012 receives a set of activation value inputs, from one core or from multiple cores in its cluster. The math function input processing circuit 1012 uses different inputs depending on the operation the circuit is configured to perform for a given layer.

The dot product input processing circuits 1011 and math function input processing circuits 1012 provide their inputs to a set of accumulation circuits 1013. In some embodiments, these accumulation circuits (i) select whether to pass on data from one or the other of the input processing circuit blocks 1011 and 1012 and (ii) either pass on the selected input data without changing the data or perform accumulation operations across multiple lanes of the selected input data (thereby reducing the number of outputs). These outputs from the accumulation circuits 1013 are provided to the post-processing units 1015, which perform various additional post-processing operations on the data (e.g., scale and/or shift affine transform operations, activation functions). In some embodiments, activation values can also be passed directly from the ALU input to the post-processing circuit output without any computations (e.g., for copy or activation tensor reshaping operations). Some of the details of the post-processing units are described further below by reference to FIGS. 11.

The post-processing switch 1020 of some embodiments compresses the post-processing unit outputs (i.e., the activation outputs) to be sent to the activation write bus. In some embodiments, the chip fabric can be configured for different size activation outputs (e.g., 4-bit, 8-bit, or 16-bit), but the activation write bus requires the outputs to be in contiguous blocks. As such, for output sizes smaller than the maximum, the post-processing switch compresses these together to eliminate the meaningless bits (e.g., compressing two 4-bit activation outputs onto the wires for one 8-bit activation output).

Figure 11:
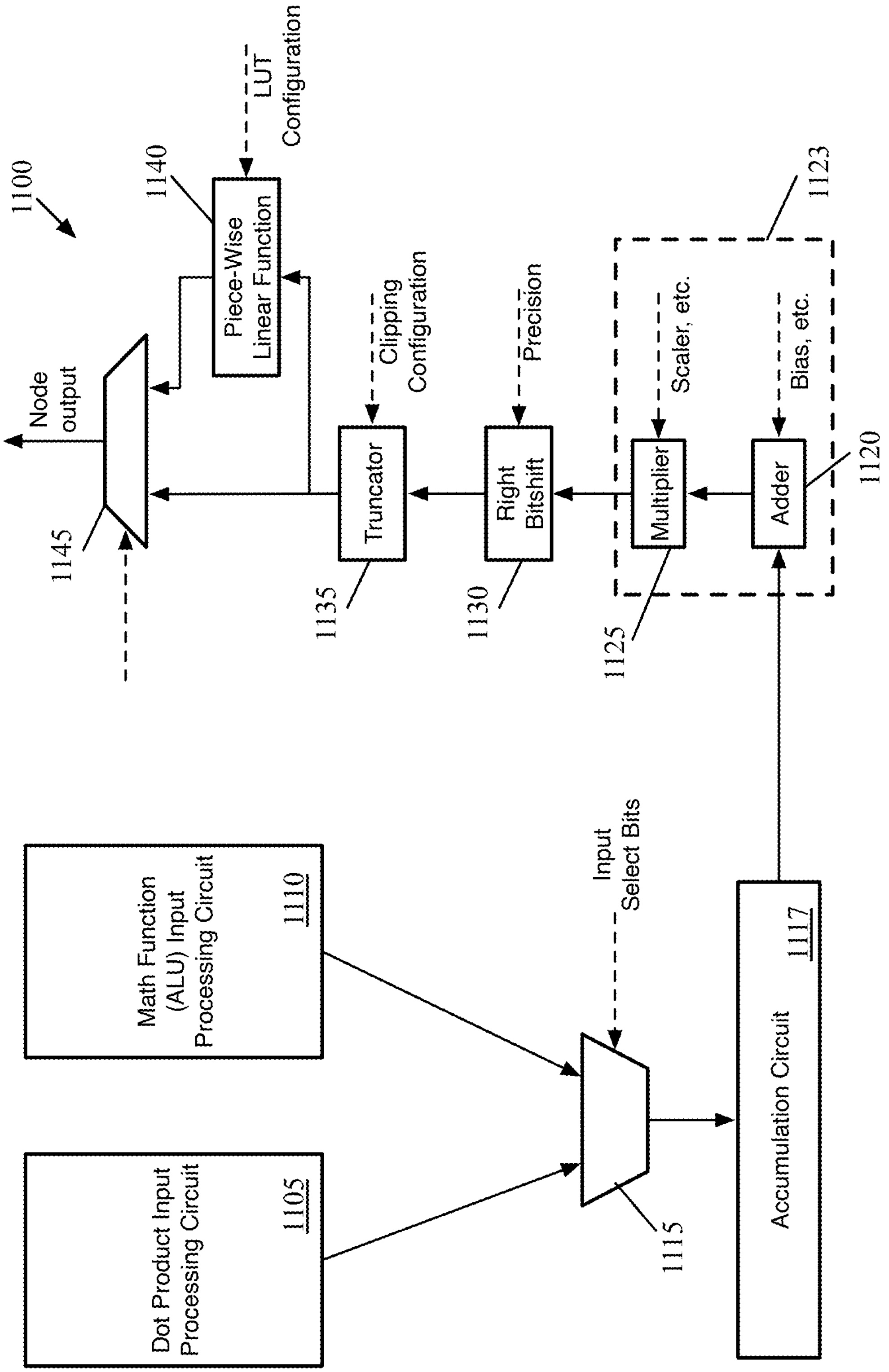
FIG. 11 conceptually illustrates the structure of a post-processing unit of some embodiments.

FIG. 11 conceptually illustrates the structure of a post-processing unit 1100 of some embodiments. As shown, the post-processing unit 1100 includes a dot product input processing circuit 1105, an ALU input processing circuit 1110, a multiplexer 1115 that selects between the outputs of these two circuits, and a set of post-processing operation circuits.

The dot product input processing circuit 1105 is used to combine dot products from two separate cycles if a dot product is too large to be computed in a single cycle across the cores of the computation fabric. In addition, if a particular filter slice needs to be split across multiple cores (because of too many non-zero weight values), the dot product input processing circuit is configured to account for that by using inputs from multiple dot product buses. Furthermore, some embodiments enable dot products to be double the size of the standard quantized output (e.g., 8-bit rather than 4-bit) by using dot products from multiple cycles and bit-shifting the first set of input data.

The math function input processing circuit 1110 is used to perform operations for neural network nodes that do not use dot products (i.e., that are not part of convolutional or fully-connected layers). Neural network computation nodes that do not use dot products include, for example, pooling layers of convolutional networks (e.g., average pooling and max pooling layers) as well as nodes that perform element-wise operations (e.g., multiplication and/or adder circuits for performing multiplication and/or addition operations on multiple input values). In some of these embodiments, the cores provide input values directly to the math function input processing circuits 1110 without computing dot products and the math function input processing circuits are configured to perform the appropriate operations on these inputs.

The output of each of these circuits 1105 and 1110 is sent to a multiplexer 1115, and a set of configuration bits is used to select between these two possible inputs. The selected input value is then sent to an accumulation circuit 1117. Though FIG. 11 shows a single dot product input processing circuit 1105, math function input processing circuit 1110, and post-processing unit 1100, it should be understood that these structures are repeated for each lane of these circuits within a cluster. The accumulation circuit 1117, on the other hand, receives the values from multiple dot product input processing circuits 1105 and math function input processing circuits 1110. Some embodiments include a single accumulation circuit 1117 per cluster that receives all values from all of the dot product input processing circuits or math function input processing circuit while other embodiments include multiple such circuits (e.g., 4 circuits, each receiving data from one-fourth of the input processing circuits). The accumulation circuit of some embodiments can be configured to accumulate data across these inputs, thereby reducing the number of total computed values. The accumulation circuit 1117 can also store intermediate values in a register and accumulate data across multiple clock cycles. The accumulation circuit also can be configured to act as a pass-through, outputting the same number of values that it receives without accumulating across lanes at all.

The value output by the accumulation circuit (in many cases, the unmodified output of either the dot product input processing circuit 1105 or the math function input processing circuit 1110) is sent to affine transform circuit 1123. In some embodiments, the affine transform circuit 1123 includes an adder 1120 followed by a multiplier 1125. The adder 1120 receives (as configuration data) a value (which may be zero, positive, or negative) that is added to the value received from the accumulation circuit 1117. The multiplier 1125 receives (also as configuration data) a value by which the adder output is multiplied.

Collectively, these circuits apply an affine transform of the form mx+b, in which x is the value received from the accumulation circuit 1117. Because the adder circuit 1120 operates on the incoming data first, the addition and multiplication configuration values are not necessarily m and b but are instead other values that are determined during training and/or generation of the programming instructions (e.g., at operations 135 and 140 of FIG. 1). Other embodiments reverse the order of these circuits, with the multiplier circuit performing its operations prior to the adder circuit.

In some embodiments, the configuration values sent to the adder 1120 and multiplier 1125 account for (i) the bias value learned during training of the network, (ii) the weight scaling, (iii) any batch normalization transform learned during training, (iv) a number of negative weight values (for dot products), (v) decoding of any encoding previously applied to the computation node input values as modified by core computations applied to these values (e.g., dot products, element-wise operations), and (vi) encoding of the values for input to the subsequent activation function. It should be noted (as described in more detail below) that the batch normalization transform, in some embodiments, serves to remove the encoding and thus there is no decoding transform necessary.

In some embodiments the weight values are ternary in each layer (i.e., either 0, a positive value, or a negation of that positive value). The partial dot product calculation in the cores treats these ternary weights as {0, 1, and −1}, and uses a ternary MAC circuit that performs one's complement addition to account for negative weights. The addition value in the configuration data then accounts for the number of negative weights, to effectively turn the one's complement addition into two's complement addition. Furthermore, for larger input and output values (e.g., 8-bit input and output values), in which the dot product input processing circuit 1105 left shifts the dot product of the most significant bits of the inputs (e.g., by 4 bits), the bias factor has to add a larger amount for the negative weights. For the 8-bit case (in which the dot product of the weights with the most significant nibble of the inputs is shifted by 4 bits), the bias factor adds 17 for each negative weight.

In some embodiments, a multiplexer is used to select between an added value specific to the post-processing unit (i.e., allowing for different bias/shift values for different computation nodes in a layer) and an added value shared across all of the post-processing units in a layer. In general, convolution and fully-connected layers use a node-specific added value (especially when accounting for the number of negative weights) but pooling and element-wise operator layers may use the same value for all of the nodes (often zero, unless accounting for encoding and/or decoding transforms). For the scaling factor, a set of multiplexers is used in some embodiments to select between a node-specific scaling value and two possible shared scaling values. In some embodiments, pooling layers will use the same shared scaling value for each node (e.g., to divide by the number of nodes over which average pooling is performed), but at the end of a row will need a different scaling value to account for padding.

The right bit shift operator 1130 ensures that, post-multiplication, the value has a specific precision (i.e., shifting the binary point). As an example, a number with three bits before the binary point and two bits after multiplied by a similar such number would result in a number with six bits before the binary point and four bits after. However, if a number with only two bits after the binary point is desired, the right bit shift removes the last two bits. In some embodiments, the right bit shift receives a set of configuration bits that map to different allowed precisions. This use of specific precisions (data types) is part of the reason for using different encoding transforms, so that more optimal ranges of values can be used within the network.

The truncator 1135 performs a clipping operation in some embodiments to truncate the output value of the linear operator down to a desired number of bits. In some embodiments, this can be a 4-bit value, a 5-bit value (e.g., a signed value), an 8-bit value, or a 16-bit value. In such embodiments, the output has 16 wires, and values of less than 16-bits have 0s for the appropriate number of most significant bits. In other embodiments, the maximum output is 8 bits, in which case 4-bit, 5-bit, and 8-bit values are possible outputs. Different clipping operations that may be used, in different embodiments, can include a modulo operation (that effectively zeroes out a particular number of the most significant bits), clipping values above a maximum down to that maximum (e.g., if outputting a 5-bit value, all values above 15 are clipped down to 15 (1111), etc. In some embodiments, the truncator 1135 receives (as output from the right bit shifter 1130) more bits than it outputs (e.g., receiving 32 bits but outputting a maximum of 16 bits). The truncator 1135 can be configured to implement a ReLU activation function, by clipping negative values to 0 and any values larger than a maximum (e.g., 15 or 255, depending on the number of output bits) to that maximum value.

The full (e.g., 16-bit, 8-bit) output of the truncator 1135 is passed to the multiplexer 1145, while a subset or all of the output bits (e.g., 8 bits) are also split off to the piecewise linear function 1140. The piecewise linear function 1140 implements the non-linear activation function of some embodiments, as well as other functions that can be approximated through a piecewise linear function (e.g., exponential functions used to perform a SoftMax operation). The piecewise linear function circuit 1140 receives control bits as well as configuration information that defines a particular piecewise linear function. In different embodiments, the configuration data defines the segments of a piecewise linear function by providing intercept data, slope data, segment length data, or a combination thereof. The piecewise linear function configuration, in some embodiments, is the same for all nodes in a layer, which only requires one set of slope/intercept/endpoint values to be sent as configuration data. The piecewise linear function circuit 1140 will be described further below by reference to FIG. 12. The multiplexer 1145 output is the (encoded as per the affine transform, in some cases) neural network node output, which is gated by a valid signal (not shown) to indicate when the post-processing unit is outputting a completed activation value to be carried by the activation write bus to the appropriate core and stored in the activation memory of that core.

Figure 12:
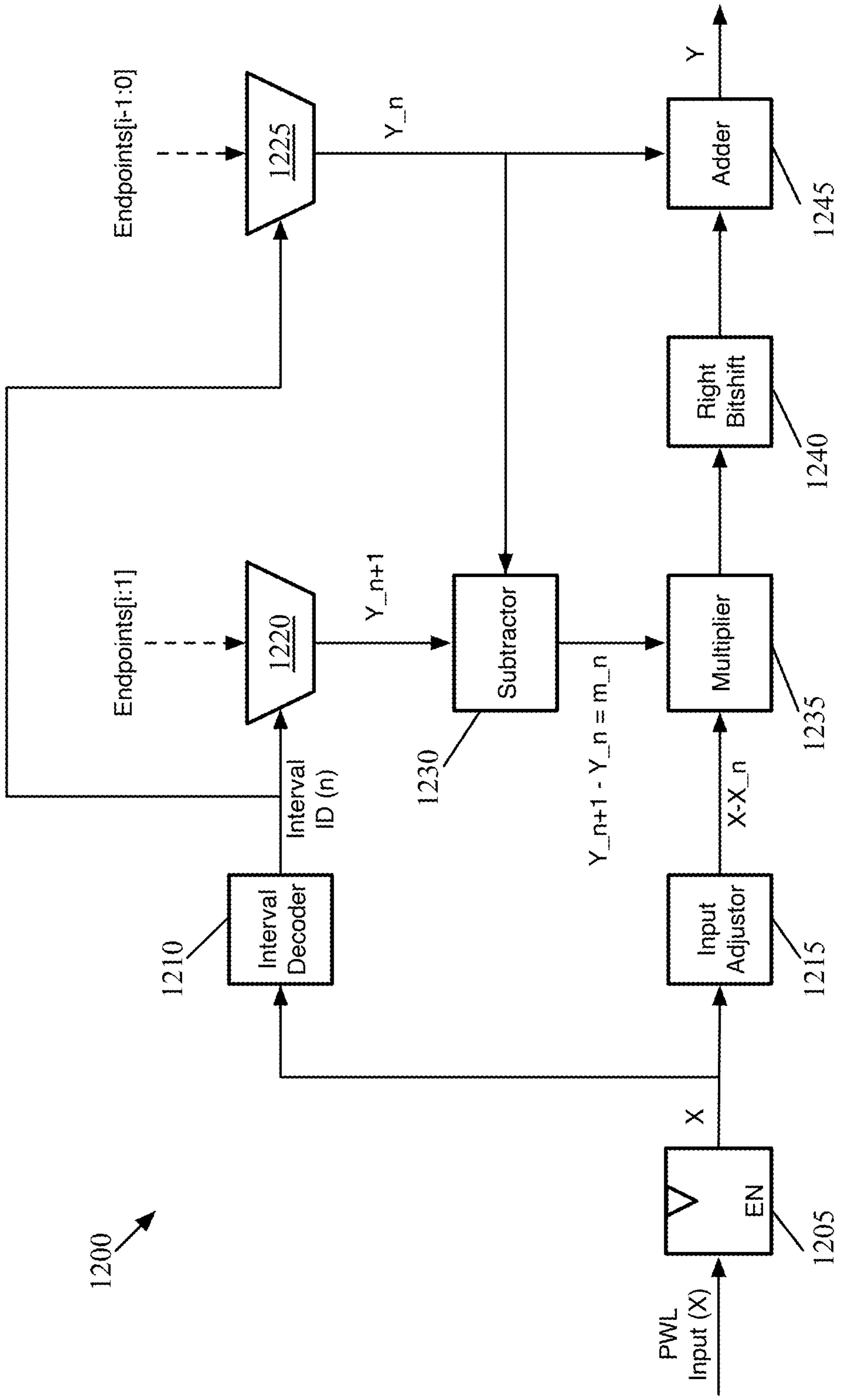
FIG. 12 conceptually illustrates a piecewise linear function circuit of some embodiments.

FIG. 12 conceptually illustrates a piecewise linear function circuit 1200 of some embodiments. This circuit 1200 receives an input value X (e.g., the output of the linear function of a neural network computation node) as well as configuration data defining endpoints of the segments of a piecewise linear function and uses this information to apply the piecewise linear function to the input value X and generate an output value Y. This allows the neural network inference circuit to execute neural networks that use a wide variety of activation functions (e.g., sigmoid functions, swish functions, etc.) with a limited amount of configuration data, as opposed to being limited to only a simple set of functions or a hard-wired activation function. In addition, some neural networks can also use the piecewise linear function circuit 1200 to apply approximations of non-linear functions to activation values (e.g., exponential functions) in order to perform more complicated operations (e.g., to implement a SoftMax layer).

A piecewise linear function having i linear segments can be defined by the following equation:

$$y = \begin{cases} \frac{y_1 - y_0}{x_1 - x_0} * (x - x_0) + y_0, & x_0 \le x \le x_1 \\ \frac{y_2 - y_1}{x_2 - x_1} * (x - x_1) + y_1, & x_1 \le x \le x_2 \\ \frac{y_3 - y_2}{x_3 - x_2} * (x - x_2) + y_2, & x_2 \le x \le x_3 \\ \ldots \\ \frac{y_i - y_{i-1}}{x_i - x_{i-1}} * (x - x_{i-1}) + y_i, & x_{i-1} \le x \le x_i \end{cases} \quad (5)$$

Here, the input value is x and the output value is y. For each segment n, the slope is given by the fractional value in the equation for the segment, and this is multiplied by the adjusted input x-$x_n$. The starting endpoint $y_n$ is then added to this intermediate value to give the output for the input value x.

Figure 13:
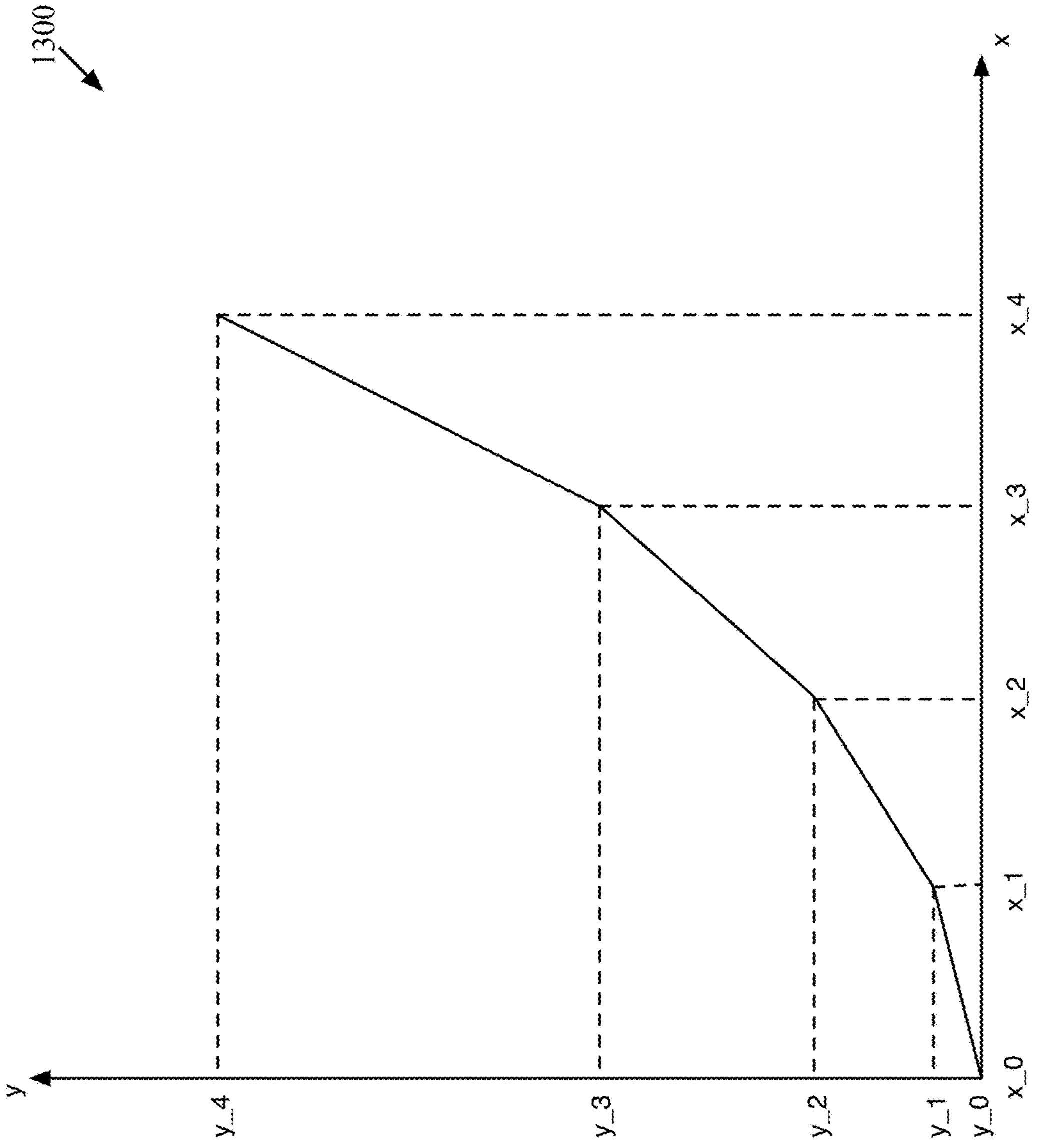
FIG. 13 illustrates an example of a piecewise linear function.

FIG. 13 illustrates an example of a piecewise linear function 1300. This is a simple example of a function that only includes four segments. As shown, each interval is the same length (i.e., $x_1-x_0=x_2-x_1= \ldots x_4-x_3$). The segment endpoints $y_n$, however, are not evenly spaced as the segments have different slopes.

Referring again to FIG. 12, the piecewise linear function circuit 1200 receives an input value X, which in some embodiments is output by the truncator 1135 of a post-processing unit. A register 1205 stores the input value X and sends this value to both an interval decoder circuit 1210 and an input adjustor circuit 1215.

The interval decoder circuit 1210 identifies to which of a set of piecewise linear function segments the input belongs. In some embodiments, the piecewise linear function is divided into a set of equal-length segments, typically numbering a power of two (e.g., 4 segments, 8 segments, 16 segments, etc.). Using a power of two equal-length segments enables simpler, more compact circuitry, though other embodiments enable more variable segments (e.g., variable length and/or a variable number of segments). The output of the interval decoder circuit 1210 is a value n that specifies on which of the i intervals the input value X falls.

The input adjustor circuit 1215 adjusts the input by determining how far along (in the x-direction) along its segment the input value X falls. By reference to the piecewise linear function shown above, the input adjustor circuit 1215 calculates the value by which the segment's slope is multiplied (i.e., x−$x_i$). For instance, if a segment runs from x-values of 0.25 to 0.5, then the adjusted input for X=0.35 will be 0.1.

The output n of the interval decoder circuit 1210 is sent to a pair of multiplexers 1220 and 1225 that output the y-values for the segment endpoints $Y_{n+1}$ and $Y_n$, respectively. These two multiplexers 1220 receive as configuration data (e.g., from the cluster controller or the post-processing controller) the segment endpoints for the piecewise linear function. The first multiplexer 1220 receives endpoints 1 through i (i.e., all but the first endpoint) whereas the second multiplexer 1225 receives endpoints 0 through i−1 (i.e., all but the last endpoint). In this manner, the same select value (the identified interval n) causes the multiplexer 1225 to output the starting endpoint $Y_n$ for the segment and the multiplexer 1220 to output the finishing endpoint $Y_{n+1}$ for the segment.

These two segment endpoints are provided to a subtractor circuit 1230 that subtracts the first endpoint from the latter endpoint to generate the numerator $m_n$ of the slope for the current segment. A multiplier circuit 1235 then multiplies this slope numerator by the adjusted input X-$X_n$. Because this circuit 1200 implements a piecewise linear function with a fixed segment length and a power of two number of segments, a right bitshift circuit 1240 is used to implement the denominator rather than a more complicated circuit. This right bitshift circuit 1240 effectively divides the multiplier 1235 output by the denominator of the slope, which is the (fixed) segment length. Finally, an adder 1245 adds the starting endpoint $Y_n$ to the output of the right bitshift circuit 1240 to adjust for the starting endpoint of the segment. The output Y of the adder 1245 is the output of the piecewise linear function circuit 1200 and, therefore, the output of a computation node that uses a piecewise linear activation function.

While this example circuit 1200 restricts the piecewise linear function to a power of two number of fixed length segments, it should be understood that other piecewise linear function implementations are possible. For instance, some embodiments use variable length segments (though the manner of variation may be fixed in some such embodiments). In addition, rather than configuring the piecewise linear function through endpoint y-values, some embodiments provide the segment slopes and y-intercepts as configuration data.

Figure 14:
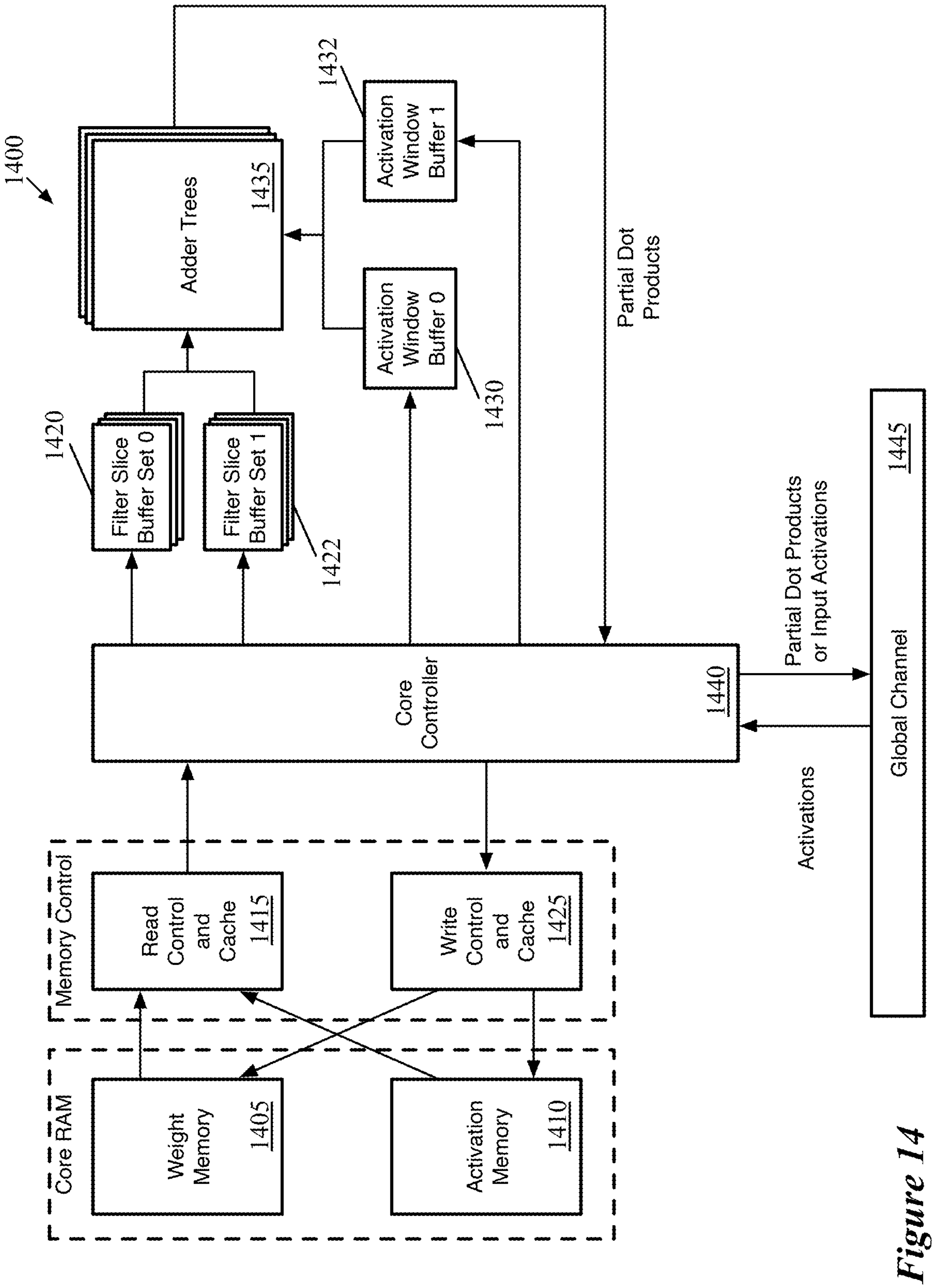
FIG. 14 conceptually illustrates the data flow within one of the cores of some embodiments for a dot product computation.

As mentioned, the dot product cores perform the majority of the dot product computation of the chip fabric of some embodiments. FIG. 14 conceptually illustrates the data flow 1400 within one of the cores of some embodiments for a dot product computation. This data flow will be described with certain specifics (e.g., weight and activation data sizes, number of separate adder trees simultaneously computing partial dot products, etc.) as examples, but it should be understood that different embodiments may use different sizes for weight data and/or activation values, different numbers of adder trees within a core, etc.

In some embodiments, the dot product cores store weight data values (e.g., weights for multiple nodes in multiple layers) in the weight memory 1405 and activation values in the activation memory 1410. In some embodiments, as shown, these memories 1405 and 1410 are part of a single block of memory for the core within the unified memory of the IC (e.g., banks of random-access memories such as SRAMs). In addition to storing weight and activation values, in some embodiments the microprocessor of the IC can use the memories in the cores as overflow memory (e.g., to store an image before the image is processed and provided as input to the neural network fabric).

The weight values are part of the network parameters and thus are determined by the training described above and encoded at compile time (and do not change at runtime), while the activation values (the input values to a particular node or set of nodes being computed) are the output values from a previous computation (or, for the first layer, are otherwise based on the network input) and thus are determined at runtime. Thus, the weight memory 1405 is typically larger than the activation memory 1410 (e.g., 512 KB to 64 KB), as the activation memory is at least partially overwritten for each new layer of the neural network while the weight memory 1405 stores the weights for all of the dot product computations performed by the core. In some embodiments, the weights are stored as 1-bit or 2-bit values (e.g., all values stored as 2-bit values, or zeros stored as a single bit and negative/positive values stored as 2-bit 1/−1). In other embodiments, the weights are encoded in such a manner that less than 1 bit of the weight memory 1405 is allocated per weight value (e.g., by encoding the weight values in such a way that many of the zeros are removed, while storing additional data for each non-zero weight value).

The read controller and read cache 1415 reads data from the weight memory 1405 into sets of filter slice buffers 1420 and 1422 that store the weight data to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load data for 36 (or 40) weight values into each filter slice buffer, which are actually used to compute 144 dot product components (with the requirement that at least 75% of the weight values be zero, the actual adder tree only receives 36-40 inputs for each buffer of 144 activation values, as described in detail below).

Some embodiments include both primary filter slice buffers 1420 and secondary filter slice buffers 1422, as shown in this figure. In a given clock cycle, at most one of these sets of filter slice buffers is used to compute dot products (e.g., using multiplexers to select only one of the sets of weight value data). For simpler dot product computations, only the primary filter slice buffer 1420 is needed, so there is no need to load weight values into the secondary filter slice buffers 1422. However, in other cases, both sets of filter slice buffers may be used (e.g., when dot products are too large to be computed in a single clock cycle using only the primary buffers).

The read control and cache 1415 also reads data (input values) from the activation memory 1410 into the activation window buffers 1430 and 1432. In addition, the read controller 1415 arranges the input values within the activation window buffers 1430 and 1432 in some embodiments to match up with the weight values in the filters. In some embodiments, the input values in an activation window read into the buffers 1430 (and 1432) include all of the values (as opposed to the 25% of the values needed for a particular filter), because the activation window is multiplied by numerous filters simultaneously (i.e., some or all of the filters stored in the filter slice buffers). The input values, in some embodiments, are quantized to have a fixed size (e.g., 4 bits), or set of fixed sizes (e.g., 4 bits or 8 bits) for ease and simplicity of computation.

As with the sets of filter slice buffers, some embodiments include both a primary activation window buffer 1430 and a secondary activation window buffer 1432. In a given clock cycle, at most one of these sets of activation window buffers is used to compute dot products (e.g., using multiplexers to select only one of the sets of activation input values). For simpler dot product computations, only the primary activation window buffer 1420 is needed, so there is no need to load activation inputs into the secondary activation window buffer 1422. However, in other cases, both activation window buffers may be used (e.g., when dot products are too large to be computed in a single clock cycle using only the primary buffers). In some embodiments, as shown, the same read controller and cache 1415 is used to read data from both the weight memory partition 1405 and the activation memory partition 1410. In such embodiments, the cache is used to store weight value data when reading the weights from the weight memory 1405. For each pass, this memory control circuit first reads the encoded weight data and provides this data to the core controller 1440 (which decodes weight data and loads the decoded weight data into the filter slice buffers), then reads input values and provides these values to the core controller 1440 (for the core controller to load the input values into the activation window buffer(s) interspersed with the computation of dot products by the adder tree circuits 1445).

The adder trees 1435 compute the dot products between the weight values represented in the filter slice buffers 1420 and the input values in the activation window buffer 1430. The details of these partial dot product computation circuits of some embodiments are described below by reference to FIG. 15. These adder trees 1435 output partial dot products (e.g., 10-bit values) that are provided to the dot product bus, which combines the partial dot products with other partial dot products as described above. In some embodiments, the number of filter slice buffers in each of the sets 1420 and 1422 is equal to the number of adder trees 1435 in the core, as well as the number of dot product bus lanes, post-processing units, and activation write bus lanes in each segment. Thus, for a typical neural network computation node, the partial dot products computed by the adder trees 1435 in multiple cores having a particular index are aggregated by the dot product bus lane with the same index, that aggregated dot product is provided for post-processing to one of the post-processing units with the same index (i.e., the post-processing unit with that index in one of the channel segments), and the output of the post-processing unit is transported by the activation write bus with the same index to its destination core.

The core controller 1440 configures and coordinates the operation of the read and write controllers 1415 and 1425 in addition to the filter slice buffers 1420, activation window buffer 1430, and adder trees 1435. Furthermore, the core controller 1440 receives the input activations and weights from the read controller 1415 and loads them into the correct slots in the sets of filter slice buffers 1420 and 1422 and the activation window buffers 1430 and 1432 (or directs them to the ALU bus for non-dot product computations). Lastly, when the adder trees 1435 output their partial dot product values, the core controller 1440 sends these values to the dot product bus in the global channel 1445. When the activations for the next layer are output, the activation write bus carries these values to the core controller 1440, which provides them to the write control and cache 1425 to be written to activation memory 1410.

To reduce the circuit area and power required for dot product computations (which use the majority of resources for neural network inference), the partial dot product computation circuits (e.g., the adder trees 1435) of some embodiments map each of a first number of input values to a second number (e.g., 25% of the first number) of dot product inputs, such that each dot product input only receives at most one input value with a non-zero corresponding weight value. Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of at least 75% weight sparsity (i.e., at least 75% of the weight values for any set of input values are zero), e.g., due to training using quantization and sparsification techniques described above, the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the IC is adaptable for any set of weights that meets the guarantee.

Figure 15:
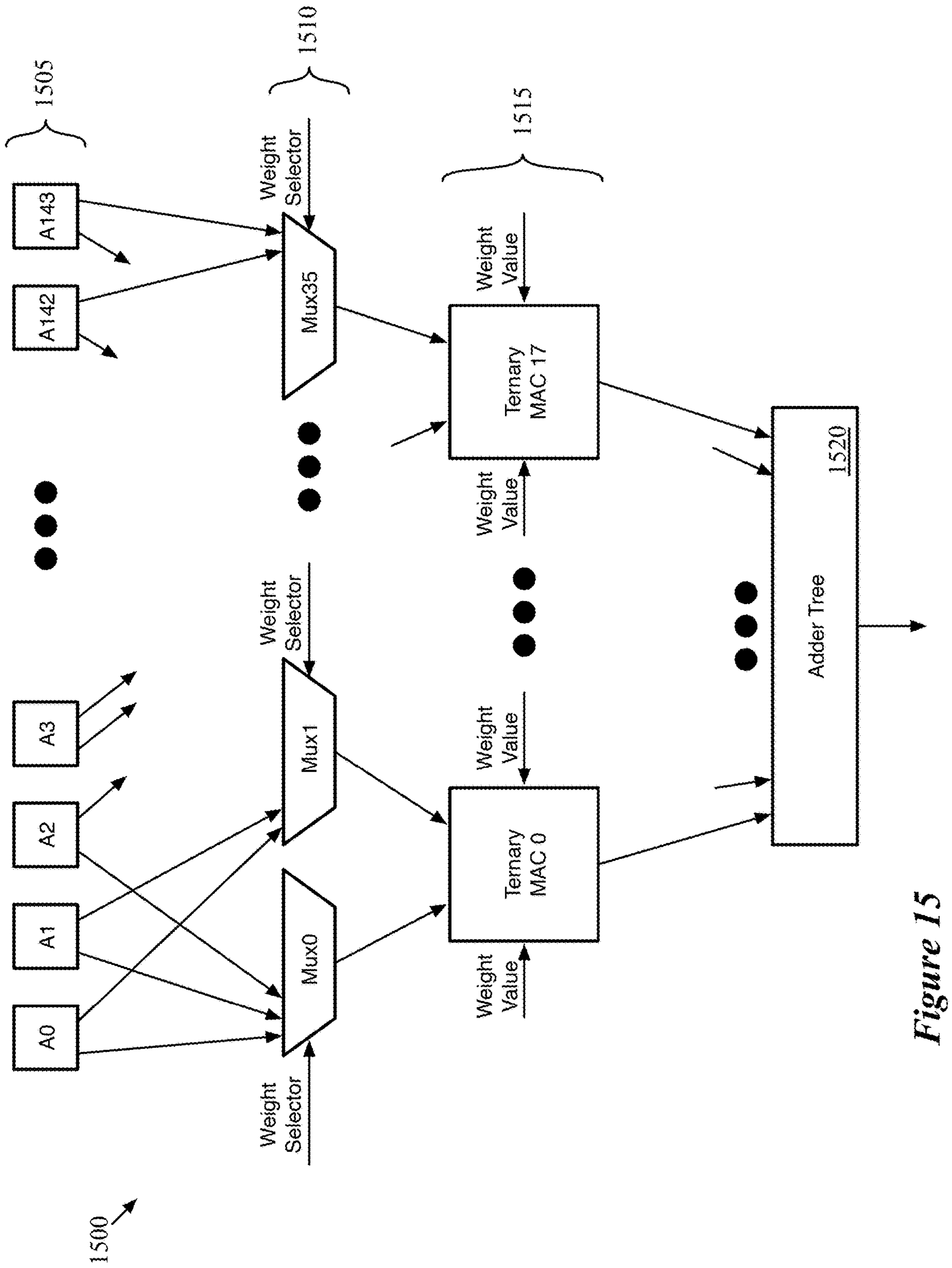
FIG. 15 conceptually illustrates an example of a partial dot product computation circuit for a guaranteed weight sparsity of at least 75%.

FIG. 15 conceptually illustrates an example of such a partial dot product computation circuit 1500 for a guaranteed weight sparsity of at least 75%. The wiring of the input values for this dot product computation circuit is designed to optimize the likelihood that, so long as the weights meet the sparsity requirement, the compiler can ensure that at runtime each input value with a nonzero corresponding weight value is provided to a different dot product input for nearly any arrangement of the nonzero weight values. As shown, the dot product computation circuit 1500 includes a set of activation inputs 1505, a set of multiplexers 1510, a set of ternary multiplier-accumulator (MAC) circuits 1515, and an adder tree 1520.

In this example, the dot product computation circuit 1500 includes 144 input values 1505. In different embodiments, the activation window buffer may have different sizes, which defines the size of the partial dot product computation. Each input value storage (e.g., each location in the activation window buffer) is connected to two of the thirty-six multiplexers 1510. In this example, at least 75% sparsity is assumed for each set of weight values, and thus the 144 activation inputs can be reduced to 36 inputs for the actual dot product computation. This significantly reduces the circuit area required for the dot product computation, as the number of adders is reduced by 75% (the adder tree effectively starts with 36 values rather than 144 values), in addition to reducing the amount of weight data that is stored in memory.

The multiplexers 1510 each have eight inputs and receive a set of select bits (the weight selector input) from the core controller that specifies which of these eight inputs to pass to the dot product computation. In some embodiments the weight selector input is a 3-bit value that is stored as part of the weight data for each non-zero weight. Having thirty-six 8-input multiplexers 1510 allows for 288 sets of wires from the activation inputs 1505 to the multiplexers 1510, which is two wires for each activation input. If the sparsity guarantee was only 50%, then seventy-two 4-input multiplexers could be used with two sets of wires for each activation input 1505 (or seventy-two 8-input multiplexers with four sets of wires for each activation input 1505), with similar proportions for different sparsity guarantees and numbers of wires per activation input.

The wire sets from the activation inputs to the multiplexers are arranged such that the compiler can verify that each input value with a nonzero corresponding weight is provided to a different one of the multiplexers 1510. The weight values are not known at the time of IC manufacture, and thus the wiring design is resilient to different arrangements of the nonzero weight values (that meet the sparsity requirement). Some embodiments use a cuckoo hashing algorithm (or other algorithm) to optimally map the wire sets from the activation inputs 1505 to the multiplexers 1510. In some embodiments, this algorithm computes two hashes (e.g., with two different hash functions) for each of the activation input locations 1505 that map to two different multiplexers 1510 (e.g., by computing the hash modulo 36). Each activation input location 1505 is wired to these two different multiplexers 1510 determined by the hashes. If one of the hash functions maps an activation input to a multiplexer that already has eight inputs, then some embodiments compute a third hash function for either that activation input or one of the activation inputs previously mapped to the multiplexer.

Other embodiments use other techniques to select the multiplexers to which each input value is wired, so long as each input is wired to two different multiplexers (and thus each multiplexer has input wires from eight different activation inputs). Additional constraints may be imposed as well, such as ensuring that no more than a specified maximum number of activation inputs are wired to the same pair of multiplexers. In addition, it should be understood that these techniques can be applied to dot product computation circuits with different numbers of inputs, different numbers of multiplexers, and different numbers of wires per input.

The weight values are known before the network is executed by the IC (i.e., at compile time), and thus the compiler can determine which of the two multiplexers that receive each input value with a non-zero corresponding weight at runtime will select that input value, such that each input value is selected by a different multiplexer (and only one multiplexer). In some embodiments, the compiler uses the same cuckoo hashing or other algorithm as was used for the wires. The select bits for the multiplexers 1510 are determined by which of the inputs to the multiplexer carries an input activation value with a nonzero corresponding weight value and are received from the filter slice buffer. In some embodiments, these multiplexer select bits are stored for each non-zero weight value (for multiplexers that do not receive any inputs corresponding to non-zero weights, the multiplexer select bits do not matter, and thus do not need to be stored in the encoded weight data). These multiplexers 1510 provide their output to a set of ternary multiply-accumulator (MAC) circuits 1515. The ternary MAC circuits effectively form the leaves of the dot product computation, and the number of such circuits is half the number of multiplexers 1510 (18 ternary MAC circuits 1515 in this example).

In some embodiments, the weight values for a particular dot product computation are all either zero, a positive value, or the negation of the positive value in some embodiments. In this case, the dot product does not require any actual multiplication at the leaves of the computation, as the positive and negative weight values can be treated as 1 and −1, with a single multiplication by the positive value afterwards. Removing the multiplication at the leaves saves significant circuit area for a chip with numerous such computation circuits.

To combine the two input values while accounting for the ternary weight values, the ternary MAC circuits 1515 add the two input values from the multiplexers 1510 while also receiving as inputs the corresponding weight data for these input values. In some embodiments, the ternary MAC receives two bits of weight data for each of its inputs. If both of the weights are positive, then the ternary MAC outputs the sum of the two input values (and outputs the negative of this sum if both of the weights are negative). If only one of the weight values is negative, then its corresponding input value is subtracted from the other input value (with a positive corresponding weight value), and if both of the weight values are zero, then the ternary MAC output is zero. Lastly, if only one of the weight values is zero, then the ternary MAC outputs the input value (or the negative of the input value) with the corresponding nonzero weight value. The negative values are accounted for in the bias computation within the post-processing unit, as described above.

The outputs of the ternary MACs provide the inputs to the adder tree 1520 that computes the output for the partial dot product computation. In some embodiments, this adder tree is a standard adder tree circuit that adds pairs of values over several layers. For example, the adder tree 1520 receives 18 inputs for 9 adders, which in turn provide outputs to 4 adders (with an additional output to be added in later), etc. In some embodiments, the inputs to the ternary MACs 1515 are 4-bit inputs (the length of the quantized activation values), and the ternary MACs 1515 output 6-bit values. The adder tree 1520 receives these 6-bit values and outputs a 10-bit value after several stages of addition. It should be noted that this description refers to handling of signed 4-bit input values. Some embodiments can also handle unsigned input values by converting them to signed input values before performing the addition operations. For example, some embodiments output and store 4-bit outputs, which can be signed or unsigned. Before performing the addition operations, an additional bit is added that either sign-extends (to convert signed 4-bit inputs to signed 5-bit inputs) or 0-pads (to convert unsigned 4-bit inputs to signed 5-bit inputs).

While this diagram shows the wires (or some of the wires) connecting each of the input values 1505 to a single partial dot product computation circuit, in some embodiments each of these input values 1505 in the activation window buffer is actually connected to each of the partial dot product computation circuits in the core. That is, for the case with 64 such circuits, each value in the activation window buffer is carried by 128 total wires to 128 multiplexers (two for each of the partial dot product computation circuits). In some embodiments, the wiring arrangement is the same for each set of multiplexers (i.e., for each partial dot product computation circuit).

As mentioned, for redundancy, some embodiments use a number of dot product inputs (i.e., multiplexers) that is slightly more than required by the sparsity guarantee for the dot product computation. For instance, in the example above, rather than using 36 inputs (exactly 25% of the 144 input values), some embodiments use 38 or 40 inputs. In this case, some of the activations 1505 are mapped to three of the multiplexers 1510, rather than two. In addition, some embodiments use a different size activation window buffer (e.g., with 128 activations rather than 144).

Figure 16:
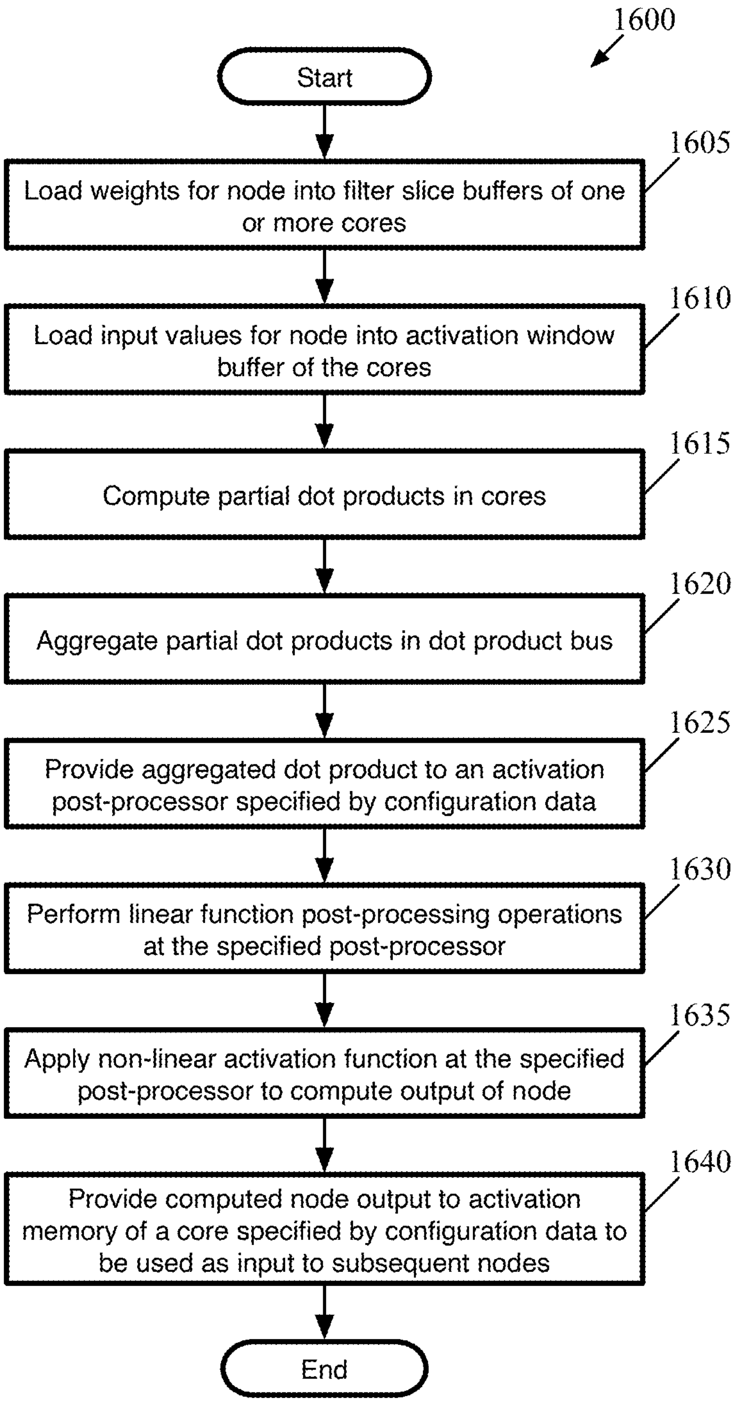
FIG. 16 conceptually illustrates a process of some embodiments for executing a set of instructions (or a portion of a set of instructions) to compute the output of a neural network node.

FIG. 16 conceptually illustrates a process 1600 of some embodiments for executing a set of instructions (or a portion of a set of instructions) to compute the output of a neural network node (specifically, a convolutional or fully-connected node). The process 1600 is executed by the chip fabric of a neural network IC, such as that described above. Typically, the process 1600 is executed simultaneously for multiple nodes, and operations 1610-1640 are performed repeatedly for multiple activation windows (i.e., multiple groups of input values loaded into the activation window buffer) in order to completely execute a layer (or portion of a layer) of the neural network. In the case of the process 1600, the dot product can be computed in a single cycle and does not involve any split filter slices (i.e., no time-multiplexing is required).

As shown, the process begins (at 1605) by loading the weights for a node into filter slice buffers of one or more cores. In addition, the process loads (at 1610) the input (activation) values for the node into the activation window buffer of these cores. In some embodiments, a set of input values are loaded into one activation window buffer in a core while the weight data for several nodes are loaded into several filter slice buffers of the core. Other embodiments load the weight data into the filter slice buffers first, then load the input values into the activation window buffer. Furthermore, some embodiments load the weight data once for a pass (that computes outputs for many activation nodes), then iteratively load sets of input values and compute dot products for numerous nodes without the need to re-load the weight data. In addition, the weights and activations for a node, in some embodiments, are divided among the filter slice and activation window buffers of all of the cores that are active for the current set of instructions. The storage of the weight and activation values and loading of these values into the filter slice buffer and activation window buffer, respectively, are also described in greater detail below.

In some embodiments, the input values loaded into the activation window buffers are encoded values. That is, these values use the available bits (e.g., 4 bits) to represent equally-spaced values along a range determined during training of the network (and not necessarily the range typically represented by the available number of bits in binary). This range is based on the determined optimal output range for the activation function of the previous layer that generated the input activation values.

The process 1600 then computes (at 1615) partial dot products in the cores. As described above, the activation values loaded into the activation window buffers in each of the active cores are multiplied by their corresponding weight values loaded into the filter slice buffers of these cores. In some embodiments, the size of the partial dot products is reduced using the wiring structure shown in FIG. 15, and with ternary weight values of $\{0, 1, -1\}$, the multiplication is handled by the ternary MAC circuits shown in this figure.

Next, the process aggregates (at 1620) these partial dot products in the dot product bus. In some embodiments, the partial dot products for a particular node are calculated by the adder tree with the same index (i.e., out of several adder trees) in each of the active cores, and thus these partial dot products are all passed to the same corresponding lane of the dot product bus (which has one lane for each of the adder trees in a core). In some embodiments, the final aggregation is performed by the dot product bus lane in the channel segment of the post-processor selected for the particular node.

The process 1600 then provides (at 1625) the aggregated dot product to an activation post-processor specified by configuration data. This configuration data, in some embodiments, is generated by a compiler and parsed by the hierarchical controller circuits of the neural network chip fabric, and indicates which channel segment will perform the post-processing. Each of the channel segments has an equal number of post-processing units, and the post-processing unit in the selected channel that corresponds to the dot product bus lane that aggregates the dot product is the post-processing unit that receives the aggregated dot product.

At the post-processing unit that receives the aggregated dot product, the process 1600 performs (at 1630) linear function post-processing operations. As described above, certain dot products are aggregated over multiple cycles by the dot product input processing circuit (e.g., if time-multiplexing is required to handle dot products with a large number of components, or for dot products with double the standard number of bits).

In addition, some embodiments apply an affine transform to the aggregated dot products. The affine transform includes an addition operation and a multiplication operation. If the input values for the node are encoded, then the resultant dot product will also be encoded (the modification to this encoding is described below) and the applied affine transform includes the inverse of the encoding transform (to decode the dot product). The applied affine transform also includes any learned transforms (e.g., incorporating the weight scale, the bias for the node, an additive factor based on the number of negative weight values). Finally, the applied affine transform includes an encoding transform to encode the input values for the upcoming activation function.

Next, the process 1600 applies (at 1635) the non-linear activation function at the post-processing unit to complete the calculation of the node output value. In different embodiments, a piecewise linear function or a lookup table (e.g., a 5-bit to 4-bit mapping table) is used for this computation. The mapping for each possible set of input bits is provided by configuration data from the cluster controller in some embodiments.

In some embodiments, the operations 1615-1635 are executed to compute the node output without storing the any intermediate values in memory. That is, none of the partial dot products are stored in any memories (e.g., RAM) during the computation within the core, and the same is true before and during the aggregation within the dot product bus. In some embodiments, a register is used to aggregate multiple dot product bus inputs over multiple cycles. However, in a standard case (e.g., for 4-bit dot products), this register passes the dot product input through and the entire set of operations 1615-1635 is executed in a single clock cycle.

Finally, the process 1600 provides the computed node output to the activation memory of one (or more) of the cores as specified by the configuration data, so that this output can be used as the input to a subsequent set of neural network nodes. In some embodiments, the node output value is carried to the specified core by the activation write bus, with the core index for the value specified by the cluster controller(s). In some embodiments, once at the specified core, the node output value may be temporarily stored in a write cache until the write cache is full and the data is written to the core memory. These node outputs are encoded in some embodiments (much like the input values to the layer).

As mentioned, the process 1600 illustrates the most simplistic case for computing a dot product. For this simplest type of dot product computation, the neural network computation circuit of some embodiments places the following restrictions on the computation: (i) all of the input values should be of the specified discrete size (e.g., 4 bits), (ii) the maximum number of input values is the size of the input buffer multiplied by the number of cores (e.g., 144 inputs x 16 cores=2304 total input values), (iii) all of the weight values are either 0, $+\alpha$, or $-\alpha$ (and thus can be stored as 0, 1, and −1), and a large enough percentage of the weight values are 0 that the input values with non-zero weight values can each map to a different multiplexer input.

As described above, the neural networks of some embodiments are trained for execution on a specific type of neural network inference circuit, such as that described by reference to FIGS. 7-16. In this case, the activation values on the hardware circuit have a fixed size (or one of multiple sizes) and are generally thought of as having a specific data type. For instance, a b-bit activation value is often considered to have 2 fractional bits and b−2 integer bits (including the sign bit). Instead, some embodiments enable the activation value on the neural network inference circuit to represent an index into an abstract grid of values with arbitrary (though uniform) spacing and arbitrary shift (i.e., not necessarily centered or ending on zero). This one-dimensional grid of activation values is computed as an affine transformation of the grid of integer values on the neural network inference circuit. By choosing appropriate affine transforms, some embodiments adapt the grid of available activation values (i.e., bit combinations) to fit the natural range of each activation layer in order to facilitate learning and maximize the information stored in activation layers. It should be noted that these adaptations do not require modification of the neural network inference circuit hardware. In addition, wholesale changes to the training of neural networks for execution on this hardware are not required, though some reorganization is needed (i.e., to the computation of affine transforms).

The basis for the use of encoding and decoding affine transformations will now be described. As described above, the neural network inference circuit of some embodiments can include activation function circuits with the ability to implement multiple different types of activation functions. For example, in some embodiments, the neural network inference circuit can implement a 4-bit or 8-bit signed identity function (i.e., essentially bypassing the activation function but truncating values to a minimum negative number and a maximum positive number) as well as a 4-bit or 8-bit ReLU function (much like the identity function, but shifted so that 0 is the minimum output allowing for positive outputs twice as large as the corresponding signed identity function). Some embodiments use a lookup table that receives a signed 5-bit value and maps this to a 4-bit value (either signed or unsigned). In addition, some embodiments can use a modulus operation that, rather than truncating larger values (e.g., greater than 8 bits) simply truncates these values taking only, e.g., the 8 least significant bits. Finally, some embodiments use a piecewise linear function (taking, e.g., 4-bit or 8-bit inputs and outputting 4-bit or 8-bit outputs).

Thus, the hardware simply uses a set of bits and is not necessarily limited to treating those bits as having a specific data type. However, software that trains the network for use on such a neural network inference circuit (and thus the neural network instructions program generated for the neural network inference circuit) may be more constrained. The training programs of some embodiments view the activation values as having two fractional bits (e.g., U6.2 or S6.2 for 8-bit values and U2.2 or S2.2 for 4-bit values). The reason for using two fractional bits, in some embodiments, is that parameter initialization and batch normalization generally attempt to produce pre-activations (i.e., values input to the activation function) with mean 0 and variance 1, so that a U2.2 data type captures approximately 4 sigma of the activation distribution. For 8-bit values, however, the use of U6.2 or S6.2 data types does not provide any additional precision (and simply extends the tail of available values).

The reference view of an activation function can then be implemented in terms of the hardware implementation. Thus, for a 4-bit ReLU, the hardware implementation is:

$$ReLU_{HW}: U4 \rightarrow U4, \tag{6}$$

$$ReLU_{HW}(x) = \text{clamp}(x; \min = 0, \max = 15). \tag{7}$$

To implement a reference software implementation, the U2.2 input is multiplied by 4 in order to convert it to an S5 value (i.e., one sign bit and four integer bits), the hardware ReLU function is applied to generate a U4 value (four unsigned integer bits), and then the result is divided by 4 to produce the U2.2 output:

$$ReLU_{sw}:U2.2 \rightarrow U2.2, \quad (8)$$

$$ReLU_{sw}(x) = ReLU_{HW}(4x)/4. \quad (9)$$

Similarly, the hardware implementation can be expressed in terms of the software implementation:

$$ReLU_{HW}:U4 \rightarrow U4 \quad (10)$$

$$ReLU_{HW}(x) = 4ReLU_{cnv}(x/4). \quad (11)$$

This re-interpretation of the hardware activation function is not necessarily limited to multiplying and then dividing by 4. Other transformations can include multipliers that are arbitrary powers of 2 (e.g., $2^{-6}$) or that are not a power of two (e.g., 1/3.75) or generalized affine transformations that apply an additive shift in addition to a multiplicative scale. These affine transformations can include learned parameters (e.g., learned shifts and scales), and the transformations applied to the activation values need not be the inverse of the transformations applied to the pre-activations. Affine transformations are preferable because of their easy implementation in the neural network inference circuit of some embodiments.

In the following discussion, affine transforms with scale m and additive factor (bias) d will be denoted using A(m,d) such that A(m, d)x=mx+d (i.e., with the multiplicative factor applied first). It should be noted that the neural network inference circuit of some embodiments performs addition prior to multiplication, meaning that the transforms have to be modified appropriately for hardware execution. So long as m≠0, an affine transform A(m,d) is invertible, and its inverse is given by $$A(m, d)^{-1} \equiv A(1/m, -d/m), \quad (12)$$

which is both a left inverse and a right inverse. In addition, products of these affine transforms are given by $$A(m_2, d_2) \circ A(m_1, d_1) = A(m_2 m_1, m_2 d_1 + d_2) \quad (13)$$

for two transforms and $$A(m_3, d_3) \circ A(m_2, d_2) \circ A(m_1, d_1) = A(m_3 m_2 m_1, m_3(m_2 d_1 + d_2) + d_3) \quad (14)$$

for three transforms. The inverse of a product is given by:

$$\begin{aligned}(A(m_2, d_2) \circ A(m_1, d_1))^{-1} &= (A(m_1, d_1))^{-1} \circ (A(m_2, d_2))^{-1} \quad (15)\\ &= A(1/m_1, -d_1/m_1)A(1/m_2, -d_2/m_2)\\ &= A(1/(m_1 m_2), -(m_2 d_1 + d_2)/(m_1 m_2)).\end{aligned}$$

In addition, the term grid will be used to refer to a finite, one-dimensional grid of uniformly-spaced values which are the possible values that can result from quantizing an input to an activation function or output values produced by a quantized activation function. Affine transformations can be applied to such a grid. Specifically, given a grid of integer values that represents the possible input or output values for an activation function on the neural network inference circuit of some embodiments, an affine transformation can be applied to transform the grid into a more optimal arbitrarily scaled and shifted grid. More formally, a grid can be described in terms of an interval of integer values [min_idx, end] and an affine transformation:

$$g = \text{Grid}(\text{min\_idx:int}, \text{max\_idx:int}, A_g\text{:Affine}). \quad (16)$$

The values in this rid aregiven by:

$$g[k] = \text{scale}(A_g) * k + \text{bias}(A_g), \ \text{min\_idx}(g) \le k \le \max_{idx}(g), \quad (17)$$

where scale (A(m, d))=m and bias (A(m, d))=d. Some embodiments restrict the scale to only positive values so that the grid values increase with increasing grid index (noting that this does not require the activation functions to be monotonic increasing functions). Thus, the minimum and maximum values in the grid correspond to the grid points with min_idx and max_idx.

The values in any generalized grid may be obtained from the values in an integer grid h with scale 1 and bias 0:

$$h = \text{Grid}(\text{min\_idx}(g), \text{max\_idx}(g), 1_A), \quad (18)$$

The values of such a general grid g can be obtained by applying an affine transformation:

$$g[k] = A_g h[k] = \text{scale}(A_g) * h[k] + \text{bias}(A_g), \quad (19)$$

such that $g=A_g h$. Thus, for a grid $g_1$, the action of an affine transformation $A_{21}$ on that grid is given by:

$$A_{21} g_1 = \text{Grid}(\text{min\_idx}(g_1), \text{max\_idx}(g_1), A_{21} A_{g1}) \equiv g_2, \quad (20)$$

where the integer index range of the grid is unaffected and the affine transformation that characterizes the grid is modified by applying $A_{21}$:

$$A_{g2} = A_{21} A_{g1}. \quad (21)$$

The affine transformation $A_{21}$ that maps $g_1$ to $g_2$ is given (in terms of the transforms of the original and transformed grids) by:

$$A_{21} = A_{g2}(A_{g1})^{-1}. \quad (22)$$

Additional functions can be defined for these grids. For instance, the floor index function computes the index of the next lower grid value within the grid by first computing the floor and then clamping to the range of indices:

$$FlrIdx(h)x = \text{clamp}(\lfloor x \rfloor;\ \min = \text{min\_idx}(h),\ \max = \text{max\_idx}(h)). \tag{23}$$

This floor index function is the first step applied when computing an activation on the neural network inference circuit of some embodiments. To compute the floor index for an arbitrary affine-transformed grid, the inverse affine transform is applied to the input value x:

$$FlrIdx(g)x = \text{clamp}\left(\left\lfloor \frac{x - \text{bias}(A_g)}{\text{scale}(A_g)} \right\rfloor;\ \min = \text{min\_idx}(g),\ \max = \text{max\_idx}(g)\right) = \text{clamp}(\lfloor A_g^{-1} x \rfloor;\ \min = \text{min\_idx}(g),\ \max = \text{max\_idx}(g)). \tag{24}$$

Thus, the FlrIdx operation for the general grid can be achieved by using the FlrIdx operation in the integer grid if the inverse of the grid affine transform, $A_g$, is first applied:

$$FlrIdx(g) = FlrIdx(h)A_g^{-1}. \tag{25}$$

This shows the relation of the activation-input quantization in the training model to the corresponding operation that occurs on the neural network inference circuit. More generally, the FlrIdx operation for any grid can be computed in terms of the FlrIdx operation for any other grid:

$$FlrIdx(g_2) = FlrIdx(g_1)A_{g1}A_{g2}^{-1}. \tag{26}$$

When performing input quantization on an activation, the grid value corresponding to the FlrIdx is also important. For an untransformed integer grid, the index and value are the same. For a general grid, the affine transform is applied to map the index to the grid:

$$Flr(g) = A_g FlrIdx(g) = A_g Flr(h)A_g^{-1}. \tag{27}$$

Similarly, a value can be rounded to the nearest grid point. For an integer grid this value is rounded and clamped:

$$\text{Round}\ (h)x = \text{clamp}(\text{round}(x);\ \min = \text{min\_idx}(h),\ \max = \text{max\_idx}(h)). \tag{28}$$

For an affine-transformed grid, the inverse transform is applied before rounding and the transform is applied after clamping:

$$\text{Round}(g) = A_g \text{Round}(h)A_g^{-1}. \tag{29}$$

These transformed value grids can be used to describe quantized activation functions. The input and output grids on the hardware use integer values. Different embodiments allow for different input values depending on the datatype being used (e.g., based on number of bits and whether the values are signed or unsigned:

$$h(dtype) = \begin{cases} \text{Grid}(0, 15, 1_A), & dtype = U4 \\ \text{Grid}(-8, 7, 1_A), & dtype = S4 \\ \text{Grid}(0, 255, 1_A), & dtype = U8 \\ \text{Grid}(-128, 127, 1_A), & dtype = S8 \\ \text{Grid}(-16, 15, 1_A), & dtype = S5 \end{cases} \tag{30}$$

As noted above, the input and output grids used for training and/or the neural network instructions program are obtained by scaling the above hardware grids by a factor of 0.25 using the affine transform $A_{0.25}$=A (0.25, 0):

$$g = \begin{cases} \text{Grid}(0, 15, A_{0.25}), & dtype = U2.2 \\ \text{Grid}(-8, 7, A_{0.25}), & dtype = S2.2 \\ \text{Grid}(0, 255, A_{0.25}), & dtype = U6.2 \\ \text{Grid}(-128, 127, A_{0.25}), & dtype = S6.2 \\ \text{Grid}(-16, 15, A_{0.25}), & dtype = S2.2 \end{cases}. \tag{31}$$

To compute a quantized activation function on the neural network inference circuit, the index in the integer grid is first computed:

$$k_{in} = FlrIdx(h^{in})x. \tag{32}$$

Next, a function $\Phi^{(HW)}$ is applied to compute an integer output value:

$$y^{HW} = \Phi^{(HW)} k_{in}. \tag{33}$$

The function $\Phi^{(HW)}$ is an activation function (e.g., ReLU, identity, a piecewise linear function, etc.) that maps an integer index k to an integer output index $y^{(HW}$. In the training model, both the input and output grids have affine transformations applied, with the grid index computed using $$k_{in} = FlrIdx(g)x = FlrIdx(h^{(in)})A_{g(in)}^{-1}x. \tag{34}$$

The transformed output value is thus $$y^{(SW)} = A_{g(out)} y^{(HW)}. \tag{35}$$

It should be noted that the inverse in-grid transform is applied when computing the grid index and the uninverted out-grid transform is applied when computing the activation output. During forward propagation in training, different embodiments can either perform this computation in encoded or unencoded fashion. In the encoded approach, the quantized activation function is modified to use the transformed in-grid and out-grids to compute the grid index and the activation output value. These transforms then need to be accounted for when quantizing affine parameters in some such embodiments. In the unencoded approach the quantized activation functions are left alone. The training process tracks that the output value is a grid index (as opposed to the output value itself) and can incorporate the effects of the out-grid and in-grid in the affine transformation.

Next, the relationship between the hardware and training activation functions will be discussed (i.e., how to determine $\Phi^{(HW)}$). Given an activation input x, the training activation computes the output value using $$y^{(SW)} = A_{g^{(out)}} \Phi^{(HW)} FlrIdx\left(g^{(in)}\right)x, \tag{36}$$

Which approximates y=Φx. In addition, $$x_k \approx A_{g^{(in)}}\left(k + \frac{1}{2}\right), \tag{37}$$

With the ½ added to reflect that the integer hardware grid decreases the input value by an average of ½. The hardware output value corresponding to this grid index is thus:

$$\Phi^{(HW)} = \text{Round}(h) A^{-1}_{g^{(out)}} \Phi x_k. \tag{38}$$

The software (training) value is given by:

$$\Phi^{(SW)} x_k = \left(g^{(out)}\right)\Phi x_k \approx \Phi x_k. \tag{39}$$

In the training system used for some embodiments, the LUT or piecewise linear knot values for $\Phi^{(HW)}$ are computed offline. In this case, a more sophisticated computation (e.g., minimizing the $L^P$ distance between the approximate and original functions) can be used:

$$\left\|\Phi^{(SW)} - \Phi\right\|_p = \left[\int dx \left|\Phi^{(SW)} x - \Phi x\right|^p\right]^{\frac{1}{p}}. \tag{40}$$

The specific choice of approximation strategy does not matter in some embodiments, so long as the activation function is closely approximated so that the gradient estimator, d(Φx)/dx, is a good approximation to the rate of change of quantized-activation outputs with respect to activation inputs. That is, transforming the input and output grids for quantized activation functions should (in the limit of infinite value precision and range) leave the overall parameter gradient unchanged. The output of the software activation function can be computed in terms of the hardware activation function:

$$\begin{aligned} y^{(SW)} &= \Phi^{(SW)} x_k \\ &= \text{Round}\left(g^{(out)}\right)\Phi Flr\left(g^{(in)}\right)x_k \\ &= A^{out}\left(h^{(out)}\right)\left(A^{(out)}\right)^{-1}\Phi A^{(in)} FlrIdx\left(h^{(in)}\right)\left(A^{(in)}\right)^{-1} x_k \\ &= A^{out}\Phi^{(HW)}\left(A^{(in)}\right)^{-1} x_k, \end{aligned} \tag{41}$$

where $$\Phi^{(HW)} = \text{Round}\left(h^{(out)}\right)\left(A^{(out)}\right)^{-1}\Phi A^{(in)} FlrIdx\left(h^{(in)}\right). \tag{42}$$

This equation can be used to compute a straight-through gradient estimator for the hardware activation function to be used during forward propagation. The gradient estimates for each of the factors in $\Phi^{(HW)}$ are:

$$\frac{\partial}{\partial x}\text{Round}\left(h^{(out)}x\right) \approx 1 \tag{43}$$

$$\frac{\partial}{\partial x}\left(A^{(out)}\right)^{-1}x = \frac{1}{\text{scale}\left(A_{g^{(out)}}\right)} \tag{44}$$

$$\frac{\partial}{\partial x}\Phi x \equiv \Phi' \tag{45}$$

$$\frac{\partial}{\partial x}A^{(in)}x = \left(A_{g^{(in)}}\right) \tag{46}$$

$$\frac{\partial}{\partial x}FlrIdx\left(h^{(in)}x\right) \approx \mathbb{1}_{in} \tag{47}$$

Using the chain rule, the gradient estimator for the hardware activation function is given by the product of the gradients for each of the factors in the above equation:

$$\frac{\partial}{\partial x}\Phi^{(HW)}x \approx \frac{\text{scale}\left(A_{g^{(in)}}\right)}{\text{scale}\left(A_{g^{(out)}}\right)}\mathbb{1}_{in}\Phi'(x) \tag{48}$$

This indicates that in addition to the gradient of the activation function s, the gradient estimator for the hardware activation function includes a factor of the ratio of the in-grid scale divided by the out-grid scale. This factor will be canceled by the inverse ratio that results from including the out-grid affine and the inverse of the in-grid affine in some embodiments.

As described above, some embodiments transform the grid of integer output values (provided by the hardware bits) to more optimally fit the range of an activation function. For instance, for the sigmoid activation, the hardware value interval is [0, 15](using 4 unsigned bits) and the conventional training value interval is [0, 3.75], but the interval of sigmoid outputs is [0, 1]. The affine transform mapping the hardware interval to the sigmoid output interval is given by $m^{(out)}$=1/15 and $d^{(out)}$=0 (i.e., a scale of 1/15 with 0 bias).

For a tanh activation (represented using 4 signed bits, to accommodate negative values), the hardware value interval is [−8, 7] while the actual output interval for the tanh function is [−1, 1]. This transformation can be given by $m^{(out)}$=2/15 and $d^{(out)}$=1/15. In certain cases, a transformation with zero bias may be more optimal in which case the output interval is enlarged to [−8/7, 1], resulting in an affine transformation with by $m^{(out)}$=1/7 and $d^{(out)}$=0.

To implement these affine transformations on the neural network inference circuit (which does not have the capability to apply an affine transformation after the activation function), the transformation is moved across the subsequent core operation and combined with all of the other affine transformation operations. To model this affine transformation of the output grid during training, some embodiments use output activation values that are elements of the transformed grid.

As also discussed, input grids can be transformed. For instance, an activation function using the piecewise linear activation circuits described above by reference to FIG. 12 has 17 knots located at integer multiples of 16 in the interval [−128, 127]. Using a 6.2 datatype, the knots are spaced to occur at multiples of 4 in the interval [−32, 32]. With this range, a non-linear activation such as the sigmoid cannot be properly modeled given that all of its expressiveness occurs close to 0. Thus, an affine function with a scale much smaller than 0.25 is used. For instance, to map the input range of [−128, 127] to a more relevant range of [−5, 5](with spacing between knots of 0.3125), then the affine transform given by $m^{(out)}=0.0392$ and $d^{(out)}=0.0196$ can be used.

The input grid transform, as described above, is incorporated into the affine transform of the current layer, as this is the last operation before the computation of the quantized activation function. Unlike the output grid transform, this operation need not be moved across the operations of the subsequent (or prior) layer. As described further below, this allows for the use of arbitrary transforms (i.e., with no restrictions on the bias term).

The transformation of the input and output grids can also be modeled together. For instance, for an identity activation function (typically applied to network outputs), some embodiments apply the same affine transform to scale down both the input and output grids. That is:

$$A^{(in)} = A^{(out)} \equiv A(m, d). \tag{49}$$

To scale an interval of [−128, 127] to a more useful range of [−6, 6], the affine transform parameters are given by given by $m^{(out)}=m^{(in)}=6/255$ and $d^{(out)}=d^{(in)}=6/255$. The output layer has no other operations that require affine transforms, so the overall affine transform is therefore:

$$A^{(total)} = \left(A^{(in)}\right)^{-1} A^{(L)} A^{(out)}, \tag{50}$$

Where $A^{(out)}$ is the out-grid transform of the previous layer. The out-grid transform for the output layer is implemented off-fabric (e.g., by the CPU of the integrated circuit shown in FIG. 7).

A clamped ReLU activation function with a variable dynamic range can be implemented with the grids of input and output values scaled together according to a learned parameter (allowing for the exploration of the tradeoff between range and precision). In this case, the input and output grid transforms are again the same, so that the output grid represents only those ReLU output values that are possible given the positive interval of the input range. The grid transform can be expressed as the product of an initial affine transform and a learned affine transform. The learned affine transform can be initialized to the identity transform.

Having described the flexible model for transposing activation values that allows the input and output sides of an activation function to be scaled and shifted by arbitrary affine transformations, the following describes the implementation of these transforms on the neural network inference circuit of some embodiments. As described by reference to FIGS. 9-16, the affine transform on the neural network inference circuit occurs after the core operation (e.g., the dot product for a convolution or fully-connected layer, a pooling or element-wise operation, etc.). and prior to the activation function. Thus, the output transform for one layer needs to be moved after the core operation of the subsequent layer(s) in which the resulting activation values are used and combined with the other affine transforms in that layer. Moving the output affine transform across the core function requires finding a solution for the following operator equation:

$$A\left(m_c^{(core)}, d_c^{(core)}\right) \circ \text{Core} \equiv \text{Core} \circ A\left(m^{(out)}, d^{(out)}\right), \tag{51}$$

Where the right-hand side is the original operator ordering and the left-hand side is the desired operator ordering. The affine parameters m and d may be modified when the output affine transform is moved after the core operation.

Figure 17:
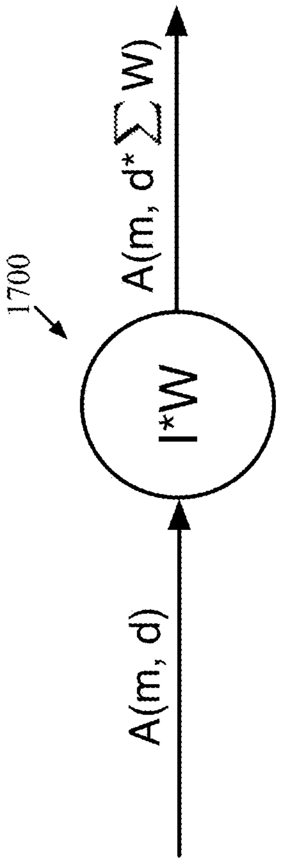
FIG. 17 conceptually illustrates the modification of the out-grid affine transform for a dot product core operation.

FIG. 17 conceptually illustrates the modification of the out-grid affine transform for a dot product core operation 1700 (i.e., for a convolutional or fully-connected layer). Each computation node involves a dot product of its input values (I) and a weight tensor (W). The weight tensor W is the same for each computation node in a given channel but varies between channels. As shown, moving an affine transform A(m, d) across such a dot product operation results in a new affine transform $A(m, d{*}\Sigma\, W_c)$. That is, the scaling factor stays the same while the additive bias factor is multiplied by the sum of the weights in the filter for that channel:

$$m_c^{(core)} = m^{(out)}, \tag{52}$$

$$d_c^{(core)} = d^{(out)} \sum W_c. \tag{53}$$

Figure 18:
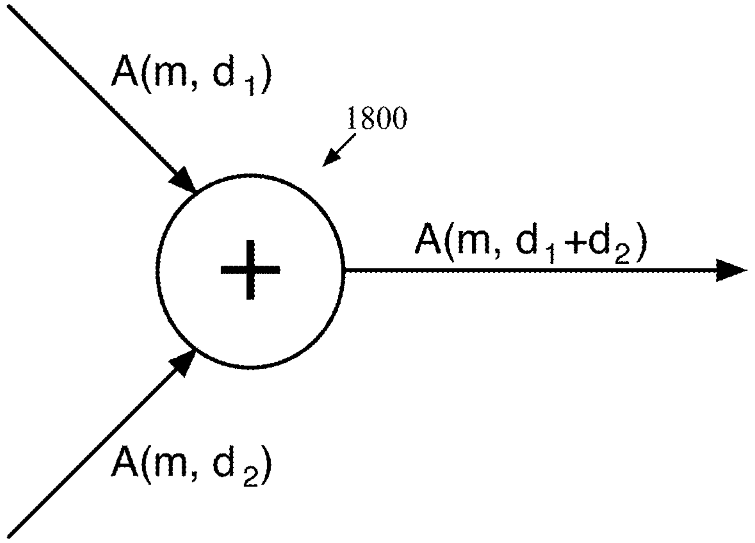
FIG. 18 conceptually illustrates the modification of the out-grid affine transforms for an element-wise addition core operation.

FIG. 18 conceptually illustrates the modification of the out-grid affine transforms for an element-wise addition core operation 1800 (i.e., for an element-wise addition layer). Each computation node in such a layer involves adding one activation value from a first prior layer with a corresponding activation value from a second prior layer. Some embodiments require that the scaling factor m be the same for the output transform associated with each of these two prior layers, while other embodiments allow specific variations that can be handled by pre-scaling one of the inputs (e.g., by a factor of 2 or 4). Thus, if the two prior layers would have different optimal output ranges, such embodiments require that a compromise scale be determined. As shown, if the affine transforms $A(m, d_i)$ and $A(m, d_2)$ are the output transforms for the two prior layers, then the resultant affine transform is $A(m, d_1+d_2)$. That is, the scale does not change while the bias factors are added together.

To determine the scale m and biases $d_1$ and $d_2$, the following must be satisfied:

$$m \min(h_i) + d_i \le \min(g_i),\ i = 1, 2, \tag{54}$$

$$m \max(h_i) + d_i \ge \max(g_i),\ i = 1, 2. \tag{55}$$

Thus, the common scale must satisfy $$m \text{ length}(h_i) \ge \text{length}(g_i),\ i = 1, 2, \tag{56}$$

where $$\text{length}(h_i) = \max(h_i) - \min(h_i) \tag{57}$$

is the length of a grid. Choosing the minimum feasible value of m, in order to avoid covering more of either output range than requested, leads to the value of the shared scale being $$m = \max_{i=a,b} \frac{\text{length }(g_i)}{\text{length }(h_i)}. \quad (58)$$

Feasible values for the bias factors are found in some embodiments by mapping the midpoint of each hardware grid, mid $(h_i)$=(max $(h_i)$–min $(h_i)$)/2, to the midpoint of each output interval:

$$d_i = \text{mid }(g_i) - m \text{ mid }(h_i),\ i = 1, 2. \quad (59)$$

Figure 19:
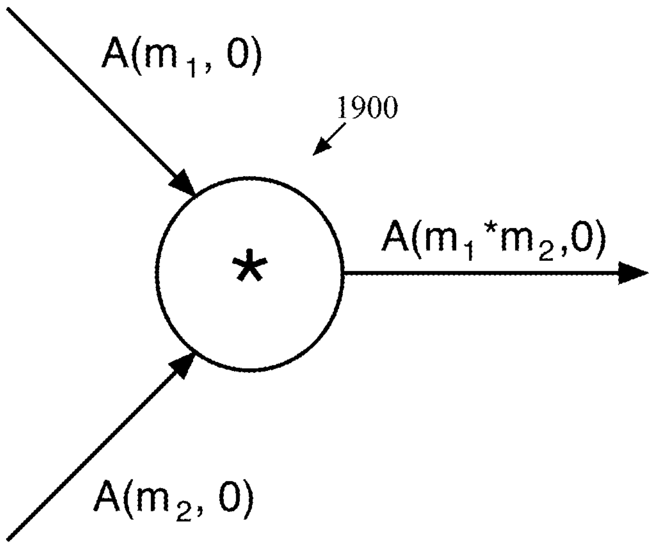
FIG. 19 conceptually illustrates the modification of the out-grid affine transforms for an element-wise multiplication core operation.

FIG. 19 conceptually illustrates the modification of the out-grid affine transforms for an element-wise multiplication core operation 1800 (i.e., for an element-wise multiplication layer). Each computation node in such a layer involves multiplying one activation value from a first prior layer by a corresponding activation value from a second prior layer. Assuming the input values (i.e., the output values of the prior layers) cannot be pre-shifted, some embodiments do not allow either of the layers to have a nonzero bias factor in the output transforms as doing so would require additional element-wise addition operations that come from the product of two affine tensors (thereby overly complicating the implementation of the layer). As shown, if the affine transforms A($m_1$, 0) and A($m_2$, 0) are the output transforms for the two prior layers, then the resultant affine transform is A($m_1$*$m_2$, 0).

Thus, scales $m_1$ and $m_2$ should be found that satisfy $$m_i \min(h_i) + d_i \le \min(g_i),\ i = 1, 2 \quad (60)$$

$$m_i \max(h_i) + d_i \ge \max(g_i),\ i = 1, 2. \quad (61)$$

This requires that $$\text{sgn}(\min(h_i)) \le \text{sgn}(\min(g_i)) \quad (62)$$

$$\text{sgn}(\max(h_i)) \ge \text{sgn}(\max(g_i)), \quad (63)$$

where sgn is the sign function $$\text{sgn}(x) = \{-1, \text{ if } x < 0; 0, \text{ if } x = 0; +1, \text{ if } x > 0. \quad (64)$$

The hardware grids have min values that are either negative or 0 and max values greater than 0. Thus, some embodiments require that sgn(min (h_i))≤sgn(min (g_i), as otherwise no solution exists. If the minimum value of the hardware grid is 0, then the scale is given by $$m_i = \frac{\max\ (g_i)}{\max\ (h_i)}. \quad (65)$$

If the minimum value of the hardware grid is negative, then the scale is given by $$m_i = \max\left\{\frac{\max\ (g_i)}{\max\ (h_i)}, \frac{\min\ (g_i)}{\min\ (h_i)}\right\}. \quad (66)$$

Activation-by-activation matrix multiplication layers, in some embodiments, also require zero bias factors (like element-wise multiplication). Certain types of layers do not affect the affine transform, such that the scale and bias are unchanged (i.e., the core operation commutes with any affine transform). These layers include max pooling layers, cropping layers, as well as scaling and upscaling layers. It should be noted that the core operations of scaling and upscaling layers do not commute with affine transforms having non-zero bias (d). However, the core operation (performed prior to the affine transform) of such layers is an identity operation, as the actual scaling is performed by the affine function circuits. Average pooling layers sum up inputs, apply the affine transformation, and then divide by the number of inputs in the pooling kernel (e.g., 9 for 3×3 pooling). This sum operation computes with the affine transform applied to the output range of the input layer, so average pooling easily supports transforming of input and output grids.

As also described above, in some embodiments additional affine transforms (in addition to those relating to transformations of the previous output grid and current input grid) are applied to the outputs of core computations prior to application of the activation function. These transforms include (i) a weight-scale transform (multiplication by ac, the weight scale for the current layer or channel), (ii) batch normalization transform, if applicable, and/or (iii) a learned affine transform. The batch normalization transform, if used, standardizes the activations for a batch by subtracting the mean and dividing by the standard deviation. The learned affine transform is the learned scale and bias that follows a convolutional layer in some embodiments. The hardware affine transform implements the product of these affine transforms (in the correct order).

As described, the neural network inference circuit of some embodiments does not have the ability to represent the affine-transformed values (as the hardware represents these values as quantized bit values). Instead, the neural network inference circuit propagates values encoded by application of an affine transformation, which can be decoded by applying the inverse transform.

Figure 20:
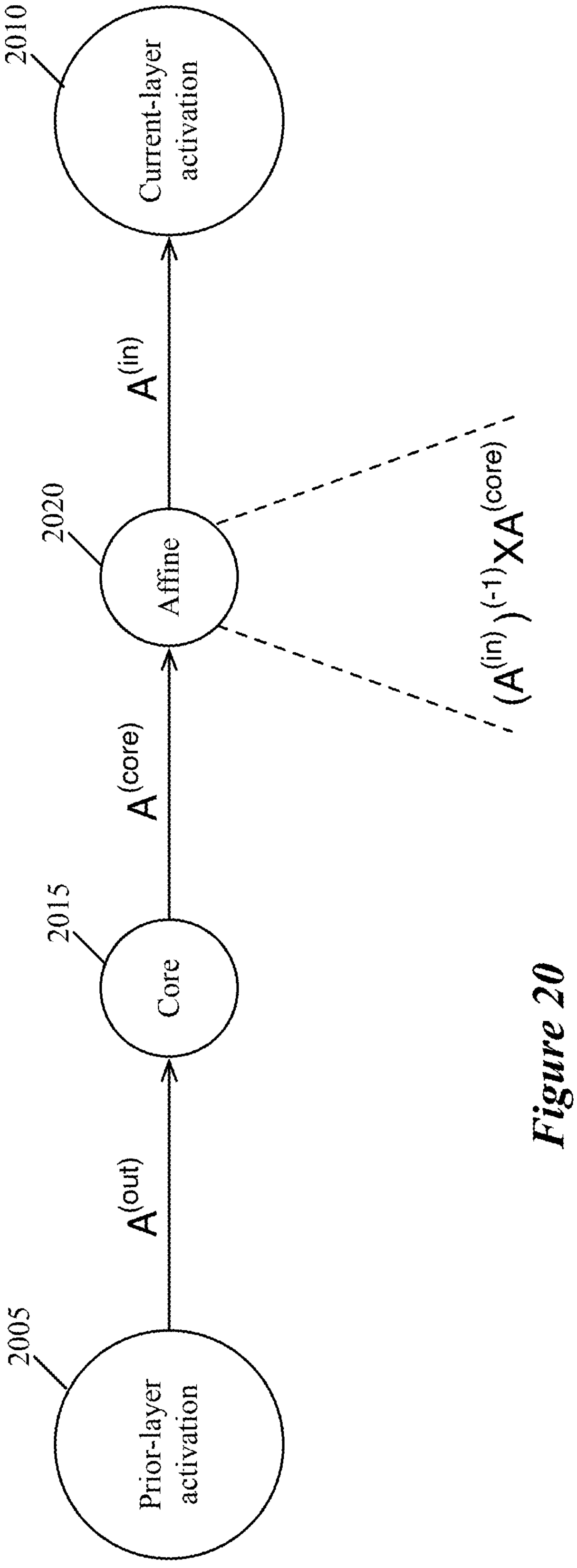
FIG. 20 conceptually illustrates the propagation of a coded message from a prior-layer activation function to a current-layer activation function, passing through a core function and the affine function of the current layer.

FIG. 20 conceptually illustrates the propagation of a coded message from a prior-layer activation function 2005 to a current-layer activation function 2010, passing through a core function 2015 (e.g., dot product, element-wise operation, etc.) and the affine function 2020 of the current layer (executed by the affine transform circuit block). In this figure, each arrow between functions is annotated with the decoding function that is applied to the transmitted data in order to decode the value(s). Because the prior-layer activation is unable to actually apply the output transform $A^{(out)}$, that transform needs to be applied to the activation output in order for that output to be decoded. As described above (e.g., by reference to FIGS. 17-19), the encoding of the values (and thus the decoding transform) may be modified by application of the core operation, so that the transform $A^{(core)}$ would need to be applied.

The affine function 2020 (as implemented by the affine circuit block), is required to (i) decode the incoming value by applying $A^{(core)}$, (ii) apply any additional transforms X (e.g., the learned affine transform, weight scaling, etc.) and (iii) re-encode the value for processing by the current-layer activation function (transforming the value onto the input grid for that function). These affine transforms are not applied separately, but rather are combined into a single affine transform in the neural network program instructions with shift and scale values that are used to configure the affine transform circuits to apply this transform.

The following describes the activation value computation model on the neural network inference circuit, which includes the following operations in the following order:

$$y^{(out)} = \Phi^{(HW)} k_{prev} \text{ (value in integer output grid)} \tag{67}$$

$$y^{(Core)} = \text{Core}^{(HW)} . y^{(out)} \text{ (core operation)} \tag{68}$$

$$y^{(in)} = \gamma\left(y^{(Core)} + \beta\right) \text{ (hardware affine transform)} \tag{69}$$

$$k_{curr} = FlrIdx\left(A_{h(in)}\right) y^{(in)} \text{ (index in input} - \text{value grid)} \tag{70}$$

Thus, the input-grid index of the current layer, $k_{curr}$, is computed in terms of the input-grid index of the previous layer, $k_{prev}$, by the following:

$$k_{curr} = FlrIdx\left(A_{h(in)}\right) A^{(HW)} \text{Core}^{(HW)} \Phi^{(HW)} k_{prev}. \tag{71}$$

In training, for the unencoded model of this computation, affine-transformed value grids are used such that the output values are affine transforms of the values that would appear on the hardware. The following computations are performed:

$$y^{(out)} = \Phi^{(SW)} k_{prev} \text{ (value in transformed out grid)} \tag{72}$$

$$y^{(Core)} = \text{Core}^{(SW)} y^{(out)} \text{ (core operation with floating point weights)} \tag{73}$$

$$y^{(BN)} = A^{(BN)} y^{(Core)} \text{ (optional batch normalization)} \tag{74}$$

$$y^{(in)} = A^{(L)} y^{(BN)} \text{ (learned affine)} \tag{75}$$

$$k_{curr} = FlrIdx\left(A_{g(in)}\right) y^{(in)} \text{ (floor to transformed input grid)} \tag{76}$$

The operations here begin with a quantized input index from the previous layer, $k_{prev}$, and compute the quantized input index for the current layer, $k_{curr}$. Some embodiments split the computation in this way is because this set of operations all use the hardware affine computation of the same layer. In some embodiments, the output grid and input grid transforms are implicit in the table look-up $\Phi^{(SW)} k_{prev}$ and the computation of the next input index, $k_{curr}$. The core operation differs from the implementation on the neural network inference circuit in that if the operation uses weights (e.g., for convolutional or fully connected layers), then the training system of some embodiments uses floating point weights that are (approximately) proportional to the weight scale ct.

The formula for the input-grid index of the current layer ($k_{curr}$) can be written in terms of the previous input-grid index ($k_{prev}$) and manipulated into a form similar to the hardware formula given above:

$$k_{curr} = FlrIdx\left(A_{g(in)}\right) A^{(L)} A^{(BN)} \text{Core}^{(SW)} \Phi^{(SW)} k_{prev} \tag{77}$$

$$= FlrIdx\left(A_{h(in)}\right)\left(A^{(in)}\right)^{-1} A^{(L)} A^{(BN)} \text{Core}^{(SW)} A^{(out)} \Phi^{(HW)} k_{prev}$$

-continued $$= FlrIdx\left(A_{h(in)}\right)\left(A^{(in)}\right)^{-1} A^{(L)} A^{(BN)} A^{(core)} \text{Core}^{(SW)} \phi^{(HW)} k_{prev}$$

$$\approx FLRIdx\left(A_{h(in)}\right)\left(A^{(in)}\right)^{-1} A^{(L)} A^{(BN)} A^{(core)} A^{(WS)} \text{Core}^{(HW)} \Phi^{(HW)} k_{prev}$$

This formula uses the relationship between the training (software) and hardware grid operations described above and moves the output-grid transform across the core operation and uses the idea that by the end of training the weights used for core dot product operations are ternary multiples of the weight scale. Comparing the training formula to the hardware formula for $k_{curr}$, for these to match, the following needs to be satisfied:

$$A^{(HW)} = \left(A^{(in)}\right)^{-1} A^{(L)} A^{(BN)} A^{(core)} A^{(WS)} \equiv A^{(total)}. \tag{78}$$

That is, the hardware affine transform needs to include the weight scale ($A^{(WS)}$), the decoding transform ($A^{(core)}$), the batch norm and learned affine transform, and the encoding transform for the upcoming activation function (the inverse of $A^{(in)}$).

Next, the encoded model of the training computation will be discussed. In this encoded model, the hardware input and output grids are used (rather than the transformed grids), which reduces the complexity and development effort required for the training model. Instead, each propagated activation value is an affine encoding of the true values. The effects of the input grid and output grid transforms are taken into account in the model affine transform (and thus in the hardware affine transform).

First, the forward computation of a layer without batch normalization will be described. The out-grid transform is moved across the core operation (including the weight-scale transform) and then a combined transform ($A^{(comb)}$) is applied that is the product of the moved out-grid, learned, and inverse in-grid transforms:

$$y^{(out)} = \Phi^{(HW)} k_{prev} \text{ (value in integer output grid)} \tag{79}$$

$$y^{(Core)} = \text{Core}^{(SW)} y^{(out)} \text{ (core operation with floating point weights)} \tag{80}$$

$$y^{(in)} = A^{(comb)} . y^{(core)} \text{ (combined affine)} \tag{81}$$

$$k_{curr} = FlrIdx\left(A_{h(in)}\right) y^{(in)} \text{ (floor to integer grid),} \tag{82}$$

in which $$A^{(comb)} = \left(A^{(in)}\right)^{-1} A^{(L)} A^{(core)}. \tag{83}$$

The total affine transform that needs to equal the hardware affine transform (in the encoded model without batch normalization), is thus:

$$A^{(HW)} = A^{(comb)} A^{(WS)} \equiv A^{(total)}. \tag{84}$$

If the layer uses batch normalization, the moved (decoding) affine transform is canceled in training by batch normalization and can therefore be ignored. As evidence, consider an activation tensor x and its affine transform A(m, d)x.

The mean and variance of the transformed tensor are related to those of the original tensor by:

$$\mathbb{E}[A(m,d)x] = m\mathbb{E}[x] + d, \tag{85}$$

$$\mathbb{V}[A(m,d)x] = m^2\mathbb{V}[x]. \tag{86}$$

Batch normalization, which given an input subtracts its mean and divides by its standard deviation, has the following effect on an affine-transformed input:

$$\begin{aligned} BNA(m,d)x &\equiv \frac{A(m,d)x - \mathbb{E}[A(m,d)x]}{\sqrt{\mathbb{V}[A(m,d)x]}} \\ &= \frac{(mx+d) - (m\mathbb{E}[x]+d)}{m\sqrt{\mathbb{V}[x]}} \\ &= \frac{x - \mathbb{E}[x]}{\sqrt{\mathbb{V}[x]}} \\ &= BNx. \end{aligned} \tag{87}$$

Thus, the batch normalization transform of an affine-transformed tensor is equal to the batch normalization transform of the original tensor (as a slight approximation that ignores the small value used to regularize the division by the square root of the batch normalization variance).

Figure 21:
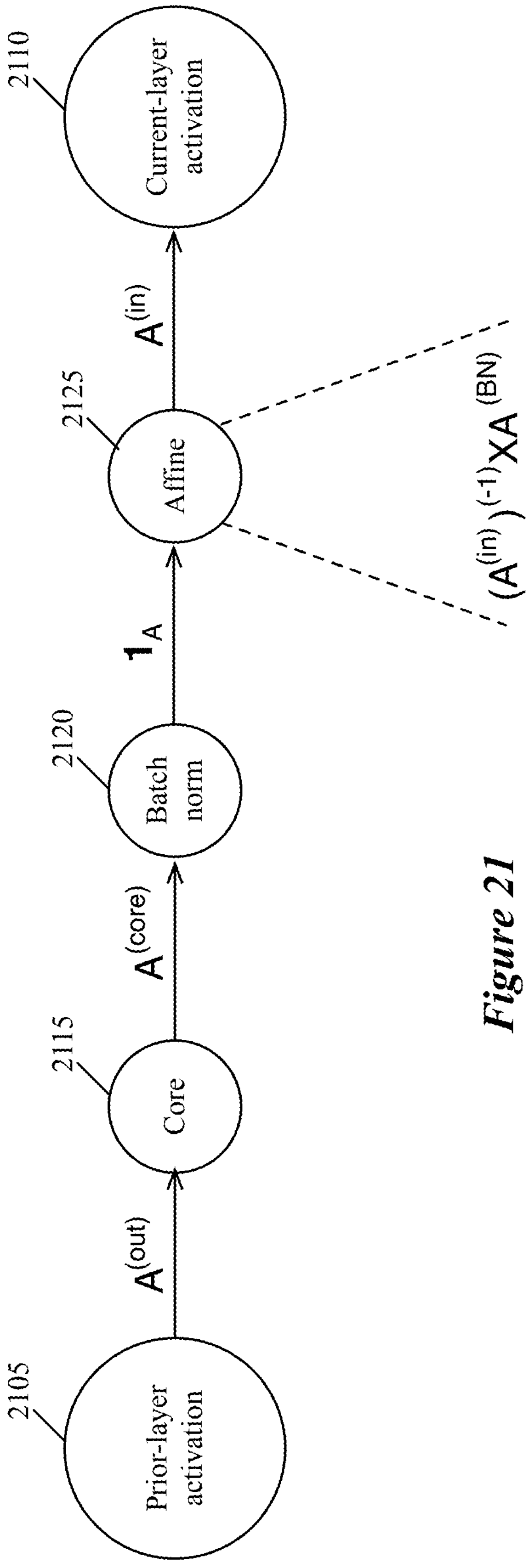
FIG. 21 conceptually illustrates the propagation of a coded message from a prior layer activation function to a current-layer activation function when batch normalization is used for the layer.

FIG. 21 conceptually illustrates the propagation of a coded message from a prior layer activation function 2105 to a current-layer activation function 2110 when batch normalization is used for the layer. In this case, the message passes through a core function 2115, a batch normalization operation 2120, and the affine function 2125 of the current layer. In this figure, each arrow between functions is annotated with the decoding function that is applied to the transmitted data in order to decode the value(s). Because the prior-layer activation is unable to actually apply the output transform $A^{(out)}$, that transform needs to be applied to the activation output in order for that output to be decoded. As described above (e.g., by reference to FIGS. 17-19), the encoding of the values (and thus the decoding transform) may be modified by application of the core operation, so that the transform $A^{(core)}$ would need to be applied after the core function is applied to the data.

However, the batch normalization function 2120 removes this encoding as shown above, so the new decoding transform is simply the identity transform. The affine function 2025 (as implemented by the affine circuit block), is required to (i) decode the incoming value by applying $A^{(BN)}$ (which it turns out is simply the identity transform and thus can be removed (ii) apply any additional transforms X (e.g., the learned affine transform, weight scaling, etc.) and (iii) re-encode the value for processing by the current-layer activation function (transforming the value onto the input grid for that function).

To apply this aspect to forward computation in training, the following steps are used:

$$\begin{aligned} k_{curr}^{(train)} &= FlrIdx(A_{h(in)})(A^{(in)})^{-1}A^{(L)}BNA^{(core)}\text{Core}^{(SW)}\Phi^{(HW)}k_{prev} \\ &= FlrIdx(A_{h(in)})(A^{(in)})^{-1}A^{(L)}BN\ \text{Core}^{(SW)}\Phi^{(HW)}k_{prev} \\ &\approx FlrIdx(A_{h(in)})(A^{(in)})^{-1}A^{(L)}BNA^{(WS)}\text{Core}^{(HW)}\Phi^{(HW)}k_{prev}. \end{aligned} \tag{88}$$

Thus, the batch normalization operator absorbs the out-grid transform (moved after the core operation). This operator could also absorb the weight-scale transform, but this transform is included in the core operation during training as it is a factor in the weight tensor. As a result, if the moved output transform is not included and, as a consequence, the batch normalization statistics do not reflect the that transform, the result will be the same as if the output transform had been included. Thus, the output transform for a layer with batch normalization can be ignored. The only difference for a layer using batch normalization is that the in-grid transform is combined with the learned affine transform and applied during forward propagation:

$$y^{(out)} = \Phi^{(HW)}k_{prev} \text{ (value in integer output grid)} \tag{89}$$

$$y^{(Core)} = \text{Core}^{(SW)}y^{(out)} \text{ (core operation with floating point weights)} \tag{90}$$

$$y^{(BN)} = A^{(BN)}y^{(core)} \text{ (batch normalization)} \tag{91}$$

$$y^{(in)} = A^{(comb)}y^{(BN)} \text{ (combined affine transform)} \tag{92}$$

$$k_{curr} = FlrIdx(A_{h(in)})y^{(in)} \text{ (floor to integer grid)} \tag{93}$$

In this case, $A^{(comb)}$ is computed by merging the learned affine transform with the inverse in-grid transform:

$$A^{(comb)} = (A^{(in)})^{-1}A^{(L)}. \tag{94}$$

That is, comparing to $A^{(comb)}$ without batch normalization, the difference is the absence of the decoding transform $A^{(core)}$. The total affine transform, in this encoded model with batch normalization, is thus:

$$A^{(HW)} = A^{(comb)}A^{(BN)}A^{(WS)} = (A^{(in)})^{-1}A^{(L)}A^{(BN)}A^{(WS)} \equiv A^{(total)}. \tag{95}$$

There are several advantages of using this encoded model. For one, the quantized activation functions do not change. That is, $\Phi^{(HW)}$ is used for all activations (for both the training model and for hardware evaluation), which reduces development effort and training time. In addition, the model is closer to that used on hardware so there is reduced risk of disagreement between training and hardware validation. Reducing the discrepancy between training and evaluation mode also means that less code is required and thus less debugging.

In some embodiments, the strategy for training quantized affine transform parameters is as follows. First, the total affine transform is computed in the training (software) model. Next, the hardware affine transform is set equal to that total affine transform, to determine the unquantized scale and bias. These scale and bias factors are then quantized (e.g., using stochastic rounding). The affine transform is then computed by starting from the quantized hardware transform and undoing the affine transforms that are already performed in forward propagation (such as batch normalization and weight-scale transforms) so as to avoid performing those transforms twice. The result is that forward propagation during training performs an overall affine transform equivalent to the quantized hardware transform.

The affine transformation of input and output grids fits naturally within this strategy. The following describes how to extend this strategy to include these input and output grid transforms, using a general description that covers the cases of the unencoded and encoded models (including both with and without batch normalization). First, the total affine transform to be implemented in the affine transform in hardware is computed:

$$A^{(total)} = \left(A^{(in)}\right)^{-1} A^{(L)} \circ \begin{Bmatrix} A^{(core)}, & \text{encoded: no } BN \\ A^{(BN)}, & \text{encoded: } BN \\ A^{(BN)} A^{(core)}, & \text{unencoded} \end{Bmatrix} \circ A^{(WS)}. \tag{96}$$

Next, the unquantized hardware affine transform is set equal to the total affine transform, $A^{(HW)}=A^{total}$, and the affine transform parameters for configuring the neural network inference circuit are determined:

$$\gamma = \text{scale}\left(A^{(total)}\right) \tag{97}$$

$$\beta = \gamma^{-1} bias\left(A^{(total)}\right). \tag{98}$$

The hardware affine parameters are then quantized, and the quantized hardware transform determined:

$$A^{(QHW)} = A\left(\gamma^{Q}, \gamma^{Q}\beta^{Q}\right). \tag{99}$$

Lastly, the quantized software transformation, $A^{(QSW)}$ (for use during training), is determined:

$$y = \text{scale}\left(A^{(QSW)}\right)x + \text{bias}\left(A^{(QSW)}\right). \tag{100}$$

The forward propagation during training should match the result of the quantized hardware affine transform. The input index for the current layer is computed during training using $$k_{curr}^{(train)} = FlrIdx\left(A_{h(in)}\right) A^{(Post)} A^{(QSW)} A^{(Pre)} \text{Core}^{(SW)} \Phi^{(HW)} k_{prev}, \tag{101}$$

Where $A^{(Pre)}$ is the affine transforms that will be performed prior to the quantized software affine transform:

$$A^{(Pre)} = \begin{cases} A^{(WS)}, & \text{encoded: no } BN \\ A^{(BN)} A^{(WS)} & \text{encoded: } BN \\ A^{(BN)} A^{(core)} A^{(WS)}, & \text{unencoded} \end{cases} \tag{102}$$

and $A^{(Post)}$ is the affine transform performed after the quantized software affine transform:

$$A^{(Post)} = \begin{cases} 1_A, & \text{encoded: no } BN \\ 1_A, & \text{encoded: } BN \\ \left(A^{(in)}\right)^{-1}, & \text{unencoded} \end{cases}. \tag{103}$$

Given that the quantized hardware affine transformation should equal the product of the affine transformations performed during training, where the quantized SW transform is between the pre- and post-transforms, the quantized software affine transform is equal to:

$$A^{(QSW)} = \left(A^{(Post)}\right)^{-1} A^{(QHW)} \left(A^{(Pre)}\right)^{-1}. \tag{104}$$

Substituting the unencoded forms of the pre- and post-transforms for the different cases, the quantized software affine transform is given by $$A^{(QSW)} = \begin{cases} A^{(QHW)}\left(A^{(WS)}\right)^{-1}, & \text{encoded: no } BN \\ A^{(QHW)}\left(A^{(WS)}\right)^{-1}\left(A^{(BN)}\right)^{-1}, & \text{encoded: } BN \\ A^{(in)} A^{(QHW)}\left(A^{(WS)}\right)^{-1}\left(A^{(core)}\right)^{-1}\left(A^{(BN)}\right)^{-1}, & \text{unencoded} \end{cases}. \tag{105}$$

The neural network inference circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the neural network inference circuit to be executed on the device. These devices can include mobile devices, desktop computers, Internet of Things (IoT devices), etc.

Figure 22:
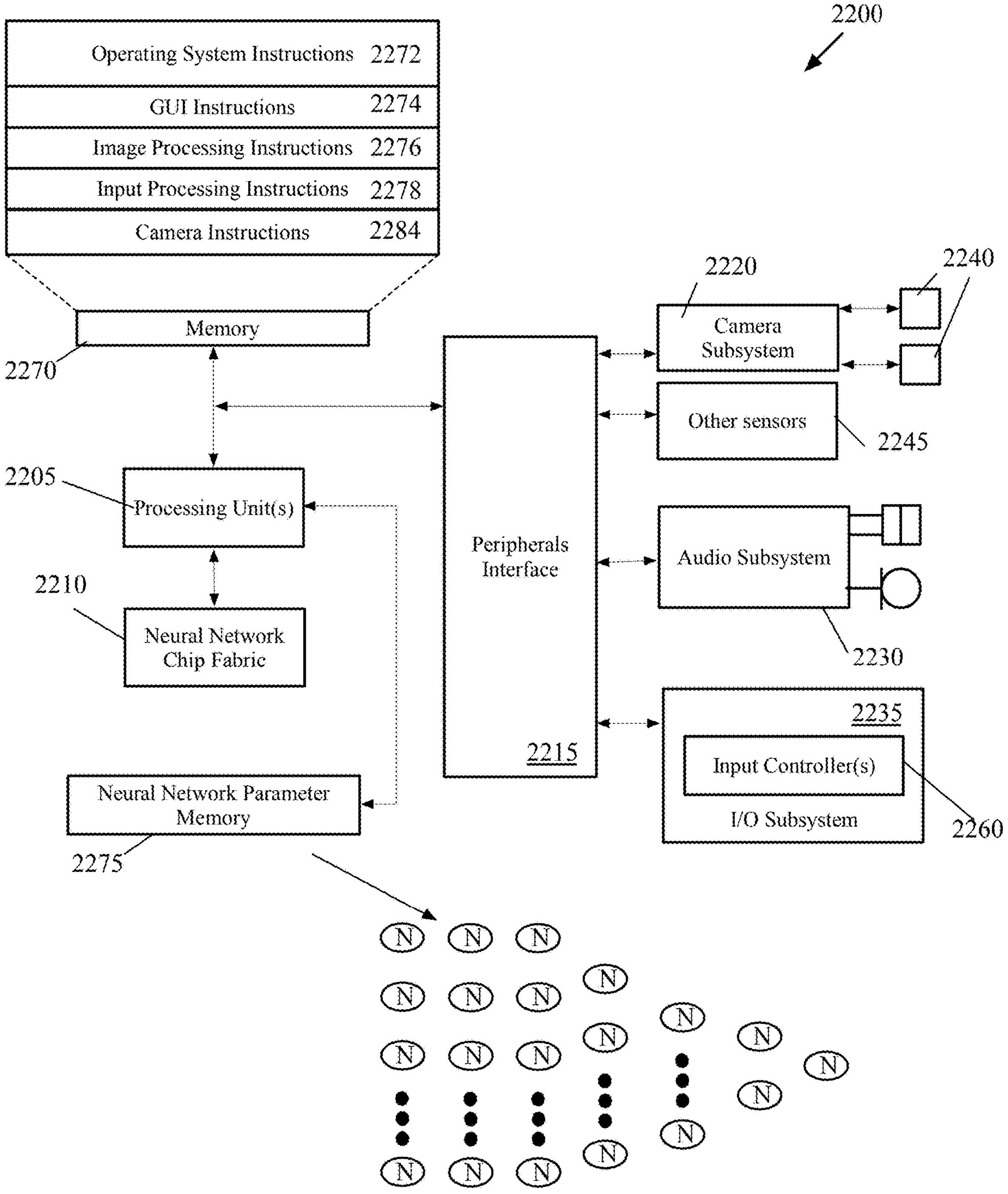
FIG. 22 illustrates an example of the architecture of a mobile computing device that stores neural network processing instructions.

FIG. 22 is an example of an architecture 2200 of an electronic device that includes a neural network integrated circuit of some embodiments. The electronic device may be a mobile computing device such as a smartphone, tablet, laptop, etc., or may be another type of device (e.g., an IoT device, a personal home assistant). As shown, the device 2200 includes one or more general-purpose processing units 2205, a neural network chip fabric 2210, and a peripherals interface 2215.

The peripherals interface 2215 is coupled to various sensors and subsystems, including a camera subsystem 2220, an audio subsystem 2230, an I/O subsystem 2235, and other sensors 2245 (e.g., motion/acceleration sensors), etc. The peripherals interface 2215 enables communication between the processing units 2205 and various peripherals. For example, an orientation sensor (e.g., a gyroscope) and an acceleration sensor (e.g., an accelerometer) can be coupled to the peripherals interface 2215 to facilitate orientation and acceleration functions. The camera subsystem 2220 is coupled to one or more optical sensors 2240 (e.g., charged coupled device (CCD) optical sensors, complementary metal-oxide-semiconductor (CMOS) optical sensors, etc.). The camera subsystem 2220 and the optical sensors 2240 facilitate camera functions, such as image and/or video data capturing.

The audio subsystem 2230 couples with a speaker to output audio (e.g., to output voice navigation instructions). Additionally, the audio subsystem 2230 is coupled to a microphone to facilitate voice-enabled functions, such as voice recognition, digital recording, etc. The I/O subsystem 2235 involves the transfer between input/output peripheral devices, such as a display, a touch screen, etc., and the data bus of the processing units 2205 through the peripherals interface 2215. The I/O subsystem 2235 includes various input controllers 2260 to facilitate the transfer between input/output peripheral devices and the data bus of the processing units 2205. These input controllers 2260 couple to various input/control devices, such as one or more buttons, a touchscreen, etc.

In some embodiments, the device includes a wireless communication subsystem (not shown in FIG. 22) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 22, a memory 2270 (or set of various physical storages) stores an operating system (OS) 2272. The OS 2272 includes instructions for handling basic system services and for performing hardware dependent tasks. The memory 2270 also stores various sets of instructions, including (1) graphical user interface instructions 2274 to facilitate graphic user interface processing; (2) image processing instructions 2276 to facilitate image-related processing and functions; (3) input processing instructions 2278 to facilitate input-related (e.g., touch input) processes and functions; and (4) camera instructions 2284 to facilitate camera-related processes and functions. The processing units 2205 execute the instructions stored in the memory 2270 in some embodiments.

The memory 2270 may represent multiple different storages available on the device 2200. In some embodiments, the memory 2270 includes volatile memory (e.g., high-speed random access memory), non-volatile memory (e.g., flash memory), a combination of volatile and non-volatile memory, and/or any other type of memory.

The instructions described above are merely exemplary and the memory 2270 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 2275 stores the weight values, bias parameters, etc. for implementing one or more machine-trained networks by the neural network chip fabric 2210. In some embodiments, different clusters of the fabric 2210 can implement different machine-trained networks in parallel in some embodiments. In different embodiments, these neural network parameters are stored on-chip (i.e., in memory that is part of the neural network chip fabric 2210) or loaded onto the chip fabric 2210 from the neural network parameter memory 2275 via the processing unit(s) 2205.

While the components illustrated in FIG. 22 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 2205 and the neural network chip fabric 2210, which enables the processing units 2205 to provide inputs to the chip fabric 2210 and receive the outputs of the network from the chip fabric 2210. Also, while many of the functions have been described as being performed by one component, one of ordinary skill in the art will realize that the functions described with respect to FIG. 22 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 23:
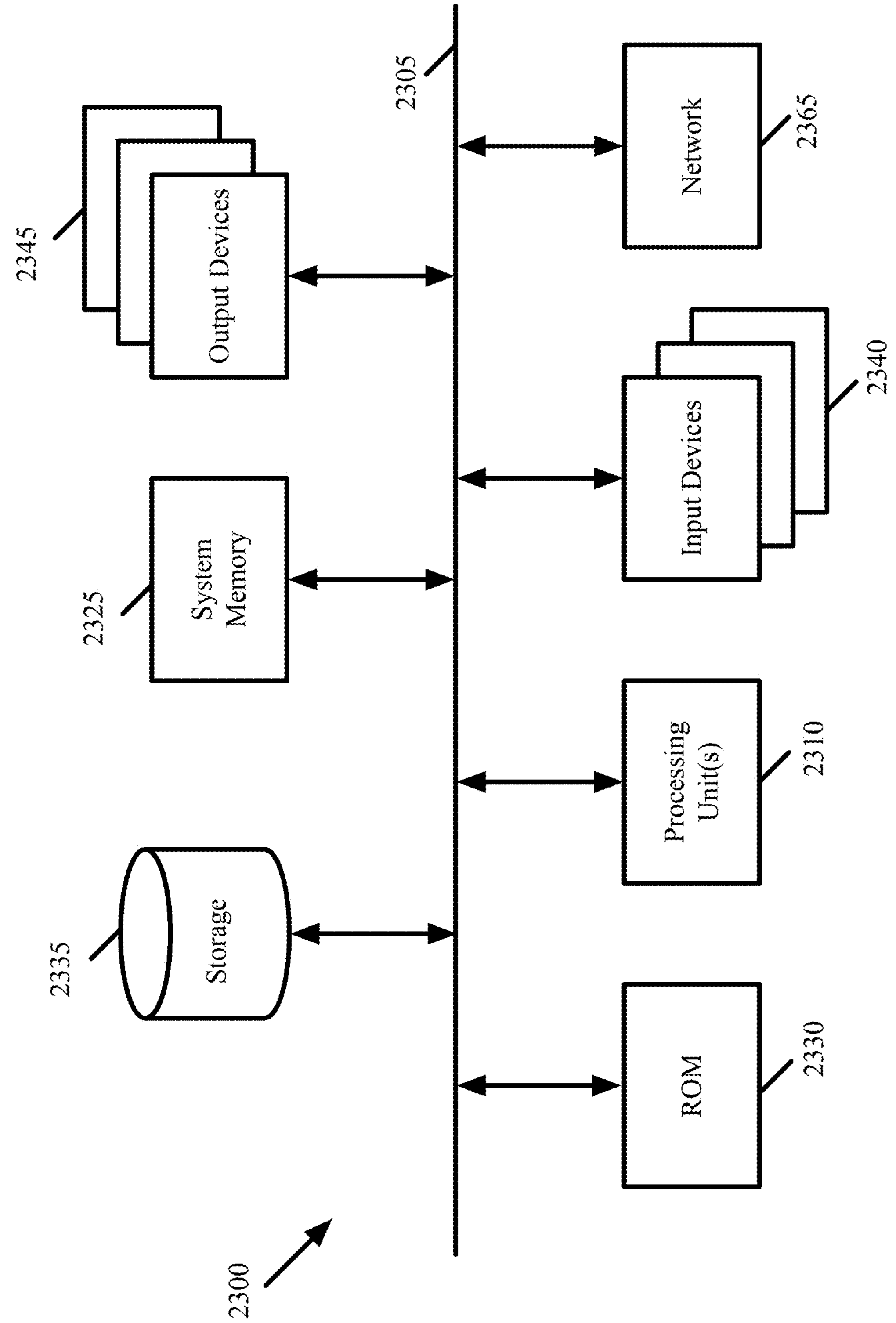
FIG. 23 conceptually illustrates an electronic system with which some embodiments of the invention are implemented.

FIG. 23 conceptually illustrates an electronic system 2300 with which some embodiments of the invention are implemented. The electronic system 2300 can be used to execute any of the applications (e.g., the training application) described above. The electronic system 2300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2300 includes a bus 2305, processing unit(s) 2310, a system memory 2325, a read-only memory 2330, a permanent storage device 2335, input devices 2340, and output devices 2345.

The bus 2305 collectively represents all system, peripheral, and chipset buses that communicatively connect the numerous internal devices of the electronic system 2300. For instance, the bus 2305 communicatively connects the processing unit(s) 2310 with the read-only memory 2330, the system memory 2325, and the permanent storage device 2335.

From these various memory units, the processing unit(s) 2310 retrieves instructions to execute and data to process in order to execute the processes of the invention. The processing unit(s) may be a single processor or a multi-core processor in different embodiments and may include generic CPUs as well as graphics processing units (GPUs).

The read-only-memory (ROM) 2330 stores static data and instructions that are needed by the processing unit(s) 2310 and other modules of the electronic system. The permanent storage device 2335, on the other hand, is a read-and-write memory device. This device is a non-volatile memory unit that stores instructions and data even when the electronic system 2300 is off. Some embodiments of the invention use a mass-storage device (such as a magnetic or optical disk and its corresponding disk drive) as the permanent storage device 2335.

Other embodiments use a removable storage device (such as a floppy disk, flash drive, etc.) as the permanent storage device. Like the permanent storage device 2335, the system memory 2325 is a read-and-write memory device. However, unlike storage device 2335, the system memory is a volatile read-and-write memory, such a random-access memory. The system memory stores some of the instructions and data that the processor needs at runtime. In some embodiments, the invention's processes are stored in the system memory 2325, the permanent storage device 2335, and/or the read-only memory 2330. From these various memory units, the processing unit(s) 2310 retrieves instructions to execute and data to process in order to execute the processes of some embodiments.

The bus 2305 also connects to the input and output devices 2340 and 2345. The input devices enable the user to communicate information and select commands to the electronic system. The input devices 2340 include alphanumeric keyboards and pointing devices (also called "cursor control devices"). The output devices 2345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 23, bus 2305 also couples electronic system 2300 to a network 2365 through a network adapter (not shown). In this manner, the computer can be a part of a network of computers (such as a local area network ("LAN"), a wide area network ("WAN"), or an Intranet, or a network of networks, such as the Internet. Any or all components of electronic system 2300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 1 and 16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A neural network inference circuit comprising:

a set of core computation circuits configured to:

generate, using a set of input values for a neural network, a first value, wherein the first value is output of a core computation for a first node of the neural network;

a set of affine transform circuits configured to:

generate, based on the first value, a second value, wherein generating the first value comprises:

applying a first affine transform to the second value, wherein the first affine transform is a combination of (i) a batch normalization transform, (ii) a learned affine transform, (iii) a weight scale for the first node, and (iv) an encoding transform associated with a first activation function such that the second value is encoded for input in a first input range associated with the first activation function; and a set of activation circuits configured to apply the first activation function to the second value to generate an output value for the first node.

2. The neural network inference circuit of claim 1 further comprising a set of configuration circuits for configuring the set of affine transform circuits with values to cause the set of affine transform circuits to apply the first affine transform.

3. The neural network inference circuit of claim 2, wherein the values are provided to the set of affine transform circuits as a single shift value and a single scale value that apply the combination of the batch normalization transform, the learned affine transform, the weight scale, and the encoding transform.

4. The neural network inference circuit of claim 1, wherein the weight scale for the first node is a scale for a layer of the neural network to which the first node belongs.

5. The neural network inference circuit of claim 1, wherein the weight scale is a scale for a filter that includes a set of weights used for the core computation.

6. The neural network inference circuit of claim 1, wherein the set of affine transform circuits comprises (i) an adder circuit for applying a shift of the first affine transform and a multiplication circuit for applying a scale of the first affine transform.

7. The neural network inference circuit of claim 6, wherein the adder circuit applies the shift to the first value to generate a shifted intermediate value and the multiplication circuit applies the scale to the shifted intermediate value to generate the second value.

8. The neural network inference circuit of claim 1, wherein the first node belongs to a first layer of a set of layers of the neural network.

9. The neural network inference circuit of claim 8, wherein:

the set of input values being output values of a second, previous layer of the neural network; and the set of input values are encoded based on a second activation function used to generate output values of the second, previous layer.

10. The neural network inference circuit of claim 9, wherein:

the first value is encoded based on (i) the encoding of the set of input values and (ii) the core computation; and the batch normalization transform and learned affine transform are trained to remove the encoding of the first value.

11. The neural network inference circuit of claim 9, wherein the set of activation circuits also applies the second activation function to generate at least one of the output values of the second, previous layer.

12. The neural network inference circuit of claim 8, wherein the first layer is a convolutional layer and a second layer of the neural network is an element-wise operation layer that does not use weight values.

13. The neural network inference circuit of claim 12, wherein:

the batch normalization transform is a first batch normalization transform, the learned affine transform is a first learned affine transform, and the encoding transform is a first encoding transform; and for a second node of the second layer:

the set of core computation circuits executes an element-wise operation on input values from two layers previous to the second layer to generate a third value;

the set of affine transform circuits applies a second affine transform to the third value to generate a fourth value, wherein the second affine transform is a combination of (i) a second batch normalization transform, (ii) a second learned affine transform, and (iii) a second encoding transform such that the fourth value is encoded for input to a second activation function; and the set of activation circuits applies the second activation function to the fourth value to generate an output value for the second node.

14. The neural network inference circuit of claim 13, wherein different subsets of the set of core computation circuits are used to execute a dot product for the first node and to execute the element-wise operation for the second node.

15. The neural network inference circuit of claim 1, wherein the set of activation circuits executes a piecewise linear function.

16. The neural network inference circuit of claim 15, wherein the piecewise linear function is configured by a set of configuration circuits of the neural network inference circuit.

17. The neural network inference circuit of claim 1, wherein the encoding transform is learned during training of the neural network.

18. The neural network inference circuit of claim 1, wherein the core computation comprises a dot product between the set of input values and a set of weight values.

19. The neural network inference circuit of claim 18, wherein each weight value of the set of weight values is one of the value zero, a positive value, and a negation of the positive value.

20. The neural network inference circuit of claim 19, wherein:

the positive value is the weight scale; and each weight value is represented in the dot product as one of the set {0, 1, −1}.

* * * * *